(12) United States Patent
Tota et al.

(10) Patent No.: US 9,477,665 B2
(45) Date of Patent: *Oct. 25, 2016

(54) REVENUE-GENERATING ELECTRONIC MULTI-MEDIA EXCHANGE AND PROCESS OF OPERATING SAME

(71) Applicant: VIRTUAL CREATIVE ARTISTS, LLC, Bell Canyon, CA (US)

(72) Inventors: Michael J. Tota, Bell Canyon, CA (US); Kenneth T. Tota, Alexandria, VA (US); Mark S. Tota, Horseheads, NY (US); Ian D. Cohen, Encino, CA (US)

(73) Assignee: VIRTUAL CREATIVE ARTISTS, LLC, Bell Canyon, CA (US)

( * ) Notice: Subject to any disclaimer, the term of this patent is extended or adjusted under 35 U.S.C. 154(b) by 571 days.

This patent is subject to a terminal disclaimer.

(21) Appl. No.: 13/679,659

(22) Filed: Nov. 16, 2012

(65) Prior Publication Data
US 2014/0143027 A1    May 22, 2014
US 2015/0317723 A9    Nov. 5, 2015

Related U.S. Application Data

(63) Continuation of application No. 11/978,781, filed on Oct. 30, 2007, now Pat. No. 8,340,994, which is a continuation of application No. 09/565,438, filed on May 5, 2000, now Pat. No. 7,308,413.

(60) Provisional application No. 60/133,247, filed on May 5, 1999.

(51) Int. Cl.
*G06Q 40/00* (2012.01)
*G06F 17/30* (2006.01)
(Continued)

(52) U.S. Cl.
CPC ......... *G06F 17/30029* (2013.01); *G06F 17/21* (2013.01); *G06Q 30/08* (2013.01); *G07C 13/00* (2013.01); *G06F 17/30023* (2013.01)

(58) Field of Classification Search
CPC ....... G06Q 10/00; G06Q 40/00; G06F 17/60
USPC ................................................ 705/7.11–7.32
See application file for complete search history.

(56) References Cited

U.S. PATENT DOCUMENTS 5,144,555 A    9/1992    Takadachi et al.
5,153,830 A    10/1992    Fisher et al.
(Continued)

FOREIGN PATENT DOCUMENTS

JP    11-088436    3/1999
WO    WO 00/57333    9/2000

OTHER PUBLICATIONS

Alspector, J., et al., "Feature-based and Clique-based User Models for Movie Selection: A Comparative Study", Jan. 13, 1998, pp. 1-29.
(Continued)

*Primary Examiner* — Romain Jeanty
(74) *Attorney, Agent, or Firm* — One LLP

(57) ABSTRACT

In a process for creating media content, media submissions are requested and electronically received from end users and stored in a computer database. The submissions are searched for material to be included in the media content, and cross-checked against the other submissions for originality and timeliness. After the material is selected from one or more submissions, the content is developed and released to an audience for review. The end users whose submission material was included in the released content are rewarded. In one embodiment, third parties are permitted to access and search the submissions on an open exchange. The third parties can bid for rights in submissions on the open exchange. After receiving these bids, they are forwarded to the particular submission's end user for acceptance or rejection. Appropriate billing and payment processes are used to bill and pay the parties involved.

22 Claims, 34 Drawing Sheets

(51) Int. Cl.
*G06Q 30/08* (2012.01)
*G07C 13/00* (2006.01)
*G06F 17/21* (2006.01)

(56) References Cited

U.S. PATENT DOCUMENTS

| | | | |
|---|---|---|---|
| 5,241,671 A | 8/1993 | Reed et al. | |
| 5,283,639 A | 2/1994 | Esch et al. | |
| 5,363,507 A | 11/1994 | Nakayama et al. | |
| 5,426,594 A | 6/1995 | Wright et al. | |
| 5,515,490 A | 5/1996 | Buchanan et al. | |
| 5,515,491 A | 5/1996 | Bates et al. | |
| 5,629,980 A | 5/1997 | Stefik et al. | |
| 5,752,186 A | 5/1998 | Malackowski et al. | |
| 5,768,389 A | 6/1998 | Ishii | |
| 5,772,446 A | 6/1998 | Rosen | |
| 5,819,092 A | 10/1998 | Ferguson et al. | |
| 5,826,260 A | 10/1998 | Byrd, Jr. et al. | |
| 5,862,223 A | 1/1999 | Walker et al. | |
| 5,867,780 A | 2/1999 | Malackowski et al. | |
| 5,910,987 A | 6/1999 | Ginter et al. | |
| 5,930,764 A * | 7/1999 | Melchione et al. | 705/7.29 |
| 5,966,695 A * | 10/1999 | Melchione et al. | 705/7.33 |
| 5,983,221 A | 11/1999 | Christy | |
| 5,987,302 A | 11/1999 | Driscoll et al. | |
| 6,005,560 A | 12/1999 | Gill et al. | |
| 6,006,227 A | 12/1999 | Freeman et al. | |
| 6,006,332 A | 12/1999 | Rabne et al. | |
| 6,012,053 A | 1/2000 | Pant et al. | |
| 6,018,744 A | 1/2000 | Mamiya et al. | |
| 6,044,354 A | 3/2000 | Asplen, Jr. | |
| 6,078,924 A | 6/2000 | Ainsbury et al. | |
| 6,131,085 A | 10/2000 | Rossides | |
| 6,151,598 A | 11/2000 | Shaw et al. | |
| 6,161,149 A | 12/2000 | Achacoso et al. | |
| 6,195,646 B1 | 2/2001 | Grosh et al. | |
| 6,202,073 B1 | 3/2001 | Takahashi | |
| 6,226,672 B1 | 5/2001 | DeMartin et al. | |
| 6,249,807 B1 | 6/2001 | Shaw et al. | |
| 6,275,811 B1 | 8/2001 | Ginn | |
| 6,288,717 B1 | 9/2001 | Dunkle | |
| 6,397,057 B1 | 5/2002 | Malackowski et al. | |
| 6,411,803 B1 | 6/2002 | Malackowski et al. | |
| 6,496,857 B1 | 12/2002 | Dustin et al. | |
| 6,613,101 B2 | 9/2003 | Mander et al. | |
| 6,638,313 B1 | 10/2003 | Freeman et al. | |
| 6,725,427 B2 | 4/2004 | Freeman et al. | |
| 6,768,999 B2 | 7/2004 | Prager et al. | |
| 6,772,229 B1 | 8/2004 | Achacoso et al. | |
| 6,792,411 B1 | 9/2004 | Massey, Jr. | |
| 6,868,403 B1 | 3/2005 | Wiser et al. | |
| 6,985,882 B1 | 1/2006 | Del Sesto | |
| 7,240,025 B2 | 7/2007 | Stone et al. | |
| 7,249,059 B2 | 7/2007 | Dean et al. | |
| 7,599,985 B2 | 10/2009 | Doyle et al. | |
| 7,720,707 B1 | 5/2010 | Mowry | |
| 7,765,482 B2 | 7/2010 | Wood et al. | |
| 2001/0049648 A1 | 12/2001 | Naylor et al. | |

OTHER PUBLICATIONS

Archived version of www.ideaexchange.com, Jan. 1997.
Archived version of www.idea-bank.com, Feb. 1998.
"Austin Film Festival Calls for Entries in Screenplay, Film Competitions", Feb. 4, 1998, retrieved from www.writenews.com/1998/020498.htm.
Bernstein, A., "Sure, It's Schlock, But 50 Bucks is Still 50 Bucks", Chicago Tribune, Feb. 24, 1997.
"Disney Channel Rolls Out Third Annual Create Story Magic Campaign; Target and Disney Press on Board for Promotion", PR Newswire, Sep. 16, 1998.
Edwards, P. et al., "Selling a Bright Idea / An Engineer Takes on the Might of Telecom / How the Law Can Protect Your Idea", Rydge's, Sep. 1987.
Filmfestivals.com, 1995-1998.
Gramm, G., "The Idea Marketplace—A Concept Whose Time Has Come", Advertising Age, Sep. 23, 1974.
Hollywood Film Festival, Welcome to the Hollywood Film Festival, Oct. 14-19, 1997, retrieved from web.archive.org/web/19971222142838/hollywoodawards.com/index.html.
Killeen, W., "Net Result: The Play's The Thing Troup in Salem Finds Its Writers with Its Web Site", Boston Globe, Jan. 11, 1998.
Laughing Horse Productions ListServ, Jan. 13, 1997, retrieved from https://listserv.ua.edu/cgi-bin/wa?A2=ind9701b&L=screen-I&O=A&X=6FE773356A915940B5&P=9968.
Meehan, R.H., "Programs That Foster Creativity and Innovation", Personnel, Feb. 1986.
Nantucket Film Festival, May 1998.
Rose, L., "Web Sites Let Amateurs Team for Film Scripts", The Plain Dealer, Dec. 16, 1998.
Rose, L., "Internet Contest Lets Amateur Scriptwriters Team Up With Hollywood Pros", Newhouse News Service, Dec. 28, 1998.
Sandelands, E., "Utilizing the Internet for marketing success", Pricing Strategy and Practice, vol. 5, No. 1, 1997, pp. 7-12.
Schorr, J., "Smart thinking: eight programs that help you think creatively and plan effectively", Macworld, vol. 11, No. 5, May 1994, pp. 138(5).
"The Screenplay Challenge 1", Apr. 21, 1999.
"Screenplay Contest Coming Up", The Commercial Appeal, Nov. 28, 1997.
"Screenwriters Get Their Big Break Online; roughcut.com's Screenplay Challenge Launch Draws Over 1000 Web Savvy Screenwriters", PR Newswire, Sep. 16, 1998.
Siadat, B., "Technology Delivery Challenges at W.R. Grace", Research-Technology Management, vol. 39, No. 5, Sep./Oct. 1996.
The Spec Script Library, Jan. 1997.
Swackhamer Peace Essay Contest, 1997-1998.
"Teen Rap_Teen Scene", Boston Herald, Oct. 3, 1995.
"TNT's Rough Cut Online Announces Screenplay Challenge", May 26, 1998, retrieved from www.writenews.com/1998/052698.htm.
"TNT roughcut.com's Screenplay Challenge Gives Web Users a Chance to Collaborate On-line With a Top Hollywood Screenwriter", PR Newswire, Oct. 29, 1998.
Weaver, R., "HPU Director Places in Screenplay Contest One of America's Best", Greensboro News Record, Mar. 10, 1994.
www.moviebytes.com, Feb. 22, 1999.

* cited by examiner

REVENUE-GENERATING ELECTRONIC MULTI-MEDIA EXCHANGE AND PROCESS OF OPERATING SAME

RELATED APPLICATION

This application is a continuation of prior application Ser. No. 11/978,781, filed on Oct. 30, 2007, which is a continuation of prior application Ser. No. 10/536,169, filed on Dec. 7, 2007, now U.S. Pat. No. 8,090,605, which is a continuation of prior application Ser. No. 09/565,438 filed on May 5, 2000, now U.S. Pat. No. 7,308,413, which is incorporated herein by reference in its entirety, and further claims priority from provisional application Ser. No. 60/133,247, filed May 5, 1999.

BACKGROUND OF THE INVENTION

The present invention relates to the creation and distribution of media content such as television programming, movies, music and the like. More particularly, the present invention relates to a process for creating media content based upon submissions received on an electronic multi-media exchange.

The ever important influence of the Internet is evident from the following reports and statistics. According to a recent report, the number of Internet users in North America is approximately 92 million and it is estimated that 350 million people will be on the Internet by the year 2003. The growth of the Internet has been largely understated when considering that in June of 1993 there were a mere 130 web sites compared to more than 650,000 sites by the end of 1997, according to Jupiter Communications, a New York Media Research firm. In March of 1999, Network Solutions, having a U.S. franchise to dispense web addresses, registered its four millionth Internet domain name.

The Internet has reached farther and faster than any previous communications technology. It took 35 years for radio to reach 50 million listeners. Television needed 13 years to reach that number. In comparison, it took the Internet only 4 years to reach 50 million people (Cisco System Annual Report, 1998).

The Internet has fundamentally changed the way we communicate. It is estimated that 85% of the United States homes connected to the Internet use e-mail frequently, according to International Data Corporation (USA Today, Jun. 16, 19998). Individuals worldwide are taking classes, shopping for gifts, writing to their grandchildren, planning vacations, and buying everything from cars to homes using the Internet. According to Activmedia, e-commerce generated nearly one hundred billion dollars in revenue in 1999. It is estimated that electronic commerce (e-commerce) is expected to surge to more than one trillion dollars by the year 2003. According to an April, 1999 study by CommerceNet and Nielsen Media Research, the number of online consumers jumped 40% to 28 million over a nine month period.

According to a Navidec survey, 53% of Internet consumers in the United States made an on-line purchase within the first half of 1999, spending an average of $206 per purchase. This compares to just 26% of United States web users that purchased online in 1997. Cars and car parts (18.2 million shoppers), books (12.6 million shoppers), computers (12.4 million shoppers), clothing (11.6 million shoppers), and CD's/videos (11.4 million shoppers) top the list of items shopped for online.

It has been found that the incredible growth of the Internet is directly vying with television for limited household leisure time. A study conducted by the new Nielsen Media Research states that homes that have the Internet and on-line services are watching 15% less television than other homes (USA Today, Aug. 13, 1998). Television networks are increasingly having to face the future and prepare for the convergence of television and the Internet. This has recently been manifested by NBC's purchase of a major share of C-NET and ABC's purchase of a major share of the Internet search engine Infoseek.

The television industry finds itself having to grapple with its ability to attract viewers as technology offers unlimited avenues of entertainment. Furthermore, concerns for quality and new innovative approaches to programming have dampened the creative integrity of the medium. While consumers have a vast litany of channels to choose from, most of the programming is either recycled or lacks the creative freshness to stimulate consumer appeal. For example, the majority of prime time television shows have between eight to twelve writers based on budget or design. On average, each writer typically produces four to six quality ideas for their respective television show. For instance, today writers start with a pen and blank sheet of paper and it is incumbent upon them to generate a number of episodes from a single mind's creative ingenuity, inferences and real life experiences. Within this limited pool of ideas, it becomes a difficult challenge to produce twenty-four episodes per season with the same level of production quality.

Creating fresh ideas for weekly episodes is and has always been the writing team's biggest challenge, even if the show has a strong cast and original concept. Thus, a great number of television shows lack the creative frame of reference to produce consistent quality weekly episodes. Therefore, a growing number of television shows fail each year because they lack both a fresh concept and the creative frame of reference to produce consistent quality weekly episodes. Other media such as the movie, magazine, newspaper, and music industries all face similar challenges.

There are many people who have created books, screenplays, comic strips, songs, etc. and probably even more people who have thought of an idea for such media whose ideas are not currently being used. These individuals would like to expose their ideas to the appropriate media industry. Presently, this is done by directly contacting a media company in the industry and then mailing the media content to the company and waiting to hear if the company likes the idea and would like to use or purchase it. This requires an enormous amount of time and energy on behalf of the artist in making contacts and sending the materials to the right contacts. It also is a logistical nightmare for the media companies who are bombarded with scripts, songs and other artistic submissions which must then be sorted through before determining which, if any, of the submissions meet their needs.

There currently exist open exchanges for many items such as futures, stocks and bonds. Other exchanges specialize in the sale of information, such as that provided by Lexis/Nexis. The exchange's main function is to support a marketplace for the buying and selling of the goods and services. The exchange's main role is to serve as a structured meeting ground for the negotiation of the good or service provided. Currently, there does not exist a means of bringing artistic media works together in an open exchange format for searching, viewing and/or purchase in one convenient location.

Accordingly, there is a need for a process which facilitates the convergence of the technologies of media, such as television, and the Internet. What is also needed is a process which will allow media end users to interact with the creators of the media to grant a means of providing the media creator with creative submissions from the end users which can be selected and adapted for inclusion in the media content. The process should preferably reward the end user for his or her submission and participation with the process so as to create interest and enthusiasm in the media content. What is further needed is an open exchange wherein submitted media works and ideas can be conveniently searched for and viewed for use or purchase by third parties. The present invention fulfills these needs and provides other related advantages.

SUMMARY OF THE INVENTION

The present invention resides in a process for creating media content based upon submissions received on an electronic multi-media exchange.

In a preferred embodiment, the present invention includes a system of end user interfaces (for either members/submitters, creators, or third party end users), and a central controller having associated databases. The present invention provides a networked system to submit forms of either protectable or non-protectable content material which may be transformed in the same form or adapted into multi-media content for distribution. In particular, any form of content material that may be stored in file text, video, audio, etc. and transferred through the network system described herein. Such content material applicable to the present invention may include, but is not limited to the following: movies, screenplays, television scripts, book manuscripts, plays, music, music lyrics, newspaper and magazine articles, comic stripes, sweepstakes, print media like calendars, greeting cards, novelty items, digital photographs, etc. as well as any other form of literary work or idea that might be non-protectable or protectable through either copyright, trademark, or patent rights.

Submitters receive credits for their contributions and can receive awards and compensation through submission awards campaigns or through an open exchange. The networked system supervises the request and distribution of submissions to creators, provides a search mechanism for content material selection, stimulates an end user interest through contest and points awards campaigns, and can allow third party access to request and/or purchase submissions through the open exchange. Thus, a person looking to submit content material can do so in a simple, cost and time effective manner and may be compensated for their participation.

It is also the intention of the present invention to provide an e-commerce model where content distributed over television or the Internet will provide a gateway to purchasing products and services displayed or audibly presented during the content presentation. The e-commerce embodiment will enable viewer purchases to occur either on the creators web site through recreated models or right off the screen of television or Internet presentations through the use of clickable video and a mouse or remote. This is enabled through digital technology which might entail set-top box technology for the conversion of analog television broadcast to a digital format. A masking technique overlays the video production to both identify and display those items available for promotion and/or purchase.

The process of the invention generally comprises the steps of first requesting media submissions for inclusion in the media content. End users interface with a creator serviced system utilizing a computer network. Submissions are electronically received from the end users. One or more electronic submission formats are typically provided to the end user. For example, the submission format can be an interactive format which includes at least one of pre-prepared, fill-in-the-blanks, questions and answers, polls, surveys and games. Alternatively, the submission format is an open format wherein the end user submits original media material such as scripts, music etc. The submission material, which can comprise anything which can be stored in an electronic file or digitally transferred, is stored in a computer database.

The end user, now the submitter, is granted a predetermined number of points for the submission. The points can be redeemed for entry into a sweepstakes or for the purchase of prizes. The end user can elect to purchase products presented within released content with the points. These products can also be offered for cash or credit card sale.

The end user can be offered intellectual property protection information so that the end user can protect his or her submission material, or have the services offered through the creator service provider or directed to an appropriate provider of such services.

The submissions are searched for submission material which is intended to be included in the media content. The desired submission material is cross-checked against the other submissions for originality and timeliness before selecting the submission. The end user is then notified that his or her submission has been selected. All end users can check the status of their submissions to see if their submission has been reviewed and/or by the creator.

After the material is selected from the one or more submissions, the content is developed based, in whole or part, upon the selected one or more submissions. This can occur by communicating with the end user and working with the end user to adapt his or her submission material for use in the media content.

After the content has been developed, it is released to an audience which includes end users for review. The end user's whose submission material was included in the released content are rewarded.

Preferably, end users of the audience rate the released content. Those end users who submitted material in the open format were entered into a contest. A reward may be given to one or more end users based upon a high rating of the released content which included the user's material.

In a particular preferred embodiment, the submissions can be made available to an open exchange. Third parties are permitted to access and search the submissions on the open exchange as determined by the creator service provider. The third parties can bid for rights in particular submissions on the open exchange. After receiving these bids, they are forwarded by the creator service provider to the particular submission's end user. The invention can provide agency and sales services which promote the submitter's material. A billing system can be provided for use by the third parties and end users of the open exchange for transacting payment and billing. The billing system can also be used by the creator service provider in billing either third parties or end users for services rendered or in paying end users for their selected submissions.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

The terms content or interactive content are used in the following description to broadly apply to any form of deliverable content or media that may be either broadcast or distributed to entertain, instruct, or deliver some form of message. Although television and the Internet embody the preferred form of media of the present invention, the scope of the invention is applicable to all forms of media whether printed, broadcast, projected or performed. With the advent of the Internet and the building of the broadband communications network, content will be delivered through many different evolving multi-media technologies, all of which come under the object of this invention. For example, analog and digital television, the Internet, and satellite and broadband communications are some of the channels for delivering content as presented by this invention. Moreover, as television and the Internet become indivisible, the applications of the present invention will apply to the rapidly evolving interactive media of the new millennium.

The method and apparatus of the present invention will now be discussed.

Network System Architecture

Figure 1:
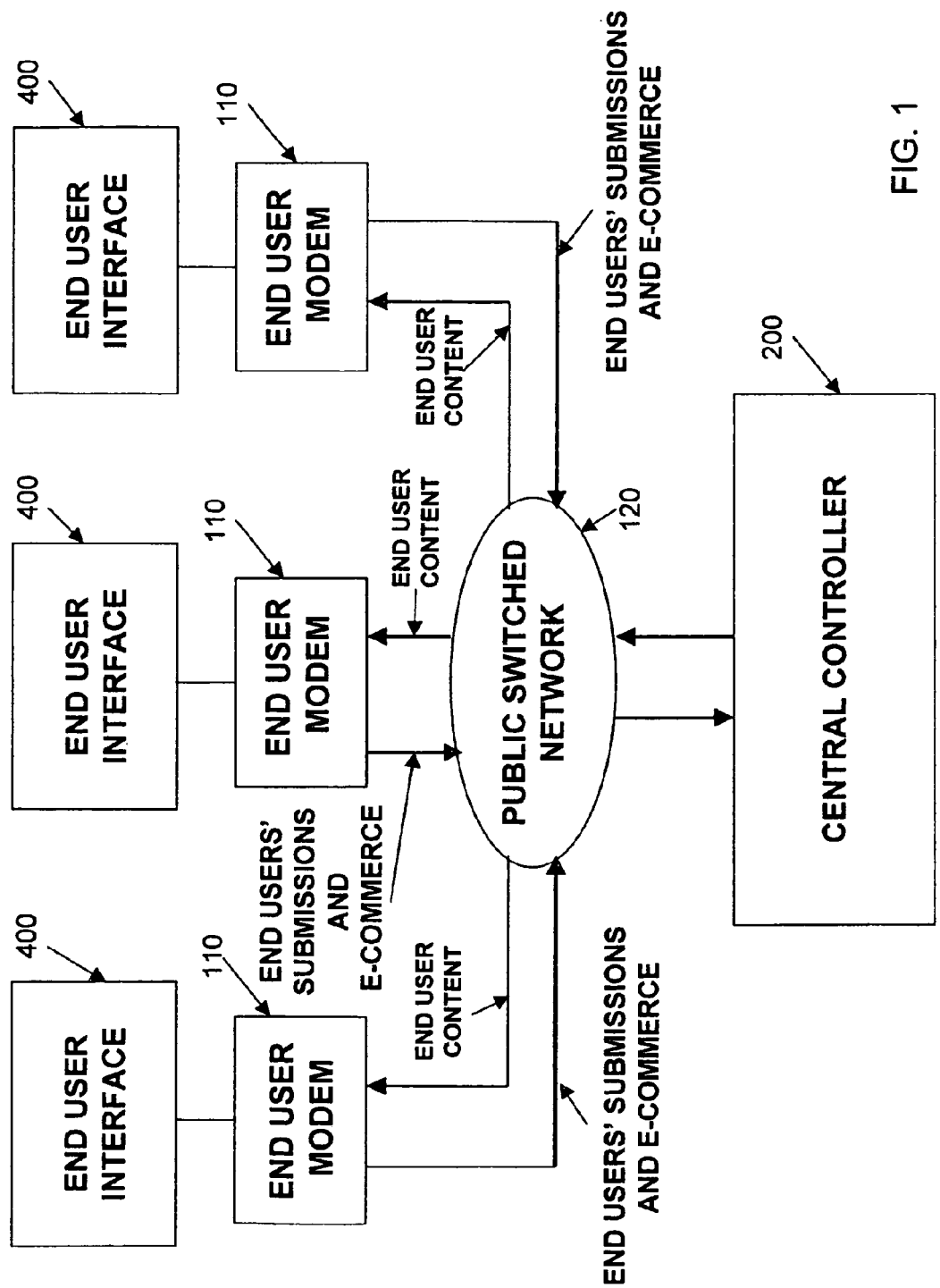
FIG. 1 is a block diagram showing a creator central controller electronically connected to various end user viewer interfaces via a network.

The system architecture of a preferred embodiment of the apparatus and process of the present invention is illustrated in FIGS. 1-4. As shown in FIG. 1, the system architecture of the present invention generally comprises a central controller 200, end user viewer interfaces 400 (collectively the "nodes"). Each node is typically connected to the central controller 200 via an Internet connection, such as a modem 110, using a public switched phone network 120, such as those provided by a local or regional telephone operating company. Connection may also be provided by dedicated data lines, cellular, personal communication systems ("PCS"), microwave, or satellite networks. Interfaces 400 are the input and output gateways for communications with central controller 200.

Using the above components, the present invention provides a method and apparatus to request desired content material, receive content material submissions from registered members, search and cross-check desired material, stimulate participation through content awards and points campaigns, and allows third party access to request and/or purchase submissions through an open exchange embodiment, as further described herein. Through the method and apparatus of the present invention, creators and third party end users end users can efficiently request and/or search for desired content materials and submitters are compensated through numerous ways presented herein for such submissions.

Figure 2:
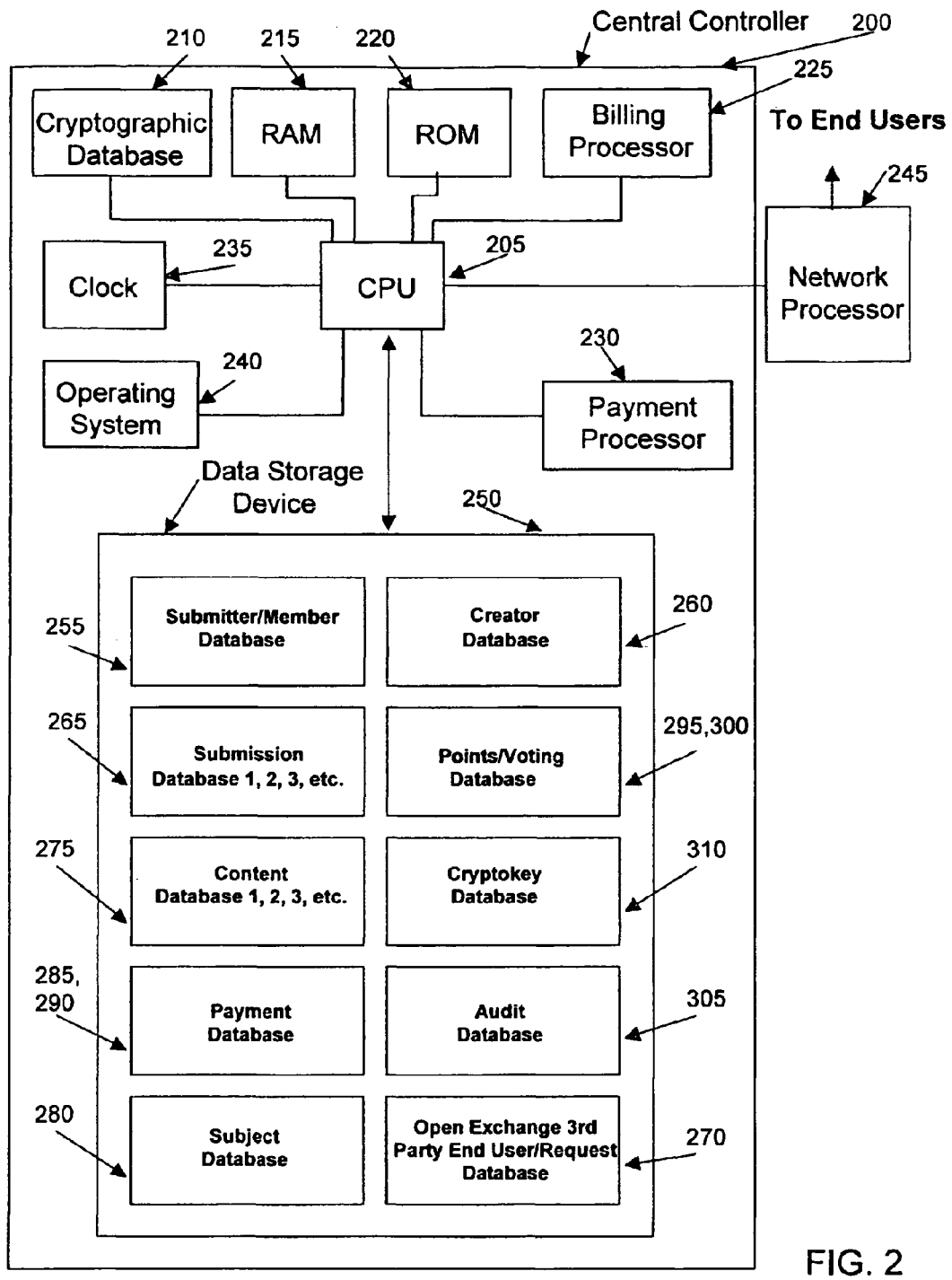
FIG. 2 is a block diagram of an embodiment of the central controller of FIG. 1, utilized in accordance with the present invention.

As shown in FIG. 2, central controller 200 includes central processor (CPU) 205, cryptographic processor 210, RAM 215, ROM 220, billing processor 225, payment processor 230, clock 235, operating system 240, network interface 245, and data storage device 250. A conventional personal computer or computer workstation with sufficient memory and processing capability may be used as central controller 200. In a preferred embodiment the central controller 200 operates as a web server, both receiving and transmitting data inquiries generated by end users. The central controller 200 must be capable of high volume transaction processing and performing a significant number of mathematical calculations in processing communications and database searches. A Pentium microprocessor, commonly manufactured by Intel Inc., may be used for CPU 205.

A microcontroller, commonly manufactured by Motorola Inc., may be used for cryptographic processor 210. Equivalent processors may also be used. Cryptographic processor 210 supports the authentication of communications from the creators, third parties and submitters/members as well as allowing for anonymous transactions. Cryptographic processor 210 may also be configured as part of CPU 205. Other sample commercially available specialized cryptographic processors include VLSI Technology's 33 MHz 6868 or Semaphore Communications' 40 MHz Roadrunner 284.

Referring again to FIG. 2, billing processor 225 and payment processor 230 comprise conventional microprocessors (such as the Intel Pentium), supporting the transfer and exchange of payments, charges, or debits, attendant to the method of the apparatus. Either processor 225 or 230 may also be configured as part of CPU 205. Processing of credit card transactions by these processors may be supported with commercially available software, such as the Secure Web-server manufactured by Open Market, Inc. This server software transmits credit card numbers electronically over the Internet to servers located at the Open Market headquarters where card verification and processing is handled. Their Integrated Commerce Service provides back-office services necessary to run Web-based businesses. Services include online account statements, order-taking and credit card payment authorization, credit card settlement, automated sales tax calculations, digital receipt generation, account-based purchase tracking, and payment aggregation for low-priced services.

Data storage device 250 may include hard disk magnetic or optical storage units, as well as CD-ROM drives, flash memory or other nascent memory devices with future commercial application. Data storage device 250 may contain this representative storage configuration for processing the necessary transactions for the present invention, including submitter/member database 255, creator/third party database 260, submission databases 1, 2, 3, etc. 265, request databases 1, 2, 3, etc. 270, content databases 1, 2, 3, etc. 275, subject database 280, billing database 285, payment database 290, points 295, voting/survey database 300, audit database 305, and cryptographic key database 310. More than one database per function may be needed to facilitate the expensive nature of the application, i.e. submission databases 1, 2, 3, etc. depending on the many different types of submissions received. It is important to note, the configuration presented is representative in nature and the actual configuration will depend on the specific application of the present invention. In a preferred embodiment database software such as Oracle7, manufactured by Oracle Corporation, is used to create and manage these databases.

Member/submitter database 255 maintains data on all the registered members and more specifically those who have made submissions, such as name, address, private key information, e-mail addresses, physical addresses, payment preferences, voice mail addresses, member profile, biographies, past submissions, respective subject areas of submissions and the like. Member profile includes, instructional page acceptance, disclaimer acceptance, prior submission bids accepted, submission rights sale rates, automatic bid amounts, acceptable price ranges, and the like. Member/submitter database 255 may include rating information generated by end users, as well as member address, which is used to direct communications to the member. Member address comprises a phone number, web page URL, bulletin board address, pager number, telephone number, e-mail address, voice mail address, facsimile number, or any other way to contact the member either synchronously (such as telephone or chat-room) or asynchronously (such as e-mail or postal mail). Member/submitter database 255 also stores all bid responses and bid counter offers generated by the submitter. Advertising data generated by the member/submitter may also be stored in this database. Depending on the application of the present invention and the specific storage preferences for members and/or submitters, this database configuration may require a separate database structure for members and submitters.

Creator/third party database 260 maintains data on all creators or third party end users, such as name, address, phone number, ID number, e-mail address, payment preferences, past system usage, private key information, etc. It also contains creator/third party end user profiles, which stores preferences, membership acceptance, disclaimer acceptance, acceptable price levels, bid amounts, and the like. It also contains copies of each bid offer and bid counter offer generated by the third party end user, as will be explained further herein. Depending on the application of the present invention and the specific storage preferences for creators and third party end user, this database configuration may require a separate database structure for creators and third party end users.

Submission databases 1, 2, 3, etc. 265, may include more than one database depending on the different forms of submissions, includes content material submissions received by central controller 200 and indexed by subject. A unique tracking number is also stored for each submission. The submission database 265 also stores the submitter's name(s), as well as the time and date of the submission. Submissions may be transferred through mediums such as, but not limited to e-mail, postal mail, telephone, fax, voice mail, IVRU (Interactive Voice Response Unit), voice recognition technology (such as SpeakEZ), beeper, web page URL, electronically transferred text, pictures, audio, video, etc. and through other communication transfer devices either digital, like PDA's, as well as non-digital.

Request database 270 includes all creator or third party end user content material request received by central controller 200 and indexed by subject. A unique tracking number is also stored for each request. The request database 270 also stores the requester's name(s), as well as the time and date of the request.

Content databases 1, 2, 3, etc. 275, may include more than one database depending on the different forms of content archived, includes both content material kept in form and content material adapted into multi-media that is received by the central controller 200, indexed by subject and distributed. The content is then given a unique tracking number, and the content and its title are stored, along with the time and date of its release.

Subject database 280, maintains all of the categorical data either provided by submitters or requested by creators or third party end users for the submission or request for content material. This database can also be used to store submissions which are being developed into content by the creator.

Billing database 285 and payment database 290 track all commercial transactions, as well as payment and billing preferences. These databases are valuable in the event of complaints by both submitters and third party end users regarding payment, because an audit trail can be produced.

Points database 295 maintains an up to date point total displayed in real time on the Internet or other electronic communications device of a member's point accumulations for their interactive participation. The points may be used to enter sweepstakes, or purchase cash and other merchandise awards and the like.

Voting/survey database 300 maintains the voting register of members/peoples voting and rating of distributed content. This database may also be used to perform other survey functions for either content rating or interactive feature content submissions.

Audit database 305 stores transactional information that may be retrieved for later analysis. Due to the legal liability of submitting either protectable or non-protectable content material, a electronic paper tail is necessary for storing and tracking both submission and request file utilization by anyone connected to the network, approved or unapproved. Text data from chat rooms may also be stored in this database, for audit by creators and/or third party end users.

In order to facilitate cryptographic functions, there is cryptographic key database 310 which stores both symmetric and asymmetric keys. These keys are used by cryptographic processor 210 for encrypting and decrypting all content material submissions and creator or third party end user request, as well as message traffic such as bid amounts and acceptances of offers. It should be understood that the above described databases are representative only. Databases may be added or substituted as necessary in order to accomplish the intended processes of the present invention.

Network interface 245 is the gateway to communicate with members/submitters and creators and/or third party end users through their respective interfaces. Conventional internal or external modems may serve as network interface 245. Network interface 245 supports modems at a range of baud rates from 1200 upward, but may combine inputs into such as a T1 and T3 (or OC1, OC2, and OC3) line if more bandwidth is required. In a preferred embodiment, network interface 245 is connected with the Internet and/or any of the commercial online service providers such as America Online, CompuServe, The Microsoft Network, or NetZero allowing end users access from a wide range of online connections. Several commercial e-mail servers also include the above functionality. NCD Software manufactures "Post-.Office", a secure server-based electronic mail software package designed to link people and information over enterprise networks and the Internet. The product is platform independent and utilizes open standards based on Internet protocols. Users can exchange messages with enclosures such as files, graphics, video and audio. The system also supports multiple languages. Alternatively, network interface 245 may be configured as a voice mail interface web site, BBS, or e-mail address.

Figure 3:
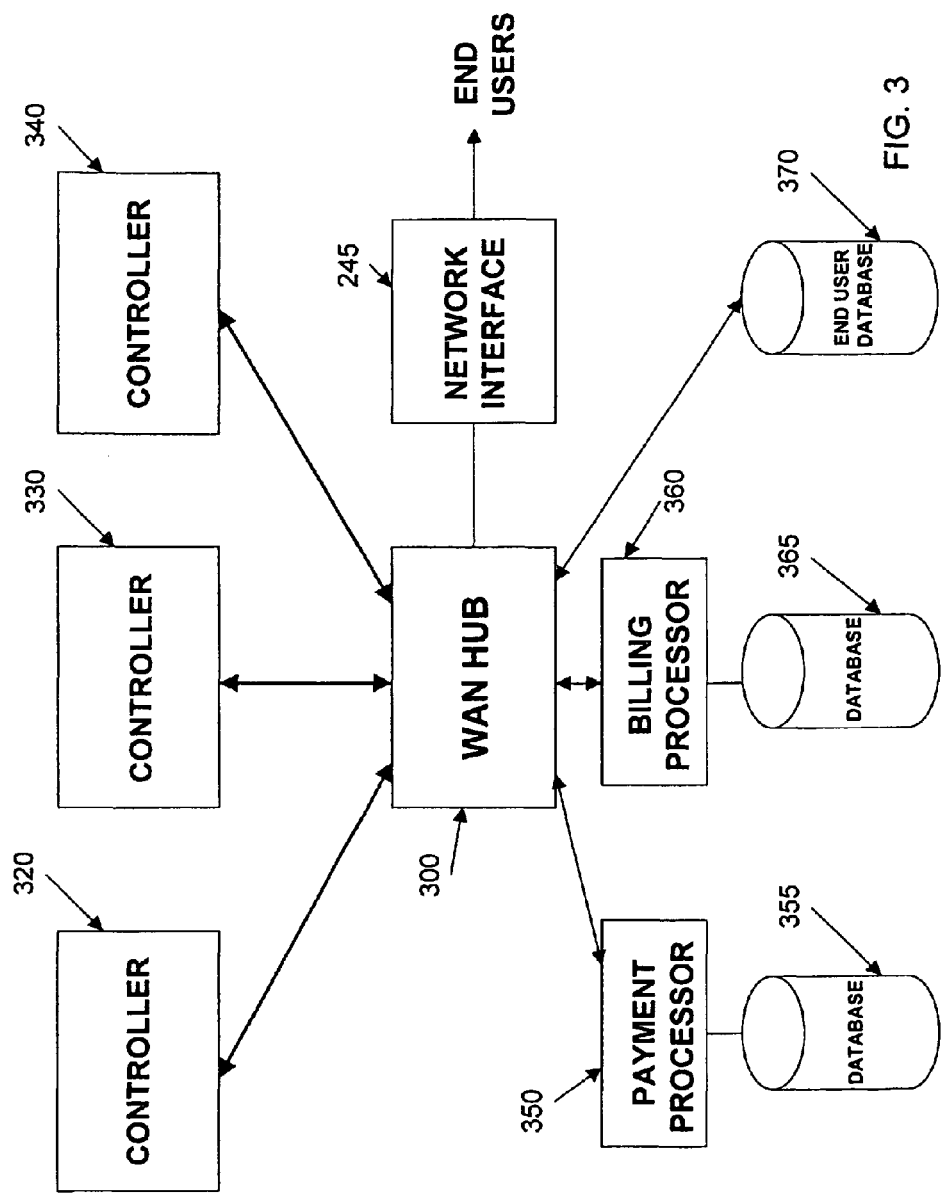
FIG. 3 is a block diagram illustrating computing resources of the central controller of FIG. 1 being distributed over a number of servers.

While the above embodiment describes a single computer acting as the central controller, those skilled in the art will realize that the functionality can be distributed over a plurality of computers. In another embodiment, central controller 200 may be configured in a distribution architecture, as shown in FIG. 3, wherein the databases and processors are housed in separate units or locations. Controllers 320 through 340 perform the primary processing functions and contain at a minimum RAM, ROM, and a general processor. Each of these controllers is attached to WAN hub 300 which serves as the primary communication link with the other devices. WAN hub 300 may have minimal processing capability itself, serving primarily as a communications router. Although only three controllers are shown in this embodiment, those skilled in the art will appreciate that an almost unlimited number of controllers may be supported. In such a configuration, each controller is in communication with its constituent parts, but the processor and/or data storage functions are performed by stand-alone units. Payment processor and database 350 and 355, billing processor and database 360 and 365, and end user database 370 all communicate through WAN hub 300 with controllers 320 through 340. This arrangement yields a more dynamic and flexible system, less prone to catastrophic hardware failures affecting the entire system.

Figure 4:
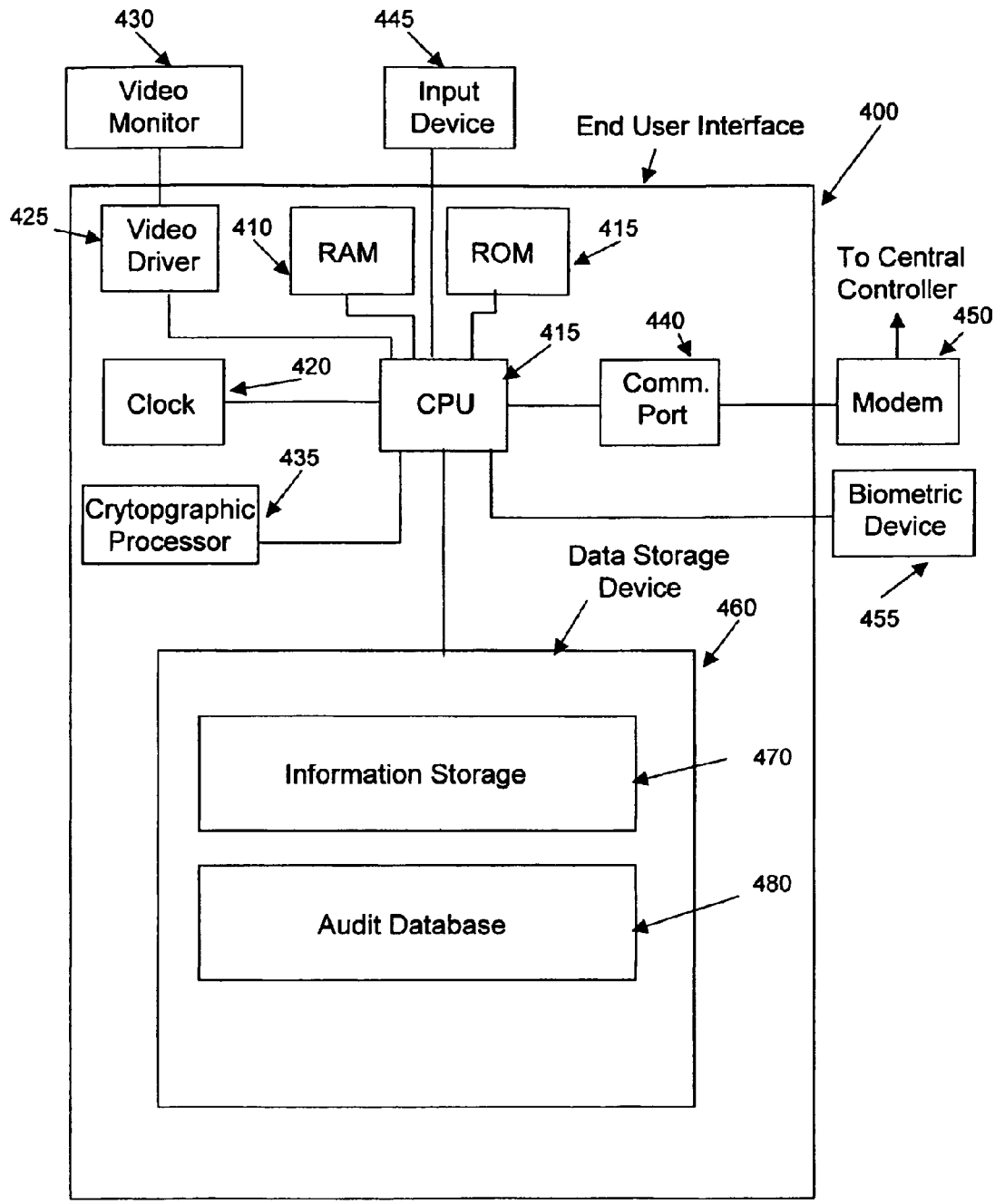
FIG. 4 is a block diagram showing an exemplary end user system interface.
Figure 5A:
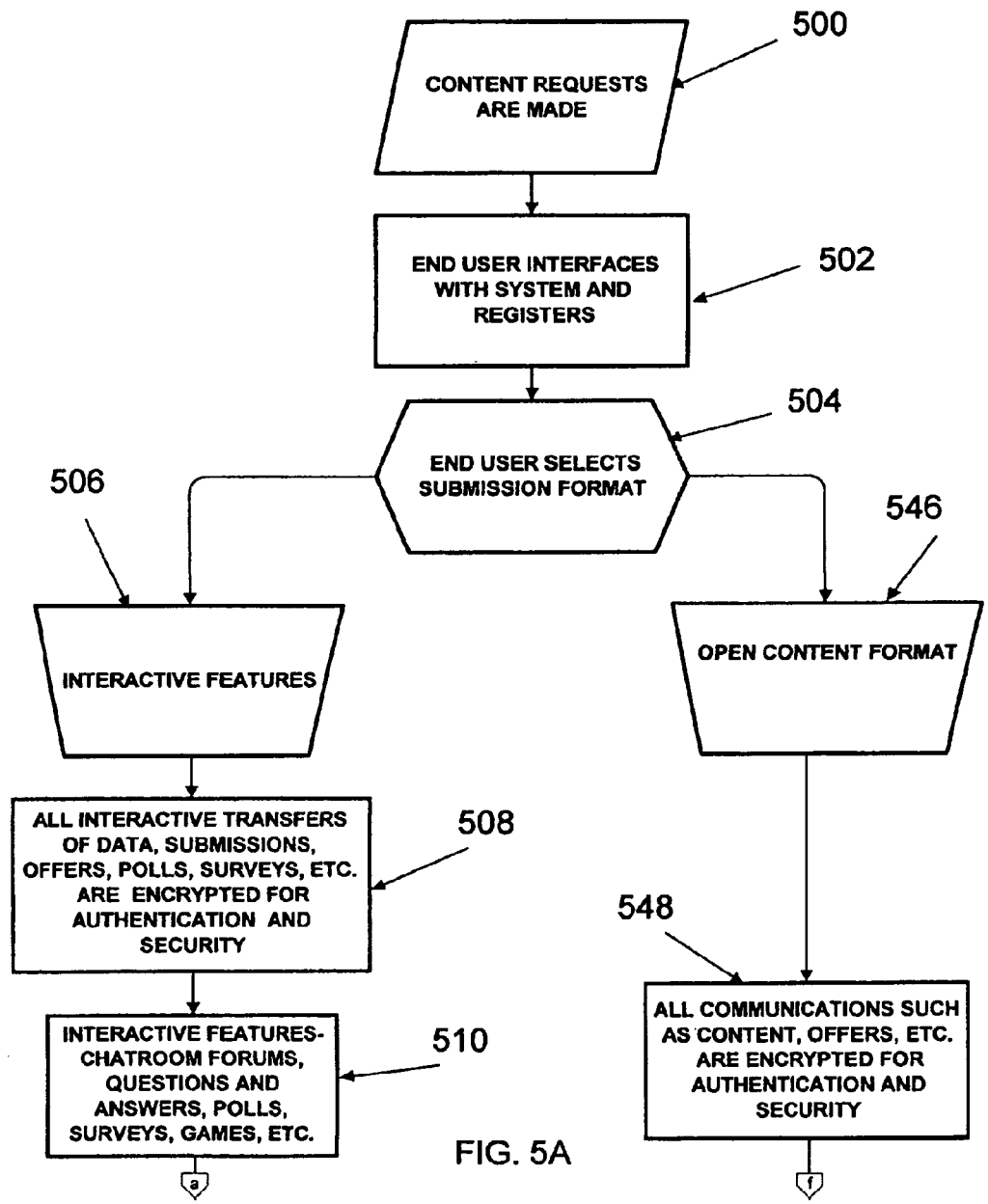
FIGS. 5A-5D are flowcharts illustrating general steps of the process of the present invention.
Figure 5B:
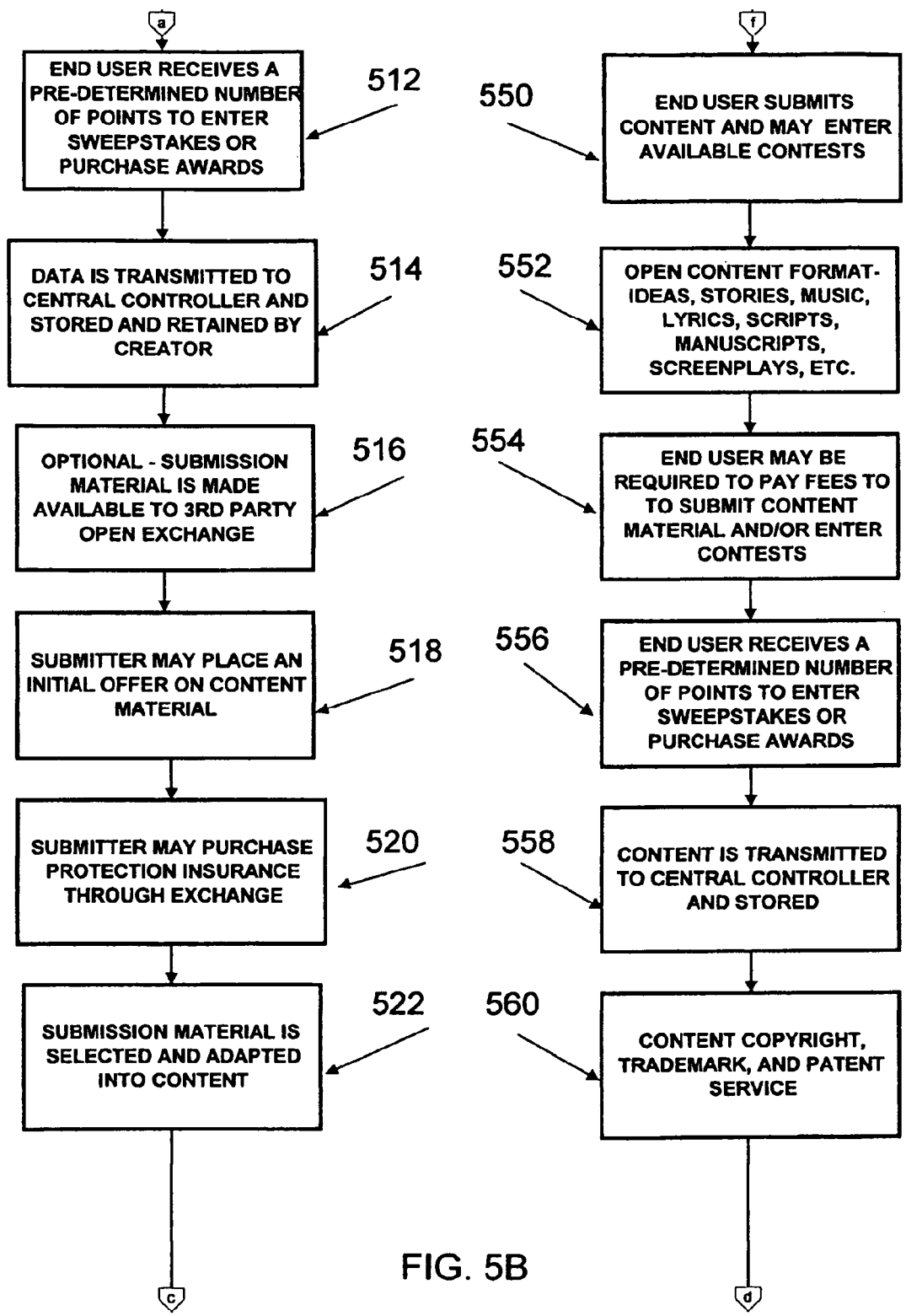
Figure 5C:
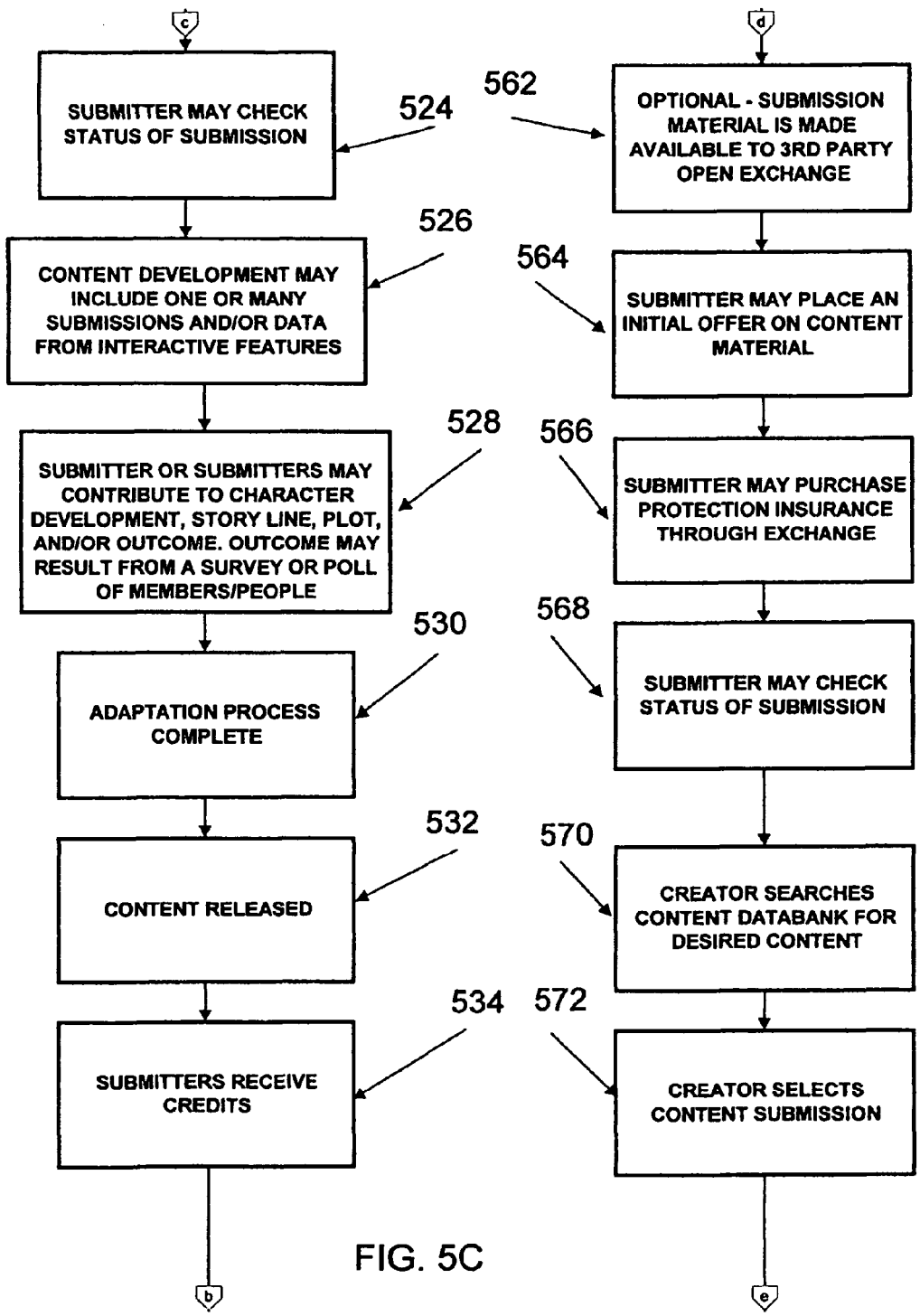
Figure 5D:
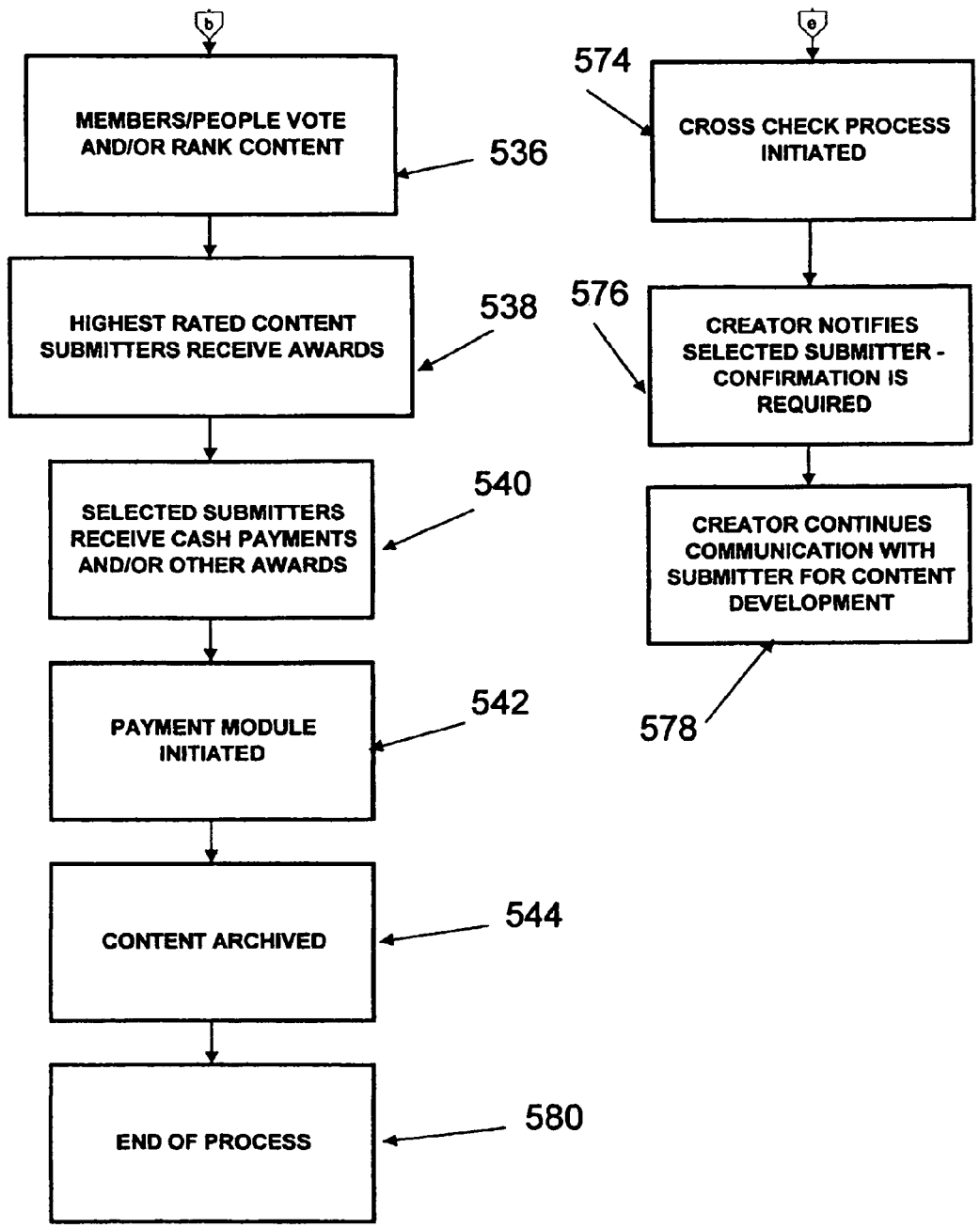
Figure 6A:
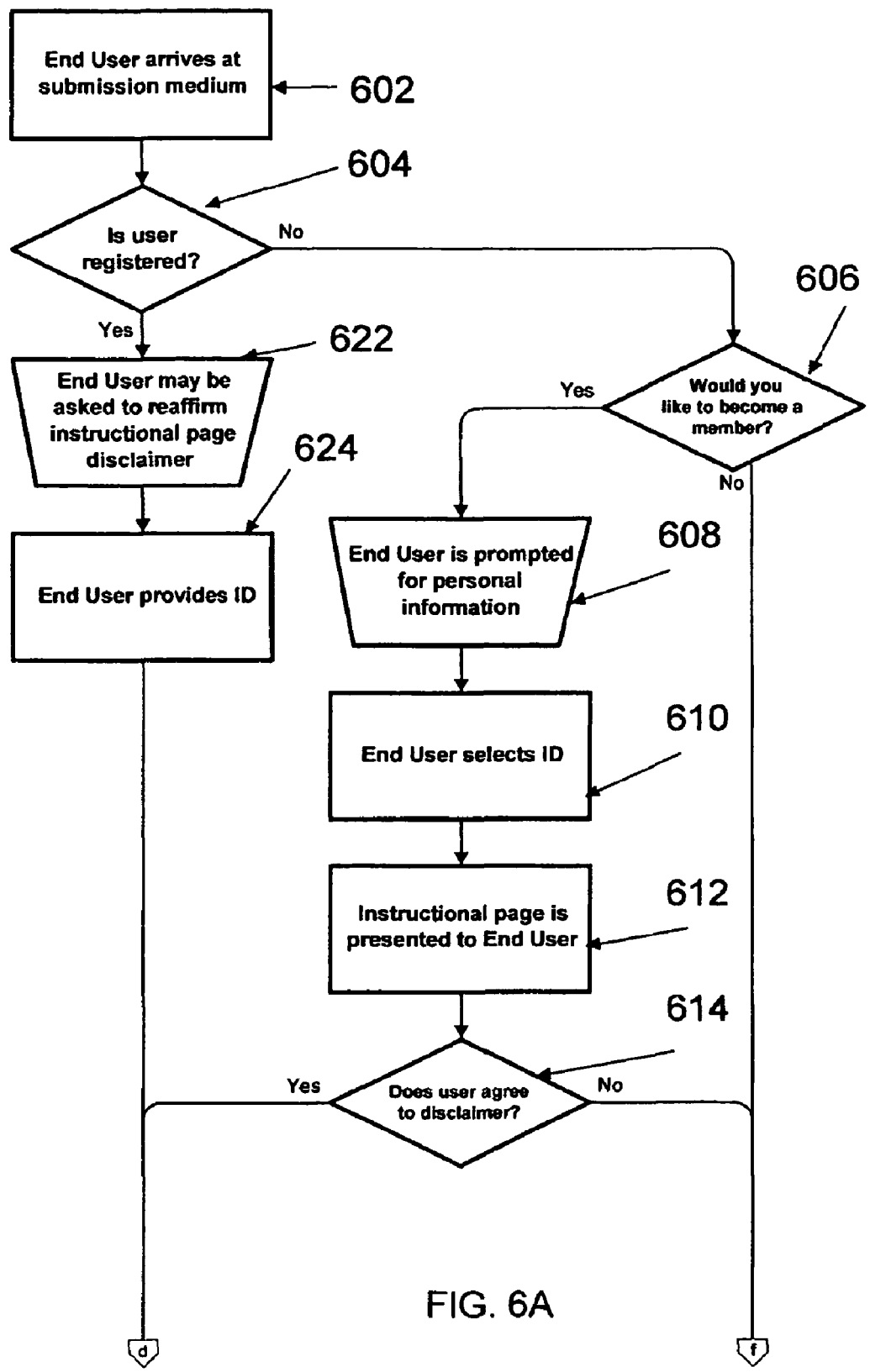
FIGS. 6A and 6B are flowcharts illustrating registration steps taken in accordance with the present invention.
Figure 6B:
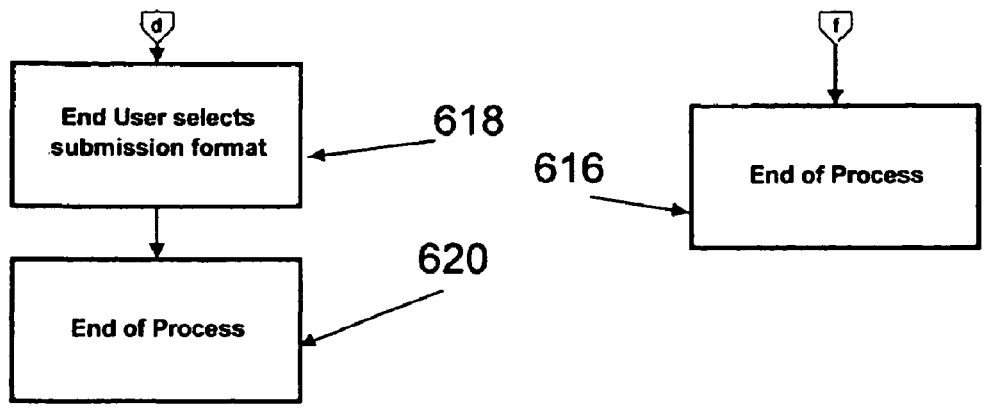

FIG. 4 describes the architecture of interfaces 400 for members/submitters, creators and/or third party end users. In an exemplary embodiment the interfaces comprise conventional personal computers having an input device, such as a keyboard, mouse, or conventional voice recognition software package; a display device, such as a video monitor; a processing device such as a CPU; and a network interface such as a modem. Alternatively, interface 400 may also comprise voice mail systems, or other electronic or voice communications systems. As will be described further, devices such as fax machines or pagers are also suitable interfaces.

The interface architecture 400 typically includes a central processor (CPU) 405, RAM 410, ROM 415, clock 420, video driver 425, video monitor 430, communication port 440, input device 445, modem 450, and data storage device 460. Cryptographic processor 435 and even biometric devices 455 may be added for stronger authentication as described later. A Pentium microprocessor such as the 100 MHz P54C described above may be used for CPU 405. Clock 420 is a standard chip-based clock which can serve to time-stamp either submissions or requests produced with interface 400. If a cryptographic processor is required, the MC68HC16 microcontroller described above can be used. The structure of a biometric device will be described below in conjunction with the cryptographic authentication embodiment. Data storage device 460 is a conventional magnetic based hard disk storage unit, such as those manufactured by Conner Peripherals. Information storage database 470 may be used for archiving purposes while audit database 480 may be used for recording communications with central controller 200 as well as payment records.

There are many commercial software applications that can enable the communications required by interface 400, the primary functionality being message creation and transmission and electronic file transfer text, video, audio, etc. Eudora Pro manufactured by Qualcomm Incorporated, for example, provides editing tools for the creation of messages as well as the communications tools to route the message to the appropriate electronic address.

The Process of the Invention

While the preferred embodiment focuses on a television application for the present invention, this exemplary description may be representative of any medium that distributes content and/or media as described above. Additionally, the convergence of television and the Internet to form an interactive medium renders the present definition of television as too narrow in scope to adequately encompass the invention. As discussed herein, the word television will serve to represent all forms of analog or digitally transferred audio and video presentations, whether broadcast over cable, satellite, or the Internet. This includes all interactive formats broadcast over the Internet or traditional television through the use of set-top box technology, interactive television, or other digital devices.

It should be noted that the terms referenced for the participants of the present invention member, submitter, creator, and third party end user may be used to refer to one or many in the context of the application.

Referring now to FIGS. 5A-5D, the process of the present invention is generally illustrated. Through the use of the system architecture discussed in FIGS. 1-4, at step 500 creators or third party end users may request content material to develop content, either maintaining its form or adapting it to a desired media. Content material request will preferably be transmitted through interactive television or over the Internet through a web destination, e-mail, IM (Instant Message), chatroom, or other present synchronous or asynchronous Internet protocol or developing Internet communications as described below. Alternatively, material content requests may include but are not limited to paper mail, telephone, IVRU (Interactive Voice Response Unite), fax, beeper, etc.

In response to the content request in step 500, end users interface with the system and register at step 502. At step 504, the end user selects a submission format. If the end user selects the interactive submission feature in step 506, the end user responds to surveys, polls, fill-in-the-blanks, question and answers, games etc. prepared by the creator and/or third party end user and which are encrypted for authorization and security as illustrated in steps 508 and 510 and more fully described below with respect to FIG. 10.

The end user submitter receives a pre-determined number of points in step 512 for the submission which can be accumulated and traded to enter a sweepstakes or purchase other prize awards. The awards or sweepstakes can include items which are the subject of the medium content, for example a music CD, or a product shown on the subject television program.

In step 514, the data containing the submission is transmitted to the central controller and stored and retained by the creator. The submission material may be made available to a third party open exchange in step 516 for use and/or purchase by third parties as more fully described herein with respect to FIG. 20. As part of this process, in step 518 the submitter or creator may place an initial offer or beginning bid price on the content material. Although the submission material is password and otherwise encrypted, in step 520 the submitter may purchase protection insurance through the open exchange.

After receipt and storage, in step 522 the submission material is selected by the creator and adapted into content. The submitter may check the status of his or her submission at any time after submission in step 524 by inquiring the central controller 200 of its status. The central controller 200 tracks the submission by logging the date and time the submission was received, assigning a password or other encryption information, and whether the submission has been reviewed and selected by the creator or not. The content development may include one or more submissions and/or data from interactive features according to step 526. In step 528, the submitter or submitters may, in conjunction with the efforts of the creator, contribute to the development, story line and/or outcome.

Once the development and adaptation process is completed, step 530, the content is released to the audience for review per step 532. The submitters whose material was selected and used in the released content is given credit in step 534 (for example listed on either the opening or closing credits of a television program). The selected submitters are also preferably rewarded with cash or other prize awards. The audience then has the opportunity in step 536 to vote for and rank the released content. For example, for each television episode the audience may rate it on a scale from 1 to 10. This ranking is preferably conducted through the Internet but may also be done through telephone, print media, such as newspapers, or mail-in ballots. At the end of the season the audience can select or rate their favorite episode of the season. In steps 538 and 540, the highest rated concept submitters receive rewards in the form of credit payment, cash or other rewards. For example, where a selected submitter whose submission material is released in the media content may be paid $1,000 to $25,000, the top reward for the highest rated media content may be $1,000,000 or more. Provision for the next three highest rated contents may be given a trip or a smaller reward. After the payment module is initiated in step 542 for paying the selected and highly rated submitters, the content is archived in step 544 for internal creator purposes such as reruns, for example. If the content is re-released, such as the case of reruns, the selected submitters whose material is contained within the media content may be payed or otherwise rewarded, if this right has not been relinquished previously by the disclaimer or other agreements, as determined between the creator or third party and the selected submitters.

Instead of an interactive format, in step 546 the submitter may choose an open content submission format. Once again, in step 548, all communications and submissions are encrypted for authorization and security purposes. In step 550, the end user submitter is automatically entered into a contest when making submissions in an open format. The open content submission format includes the submission of ideas, stories, music, lyrics, scripts, manuscripts, screenplays, digital photographs, etc. which cannot be submitted in an interactive format, step 552. In order to enter the open format, the end user may be required to pay a fee for entering the submission contents, step 554.

In step 556, the end user submitter receives a pre-determined number of points to enter sweepstakes or purchase awards, as described above and more fully described in FIG. 13. In step 558, the submission content is then transmitted to the central controller 200 and stored.

The end user submitter, in step 560, can be given information regarding copyright, trademark and patent services. The creator may have the capabilities of offering such services to the submitter in order to protect the submitter's material, as more fully described in FIG. 12. In step 562, the end user submitter is also given the option of placing the submission material on an open exchange for access to third parties interested in acquiring such material. In step 564, the submitter may place an opening bid or initial offer on the submission content material so that he or she is guaranteed that amount of compensation.

Although the submissions are encrypted and otherwise protected from access and theft, the submitter may purchase protection insurance through the open exchange so that the open exchange, instead of the individual submitter, will prosecute thefts of submission materials by third parties. Due to the electronic tracking of the submissions, the third party who has accessed and copied the submission material should be readily ascertained. The pooling by the many submitters who participate in the insurance program give the open exchange the resources to find and prosecute those third parties who are able to steal submission material.

In step 568, the submitter may check the status of the submission at any time after transmission to the central controller 200 as described above. Once the submission is received and stored, the creator in step 570 can search the submission content databases for desired content. Once the creator in step 572 has selected a content submission, a cross-check process is initiated, step 574. Once the submission is confirmed as being original or sent before other similar submissions in the cross-checking process of step 574, the creator notifies the submitter that his or her submission has been selected at step 576. The creator in step 578 continues communication with the submitter for content development and adaptation. The content development may include one or more submissions and/or data from interactive features according to step 526. In step 528, the submitter or submitters may, in conjunction with the efforts of the creator, contribute to the development, story line and/or outcome.

Once the development and adaptation process is completed, step 530, the content is released to the audience for review per step 532. The submitters whose material was selected and used in the released content is given credit in step 534. The selected submitters are also preferably rewarded with cash or other prize awards. The audience then has the opportunity in step 536 to vote for and rate the released content. For example, for each television episode the audience may rate it on a scale from 1 to 10. This ranking is preferably conducted through the Internet but may also be done through telephone or mail-in ballots. At the end of the season the audience can select or rate their favorite episode of the season. In steps 538 and 540, the highest rated concept submitters receive rewards in the form of credit payment, cash or other rewards as described above. After the payment module is initiated in step 542 for paying the selected and highly rated submitters, the content is archived in step 544 for internal creator purposes such as reruns, for example, before ending the process 580. Payment for the re-release may be made as described above.

While the steps in the process of the invention have been generally discussed above, subroutines and particular processes of the invention are more fully described in detail in the following description.

Registration

Upon interfacing with the creator's networked central controller 200 at step 602, the system queries whether the end user is registered, step 604. If the end user is not registered, the system in step 606 asks the end user whether he or she would like to become a member. If the end user desires to become a member, at step 608 the end user is prompted for personal information. These prompts may be in the form of graphic user interface windows in which the end user enters information before proceeding to the next window, as is well known in the art. Registration will typically comprise granting of general background information on the submitter including, name, address, phone #, e-mail address, age, gender, marital status, employment, income, and the like. The user in step 610 is then either assigned or allowed to select an ID. An instructional page is presented to the end user in step 612, which includes information regarding the parameters and rules of being a member. As part of the registration process the user must agree to a disclaimer, giving up all rights to the idea and/or allowing the creator to use the submitted material for its purposes, among other things. The end user/submitter will also be asked to acknowledge that he or she has read the instructional page. Disclaimers may be conducted by electronic submission, electronic mail or through paper mail. If either the end user declines to agree with the disclaimer in step 614 or otherwise decides not to become a member, the process is ended at step 616. If, on the other hand, the end user decides to become a member and agrees to the disclaimer, the end user then selects a submission format in step 618 before submitting media material and ideas. The registration process at step 620 is then ended.

If the end user interfacing with the system is already registered, he or she may be asked to reaffirm an instructional page disclaimer at step 622. In response, the end user provides his or her ID at step 624 before proceeding to the submission format selection at step 618.

Requests and Submissions

Figure 7:
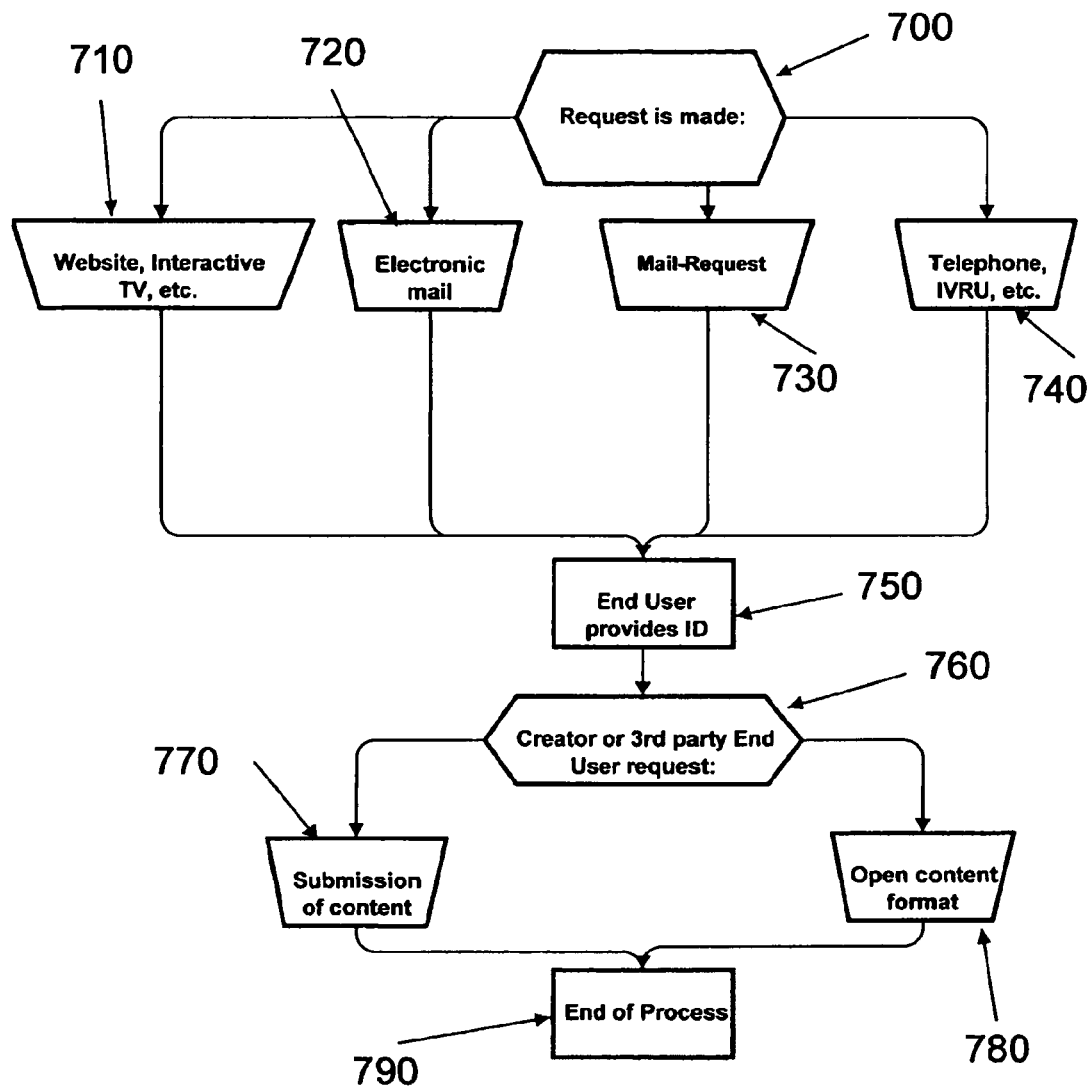
FIG. 7 is a flowchart illustrating the steps taken in asynchronous content request from the creator central controller.
Figure 8A:
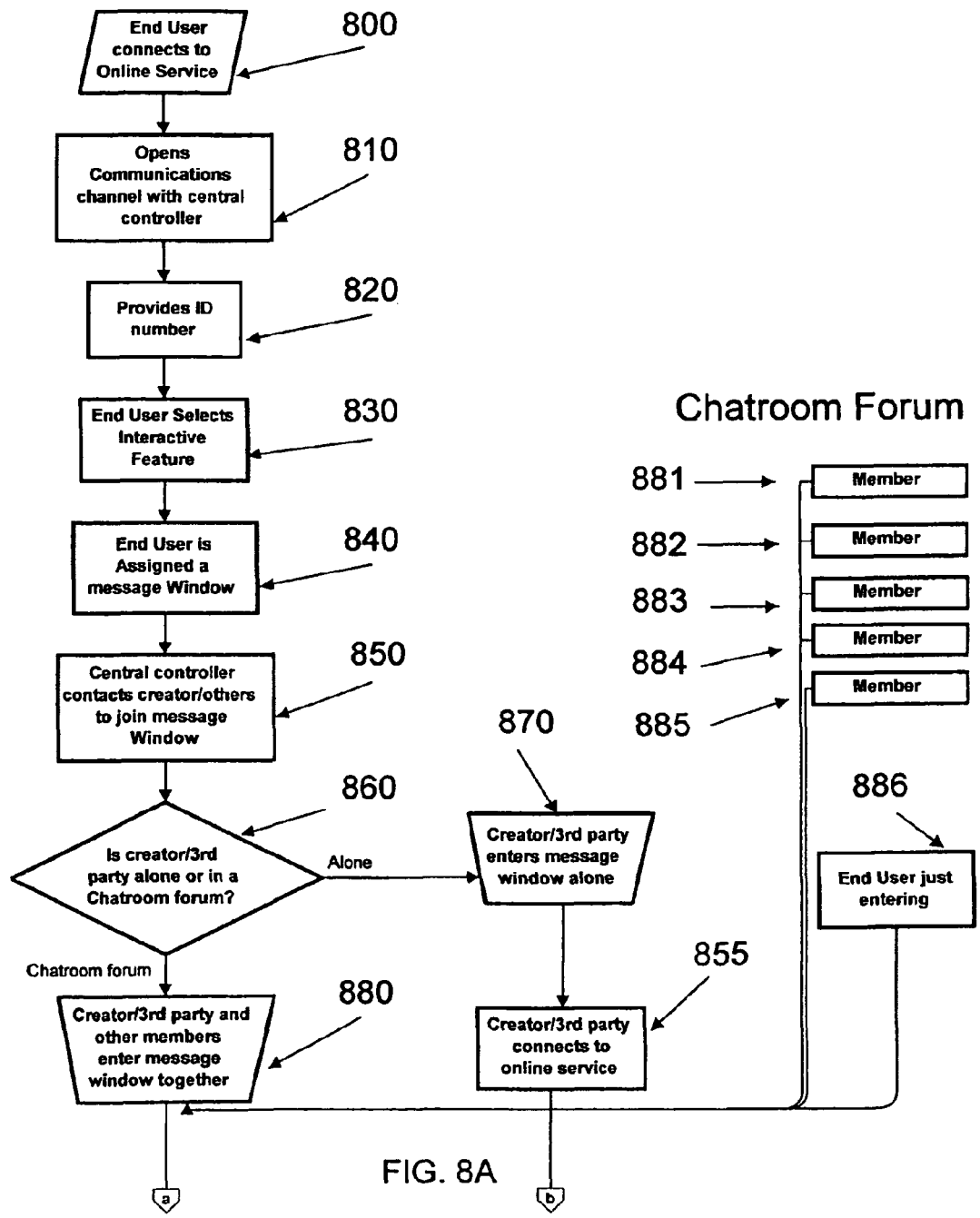
FIGS. 8A and 8B are flowcharts illustrating the steps of interactive, synchronous content request.
Figure 8B:
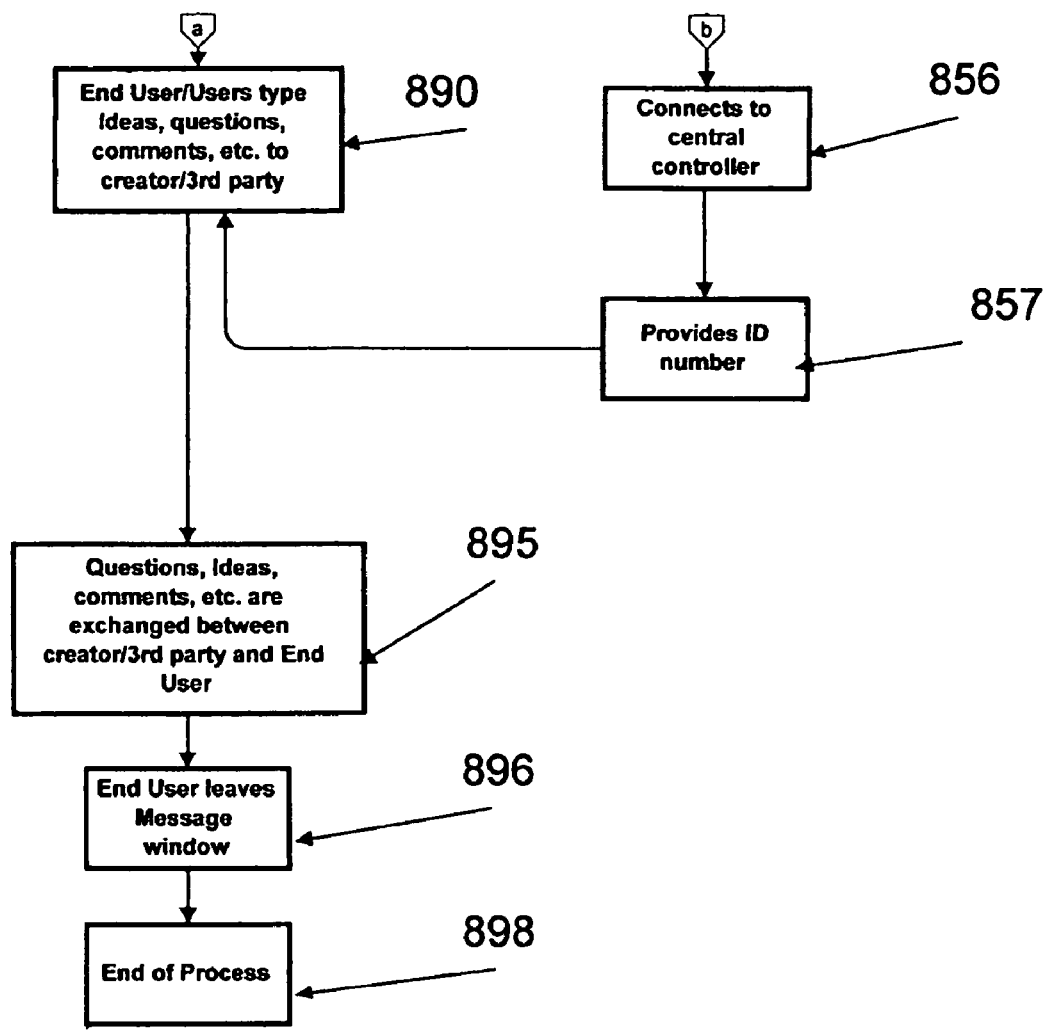

Referring to FIGS. 7 and 8A-8B, requests may be made either asynchronously as described in FIG. 7 or synchronously as described in FIGS. 8A and 8B. At step 700, an asynchronous request is made from either a creator or a third party end user via the open exchange as described in detail below. At steps 710 through 740, the requester determines which medium to use for the asynchronous request. In the preferred embodiment, as shown in step 710 a web site, interactive television, etc. are used. In step 720 e-mail is the asynchronous communication method of preference. Step 730 mailed-requests, and step 740 telephone, IVRU (Interactive Voice Response Unite), etc. are other sample asynchronous communications methods that are both very applicable and suitable to the present invention. Others such as fax, beeper, pager, radio, television broadcast, or any other developing or future form of communications, etc. also apply. Alternatively, any combination of the above mentioned may also apply. For example, a message might be sent to a member's beeper, telling him/her to check his/her e-mail for the complete request. One exemplary object of the present invention is the delivery of requests for content material, which in turn results in corresponding content material submissions. The communications method is merely the delivery mechanism and is secondary to the object of creating network/people driven multi-media.

At step 750, the member and/or potential submitter must provide an ID number and/or password to respond to the content material request, which applies to any selected channel of communication. In step 760, the actual request is made from a creator or third party end user, and if a corresponding submission is made, it is presented at step 770. The submission can also be presented in an open format, step 780, before ending the process 790.

FIGS. 8A and 8B illustrate synchronous content material request by either creators or third party end users via the open exchange. There are several embodiments for synchronous communications that may apply to any form of synchronous communications contained in the present invention: one creator or third party end user to one end user (end users in this reference may be people, members, or submitters); one creator or third party end user to many end users; many creators or third party end users to one end user; and many creators or third party end users to many end users. Although protocols will be described in detail for one creator or third party end user to one end user communications, those skilled in the art will appreciate that these protocols may be applied to all four embodiments.

In the described embodiment, the creator or third party end user and the end user may exchange in a series of content material requests and/or submissions using a one-to-one synchronous communications channel such as telephone, real-time text messaging or video conferencing. The creator or third party end user can request a synchronous communication channel when he/she makes his/her initial content material request using any of the embodiments of the present invention including the asynchronous communications embodiment and the interactive synchronous embodiment.

Although many synchronous communications channels may be used, in this embodiment an online messaging system is described which uses a standard online service to provide the real-time text-based communications link between the creator or third party end user and the end user. Preferably, a continuous communications channel is established between the creator or third party end user and end user using a message window. The Message window is a text-based computer "window" displayed on video monitor 430 of interface architecture 400, in this case both or many having access to interface architecture 400. The creator or third party end user types requests directly to message window which appears on video monitor 430. Simultaneously, the end user, which once again may be people, members or submitters, sees the request on his/her video monitor 430, and vice versa. The requests and submissions may take the form of a true request, questions and answers, comments, feedback, ideas, stories, written materials, etc. any form to present content materials.

Referring now to FIGS. 8A and 8B, there is shown how end users access the message window. At step 800, an end user whom may or may not be a member connects to an online service. Examples of online services include, American Online, Compuserve, the Microsoft Network, Netzero, or even BBS, etc. The online service, however, only acts as the interface for the present invention. Control of end user, creator, or third part access, searches, billing and payment, and other function resides at the central controller 200. Online services act merely as a convenient conduit for synchronous communications given their ability to handle tens of thousands of simultaneous communications. In another embodiment, central controller 200 handles all synchronous connections directly, eliminating the need for online networks. At step 810, a communications channel is opened between central controller 200 and the online service. The communications channel is a direct electronic link such as a circuit switch or packet switched network connection. Once the connection has been made the end user provides his/her ID number at step 820 to gain access to the network. If the end user is a non-member, he/she may begin the registration process beginning at step 600.

After the end user has been authorized to enter the system, he/she selects an interactive feature at step 830 to participate synchronously with a creator or third party end user to submit content material. Once a feature is selected, central controller 200 assigns message window 840 to the end user. The end user may be required to provide a password to central controller 200 prior to gaining admittance to message window 840. If additional security is required, the end user, creator, third party end user or whom ever is entering the message window at the time may be required to produce a password and/or submit to a challenge/reply protocol in which he/she must produce a piece of information known only to that person, such as his/her mother's maiden name or his/her social security number. If an interactive feature is not live, the end user may have the option of having the central controller 200 send a message to a creator or third party end user (via e-mail, fax, telephone, beeper, etc.) stating the online session is available at step 850. If central controller 200 does not receive a response within a predetermined time central controller 200 sends a message to the end user and allows him/her to select another interactive feature. Anytime a end user/member enters a message window the central controller maintains a log of whom entered, the date, the time and for how long.

To complete the synchronous communication link, at step 855 the creator or third party end user also connects to an online service, which might be a direct link to central controller 200 or a similar online service like those previously mentioned. The online service or direct link connects the creator or third party end user to central controller 200 at step 856. For security purposes, the creator or third party end user must also provide an ID number and/or password at step 857. While only one creator or third party end user is represented by this description, there may be many depending on the application of the present invention in order to facilitate the purpose of receiving content material. The connection now can be made with the end user/users.

Step 860 determines if the creator or third party end user will connect alone, possibly in an IM (Instant Message) situation or in a group forum, known as a chartroom if the Internet is the chosen embodiment. At step 870, if the creator or third party end user is alone the creator or third party end user enters the message window alone and begins communication at step 890. If the creator or third party end user is not alone, the creator or third party end user and the other people and/or members steps 881-885 enter the message window together, step 880, along with the end user just entering, step 886.

At step 890, communication begins, where end user/users type ideas, stories, comments, questions, etc. to respond to creators or third party end users requests. End user/users may also communicate openly without regard to a specific request. In step 895, questions, ideas, and comments are exchanged between the creator or third party end user and the user/users for the purpose of receiving content material and developing content. At step 896, the end user or users leave the message window to conclude the synchronous communication module and the process ends at step 898.

In an alternative embodiment, end users and creators or third party end users can be connected directly using synchronous communications channels such as the telephone network. In this embodiment, the end user calls central controller 200 and connects to the IVRU (Interactive Voice Response Unit). The end user is prompted to respond to requests similar to those described in the asynchronous content request of FIG. 7 and synchronous content request of FIGS. 8A and 8B. The end user enters his/her ID, selects the subject, submission-type, and provides categorical information via the IVRU prompts, as more fully described in FIGS. 9A and 9B. Central controller 200 then automatically stores the content material made available for searches and/or directs the material to the appropriate creators and/or third parties.

After a request has been made as described above and is received by an end user and/or member, the submission process begins. Content material submissions may occur through either interactive feature, illustrated in FIG. 9, or the open content format, illustrated in FIGS. 10A and 10B. There might be other formats or methodologies not mentioned here but that also apply. A fee may be required for content submissions, especially in the open content format, depending on the purpose of the request and if the submission is a part of a contest format.

Figure 9:
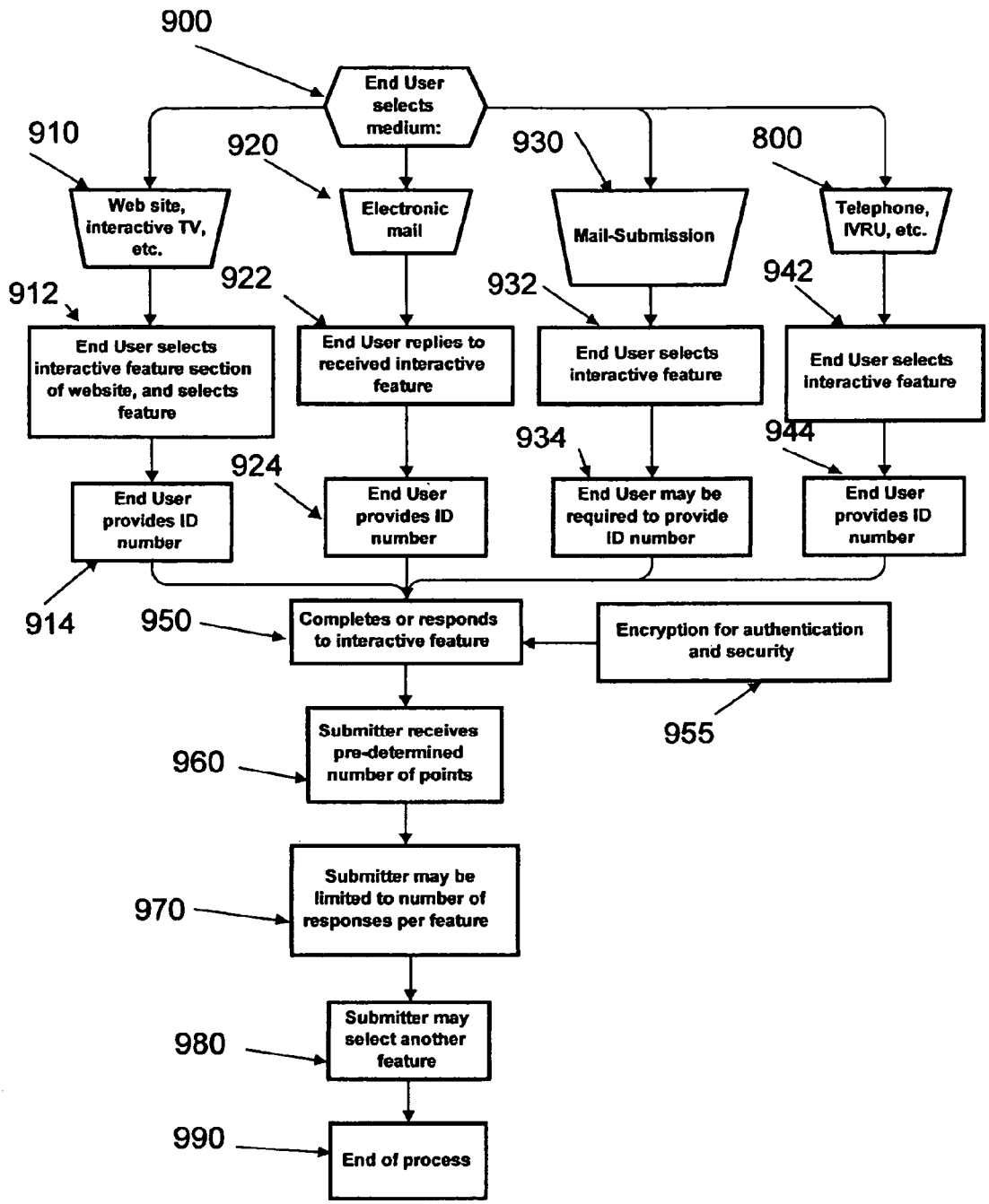
FIG. 9 is a flowchart illustrating the steps taken in interactive content submission in accordance with the present invention.

FIG. 9 illustrates content material submissions made through what are referred to as interactive features, which include but are not limited to the following: questions and answers, sentence or story completions, fill-in-the-blanks, multiple choice questions, polls, surveys, games, etc. or other unique features presented by creators or third party end users. The preferred embodiment emphasis the electronic transfer and storage of such content material.

Referring now to FIG. 9, the end user and/or member selects the medium in which he/she is to submit content material at step 900. This may be in response to a request or just an open desire to participate. Just as there are many way to make content material requests, there are many ways to make content material submissions, which are all appropriate and suitable to the present invention. Steps 810 through 840 represent some of the practical methods currently available to submit content material as presented in this invention. At step 810, web site, interactive television, etc. represents methods in which content may be broadcast, and because these samples enable interaction they may also receive data, which in this case may take the form of content material submissions. Other not listed or evolving communications may also be represented by this category. Because these media types enable menu display capabilities, end users at step 912 are able to select the interactive features section of the web site or interactive television format presented, and henceforth the desired interactive feature. Depending on the format, the end user and/or member may have to present an ID, password or other identification information at step 914, either immediately after arriving at the interactive features menu or after selecting a desired feature. If the end user is a non-member, he/she may begin the registration process beginning at step 600.

Figure 10A:
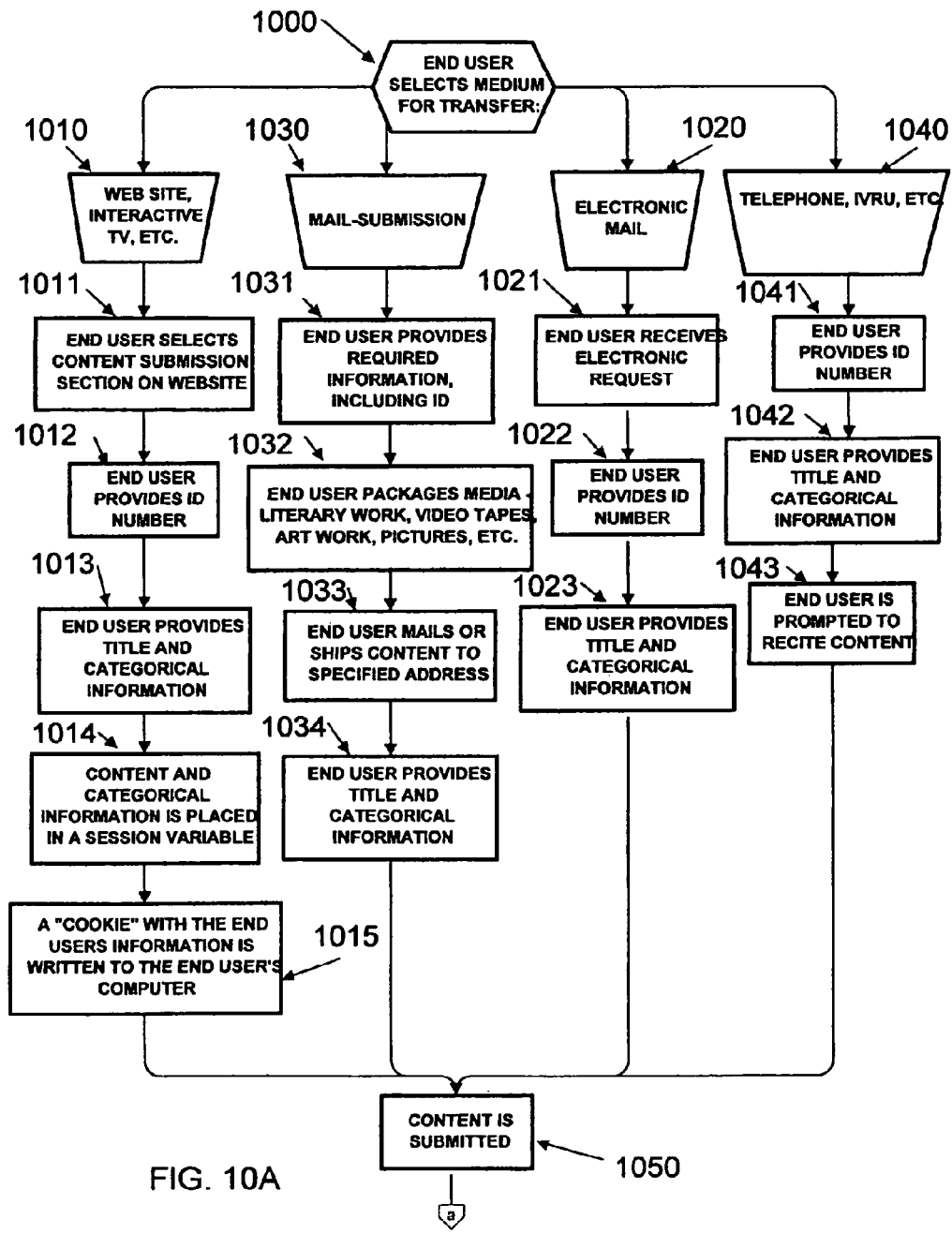
FIGS. 10A and 10B are flowcharts illustrating the steps taken in open content submission in accordance with the present invention.
Figure 10B:
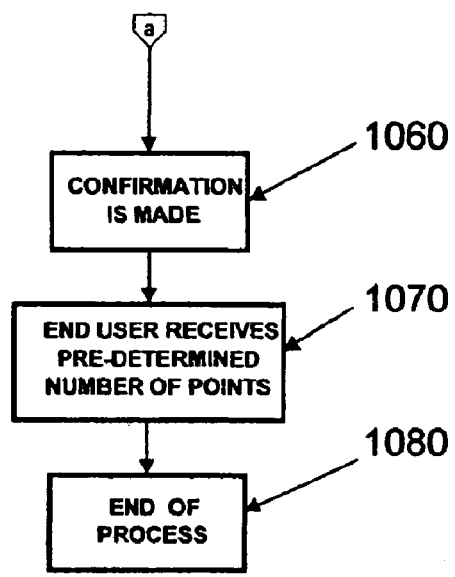

At step 920, electronic mail submissions will typically result from end users responding to e-mailed content material requests. However, open content material responses may also be accepted if they apply or are relevant to interactive features presented by creators and/or third party end users as illustrated in FIGS. 10A and 10B. At step 922, an end user looking to participate in an electronic mailed interactive feature can do so by replying to the e-mail, which is standard protocol on the Internet and well known in the art. If the end user is a member he/she will be asked to provide an ID at step 924, otherwise non-members may begin the registration process beginning at step 600.

At step 930, mailed submissions are covered wherein the end user receives an interactive feature content request or requests and responds accordingly through the mail. At step 932, he/she selects the desired feature in which to participate and at step 934 he/she may be required to provide ID or register as previously mentioned.

Step 940 is similar, but the communications medium for the submission is the telephone or an IVRU (Interactive Voice Response Unit). At step 942, the end user listens to the interactive features menu and selects one or more than one to make a content material submission. Once again ID is required at step 944, and registration may also be needed. While these mentioned are some of the content material submission methods, there may be many more that also come under the application of the present invention.

Regardless of the selected submission medium, at step 950 the end user must complete and respond to the selected interactive feature or features in order to make a content material submission. At step 955, if the submission is made over the Internet it is encrypted for authentication and security. At step 960, the submitter for his/her participation receives a pre-determined number of points towards sweepstakes entries and cash and/or merchandise awards as discussed in more detail below. At step 970, based on the type of interactive feature presented, the submitter may be limited to the number of responses per feature. Those limits will be disclosed prior to participation. Once a submitter completes and interactive feature, they may select another feature at step 980 before ending the process at 990.

As shown in FIGS. 10A and 10B, the content material can also be submitted through the open content format. The procedures are essentially the same, but the open application enables the content material to be presented in either an existing multi-media format or any such method that best suites the interests and objectives of the submitter. End users may either openly submit content material or respond to specific requests made from creators or third party end users. Some of the formats that apply to the open application include, but are not limited to the following: movies, screenplays, television scripts, book manuscripts, plays, music, music lyrics, newspaper and magazine articles, comic stripes, sweepstakes, print media like calendars, greeting cards, novelty items, digital photographs, etc. as well as any other form of literary work or idea that might be non-protectable or protectable through either copyright, trademark, or patent rights. The preferred embodiment emphasis the electronic transfer and storage of such content material.

Referring now to FIGS. 10A and 10B, the end user selects a medium to transfer content material through the open content format at step 1000. The preferred transfer mediums for the open content format remain the same as described above for the interactive format. At step 1010, the end user selects to transfer content material via a web site, interactive television, etc. At steps 1011 and 1012, the end user selects the open content submission section of the selected format and then provides his/her ID and/or password, respectively. Depending on whether the end user is a member, registration may be required. At step 1013, because the content material is presented through an open format, the material must be given a title if it applies as well as categorical information to classify the submission, provide background data, convey the intentions of the submitter, etc. At step 1014, the content material is placed in a sessions variable to be stored and transmitted to the central controller 200. Additionally, in step 1015 a "cookie" with the end users information is written to the end users computer. The function and application of "cookies" is well known to anyone of ordinary skill in the art. At step 1050, the content material is officially submitted via an electronic transfer to central controller 200.

At step 1020, electronic mail is the selected medium to transfer an open content material submission. Preferably, this medium will be used in response to an electronic mailed request for open content material. However, an end user may freely submit open content material without regard to a specific request. In steps 1021 and 1022, the end user replies to an electronic mail received open content request, and provides his/her ID and/or password, respectively. Depending on whether the end user is a member, registration may be required. At step 1023, the material must be given a title if it applies as well as categorical information to classify the submission as mentioned above and discussed in the received electronic mail. A "cookie" with the end users information may also be written to the end users computer before being submitted at step 1050.

At step 1030, mail or shipping is the selected medium to submit open content material. The end user submitter may either respond to a paper mailed request or freely submit open content material without regard to a specific request. At step 1031, the end user may have to provide required information including ID, and registration may be required. At step 1032, the end user packages the media content material, literary work, video tapes, art work, pictures, music, lyrics, or any other media form that may be mailed or shipped, etc. At step 1033, the end user must present a title to the submission material if it applies as well as categorical information as mentioned above. Accordingly, at step 1034 the end user mails or ships the content material to a specified address as a means of submitting the material per step 1050.

At step 1040, like the alternative request embodiment aforementioned, content material submissions may also be received through the telephone, IVRU (Interactive Voice Response Unite), etc. The process is similar, but end user submitters are specifically using the medium to submit materials either in response to creator or third party end user requests or on their own accord to make an open content material submission. At steps 1041 and 1042, the processes are the same as the other open content submission mediums, the end user provides both an ID number and/or password as well as a title and categorical information as requested, respectively. At step 1043, the end user is prompted to recite the submission either to a live person or an IVRU. All of the necessary prompts are given to complete the process for submission, step 1050.

Regardless of which transfer medium is selected, the content material is submitted at step 1050. In the preferred embodiment, the content material is electronically stored in files and transferred via the Internet through the network method and apparatus previously discussed. If the Internet is the transfer medium the material is encrypted for authentication and security. At step 1060, confirmation is made with the submitter and the network to confirm the receipt of the submission. At step 1070, the submitter for his/her participation receives a pre-determined number of points towards sweepstakes entries, cash and/or merchandise awards as discussed in more detail below, before ending the process at step 1080. Preferably, an algorithm is employed in order to prevent an end user from wrongfully acquiring points by submitting the same submission to the creator over and over again. Such an algorithm preferably includes a tracking mechanism which determines if the member has made a previous submission within the category, if a limit applies. This algorithm is particularly applicable to the interactive submissions where entering a form and re-sending the form is possible.

It is important to note that any combination of those previously mentioned or not mentioned communication or transfer mediums may account for a request or submission of content material as described in the present invention.

Authentication and Security

Authentication of the member/submitter and creator or third party end users typically involves checking the attached ID or name and comparing it with those stored in member/submitter database 255 and creator/third party end user database 260. The network provides a self-policing service to its members by prosecuting those found in violation, and if submitters elect they can purchase a legal services insurance through the network, as described above, where for a small fee the network will provide necessary legal protection and recourse which is particularly applicable to the open exchange described below.

The self-policing function is facilitated by the sophisticated capabilities of the modern day electronic network. The network will track and maintain an electronic paper trail of anyone who interfaces with the network whether it's an end user, member, submitter, creator, third party end user, employee, hacker, etc. The electronic paper trail will include such data as who or whom made submissions, requests, opened and closed files, applied for registration, and the like as well as dates, times and if applicable reasons for such actions. For example, creators and third party end users will have to electronically document both their reason for opening a file, and if they intend any further action with the content material. The data compiled for the electronic paper trail will be processed through central controller 200 and the majority of it stored in audit database 305. Therefore, if a submitter claims someone inappropriately used his/her content material, the network can electronically track who opened the file and his/her reasons for doing so. Tracking end users actions is well known in the art, so a detailed description of its functionality is not needed.

Moreover, content material stored in content database 275 cannot be printed at interface architecture 400 by anyone who happens to join the network, unless otherwise authorized. Submitters will be able to legally protect content material through a Copyright, Trademark, and Patent service link illustrated in FIGS. 12A and 12B via interface architecture 400, eliminating much of the concern of presenting content material on a network.

Although the above described procedure works well for normal submission and creator selection operations of the invention which are in a low security environment, the security can be significantly improved if necessary (as in the case of the open exchange where there is concern of theft of the submission material or circumvention of the system) through the use of cryptographic techniques. These techniques not only enhance the ability to authenticate the sender of a message, but also serve to verify the integrity of the message itself, proving that it has not been altered during transmission. Encryption can also prevent eavesdroppers from learning the contents of the message. Such techniques shall be referred to generally as cryptographic assurance methods, and can include the use of both symmetric and asymmetric keys as well as digital signatures and/or hash algorithms.

The practice of using cryptographic protocols to ensure the authenticity of senders as well as the integrity of messages is well known in the art and need not be described here in detail. For reference, one of ordinary skill in the art may refer to Bruce Schneier, Applied Cryptography, Protocols, Algorithms, And Source Code In C, (2d Ed, John Wiley & Sons, Inc., 1996).

Figure 11:
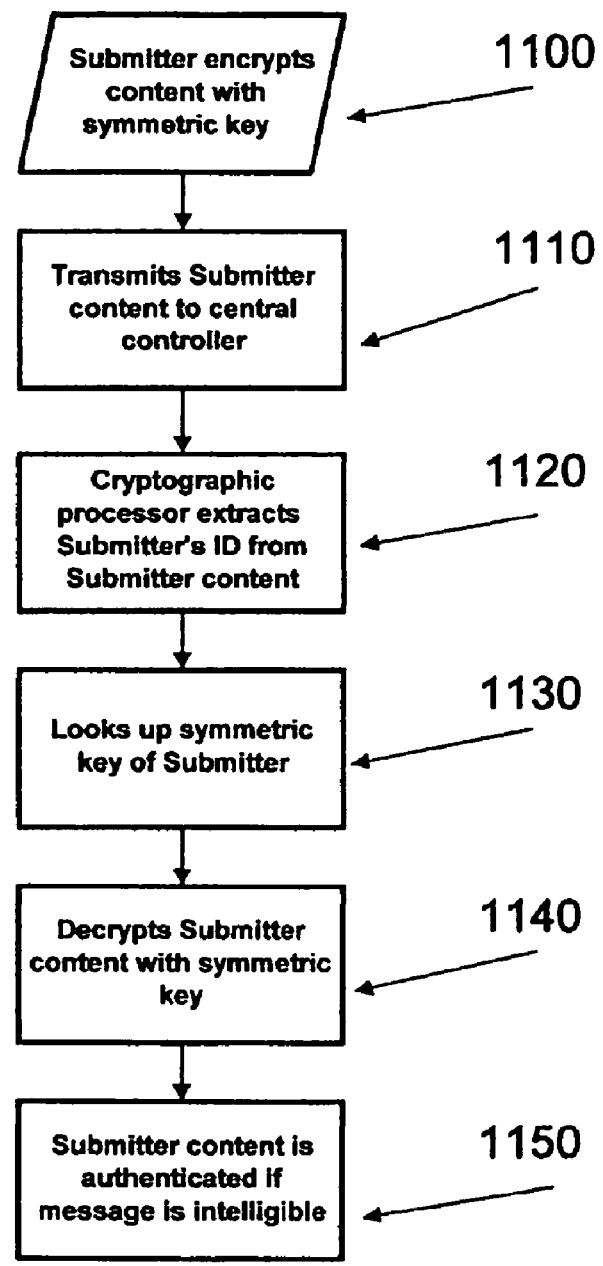
FIG. 11 is a flowchart illustrating the steps of encryption of electronic transfers in accordance with the present invention.

FIG. 11 describes a symmetric key embodiment in which the submitter and central controller share a key. Thus both encryption and decryption of submissions are performed with the same key. This encryption may be implemented with an algorithm such as DES (U.S. Government standard, specified in FIPS PUB 46), or with any of several algorithms known in the art such as IDEA, Blowfish, RC4, RC2, SAFER, etc. The submitter encrypts content material with his assigned symmetric key at step 1100, using cryptographic processor 435 of interface architecture 400. The key may be stored in information storage 470 or otherwise stored or memorized by the submitter. The encrypted content material is then transmitted to cryptographic processor 210 of central controller 200 at step 1110. Cryptographic processor 210 extracts the submitter ID from the message at step 1120 and looks up the symmetric key of the submitter in cryptographic key database 290 at step 1130, decrypting content submission material with this key at step 1140. Cryptographic key database 290 contains algorithms and keys for encrypting, decrypting and/or authenticating messages. At step 1150, if the resulting message is intelligible, then it must have been encrypted by the same key, authenticating that the submitter must have indeed been the author of content material.

This procedure makes it significantly more difficult for an attacker to represent himself as a submitter. Without cryptographic procedures, an attacker who obtained sample content material from a given submitter would be able to extract the submitter's ID and then attach this ID number to any of the attacker's content material. When the message has been encrypted with a symmetric key, however, an attacker obtaining sample content material only discovers the submitter's ID number, not the symmetric key. Without this key, the attacker cannot create content material that will not be discovered by central controller 200, since he cannot encrypt his message in the same way that the authentic submitter could. The symmetric key protocol also ensures that the message has not been tampered with during transmission, since alteration of the message requires knowledge of the symmetric key. An encrypted creator or third party end user content material request also provides the creator or third party end user with more anonymity.

While step of encrypting IDs and/or passwords may not be illustrated in every figure, its inclusion is applied to the invention as deemed necessary to ensure greater authentication and security and to prevent the circumventing of the network. The symmetric key protocol is one exemplary sample of an authentication and security technique, and there are many more that perform essentially the same function. For example, those know to the art may include, but are not limited to, the following: an asymmetric key protocol with two such algorithms or the procedure—RSA and DSA; a cryptographic technique using digital signatures with one such algorithm—DSA (Digital Signature Algorithm); and biometric devices such as a fingerprint reader, voice recognition system, retinal scanner and the like.

Intellectual Property Protection Information and Services

Figure 12A:
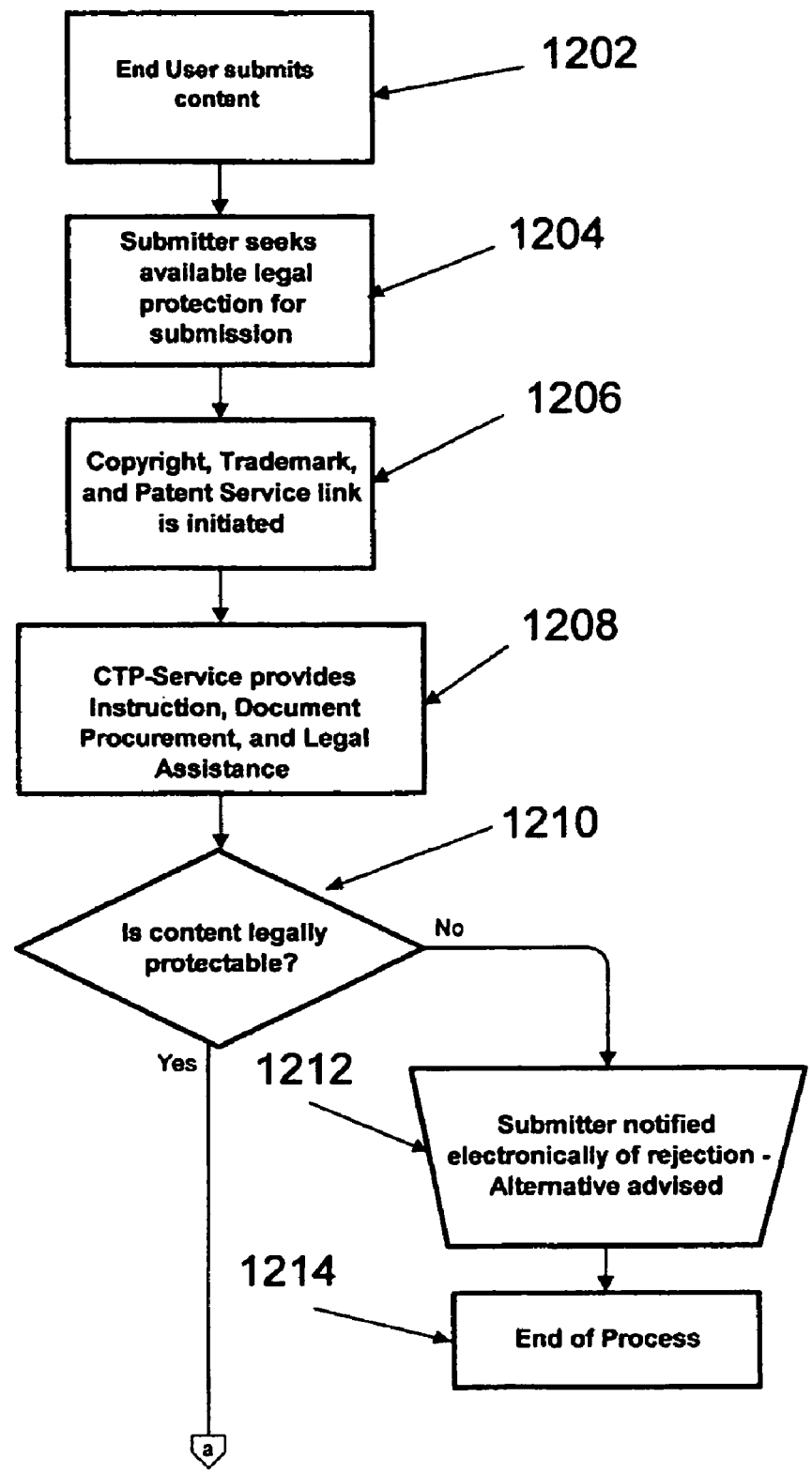
FIGS. 12A and 12B are flowcharts illustrating steps taken in provision of intellectual property protection services.
Figure 12B:
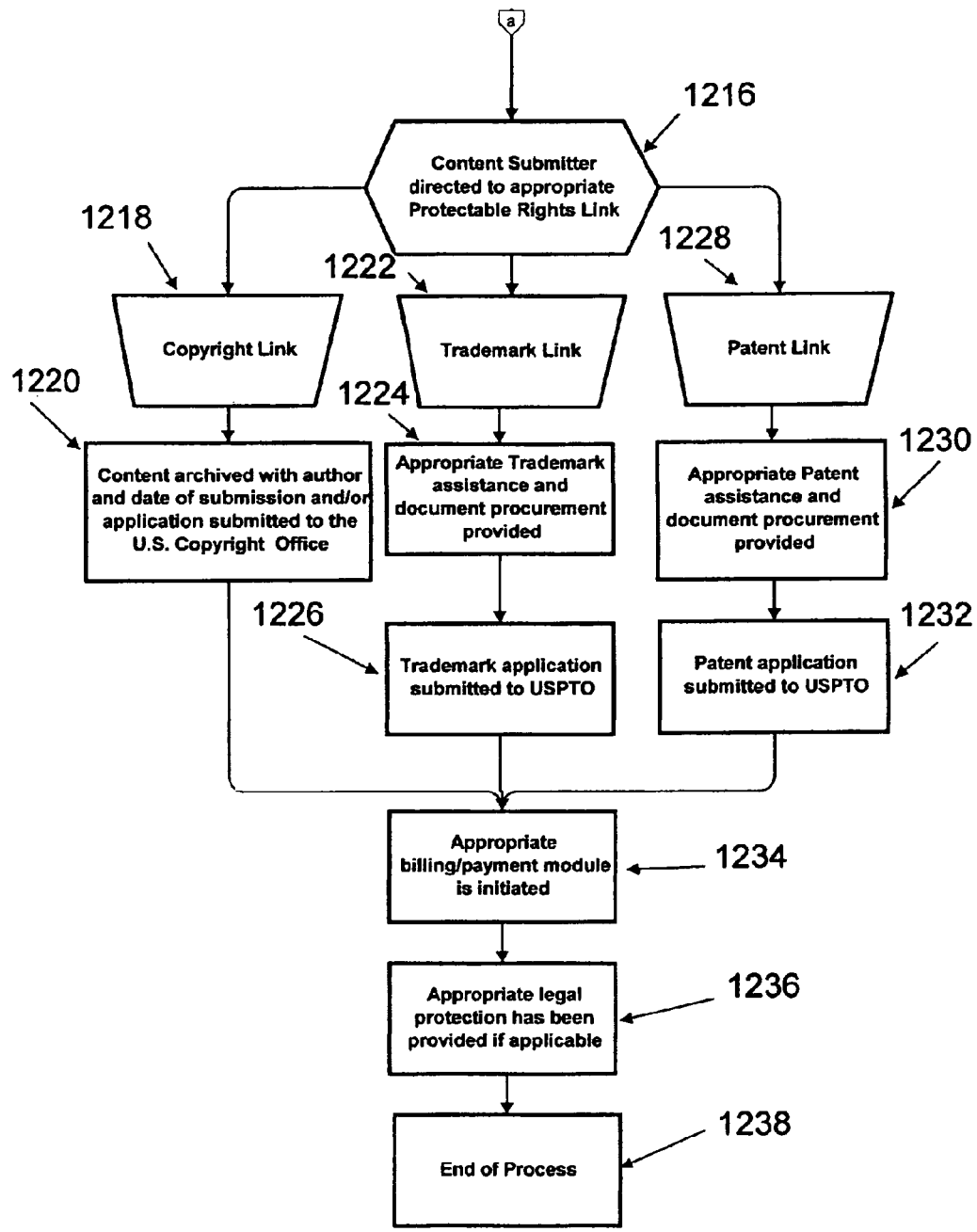

Referring to FIGS. 12A and 12B, after the end user submits the media content material at step 1202, the submitter is queried whether he or she would like information on the available legal protection for the submission at step 1204. If the submitter is interested in such services, a copyright, trademark and patent (CTP) service link is initiated at step 1206. The CTP service link provides instruction, document procurement and legal assistance to the submitter, step 1208.

The service will determine if the submitted content is legally protectable at step 1210. If it is not, the submitter is notified that the material has been rejected and most likely not protectable, preferably electronically such as by e-mail, at step 1212 before ending the process at step 1214.

If it is determined that the submitted content may be the subject of intellectual property protection, the content submitter is directed to the appropriate protectable rights link at step 1216. These links include the copyright link at step 1218 which may provide a hyperlink to the United States Copyright Office, forms for downloading or provision of information upon which the service can file for copyright registration. Links to law firms in the submitter's geographic area which specialize in intellectual property and copyright issues can also be provided. In addition, at step 1220 the submitted content can be archived and the author's personal information and date of submission logged for future reference in the event the author must prove that he or she was the first and original creator of the submitted work.

If the submitted content is determined to be the subject of a trademark or the like, at step 1222 the submitter is linked to an appropriate trademark link. Appropriate trademark assistance and document procurement for the preparation of trademark filings within the United States Patent and Trademark Office can be obtained or information requested for the preparation of such documents at step 1224 before actually filing the appropriate documents and applications at step 1226. Hyperlinks can be provided the submitter to Internet sites such as the United States Patent and Trademark Office and local law firms if the service does not prepare such documents and filing papers.

If the submitted material is deemed to be patentable, the submitter is transferred to a patent link at step 1228 where information and documents regarding patents are provided at step 1230. Hyperlinks can also be provided to the United States Patent and Trademark Office or other pertinent sites. If the service has the capabilities and personnel to prepare and file patents for the submitter, the necessary communication and information is given and the service prepares necessary documents and applications and submits the same to the United States Patent and Trademark Office (USPTO) at step 1232. In any event, after providing the information and/or services to the submitter, an appropriate billing/payment module is initiated at step 1234, as more fully discussed herein. At step 1236, the appropriate legal protection has been applied for or provided before ending the process at step 1238.

The Points Award Program

Computerized marketplaces of all kinds are well known in the art. Today, all modern stock, bond, and commodity exchanges are supported by underlying computerized databases and related systems that enable them to function. Typically, electronic exchanges are designed to facilitate commercial transactions or tokens of ownership, such as shares of stock, or physical objects such as ounces of gold or a used car. Other exchanges specialize in the sale of information such as that provided by Lexis/Nexis, where users pay fees for access to information or the rights to information, as described in the present invention. While in theory electronic exchanges intend to provide supplemental services to existing marketplaces, most of them never last long enough to add meaningful value to their existence. Most exchanges fail because their unable to motivate significant numbers of both buyers and sellers to use the exchange versus other available market alternatives.

Realizing the shortcomings of the prior art, the present invention includes a number of unique and effective measures to stimulate ongoing user demand and participation. The hallmark of stimulating usership of the network and exchange described herein, is rooted in both a contest and points award system.

The Points System Awards Program is an incentive based campaign designed to both promote and stimulate ongoing usership and participation, regardless of whether the submitter has content material selected or not. While it is the intention of every submitter to have content material submissions selected for multi-media use, there will be a large number of submissions that will never be used. This realization might discourage membership participation, so in an effort to maintain interest and enthusiasm, the present invention includes a points award program for any level of participation with the network and/or the open exchange. Submitters will receive a pre-determined number of points depending on their participation in either interactive features or submissions via the open content format.

The accumulated points may be used to purchase cash and/or merchandise awards, and will serve as entries into daily, weekly, monthly, or annual sweepstakes. All of the points used as entries toward sweepstakes will be subject to a daily limit, which will be reflected in a real-time points counter on the member's screen. Each member will be limited to the number of entries they can accumulate per day; a limit must be set in order to comply with sweepstakes laws. Submitters may accumulate points after reaching the limit, which may be traded in for pre-determined awards. To accumulate points submitters must be registered members of the network and/or exchange. There also may be limits to registration such as age and resident requirements. To be eligible to win the sweepstakes drawing, the submitter must only have one account registered. Odds at winning sweepstakes drawings will depend on the number of entries submitted, and the number of entries collected by other participants in the sweepstakes.

Entry forms may include but are not limited to, web site, electronic mail, mail-in, phone, IVRU, fax, beeper, and other data transfer methods accepted. Entry forms are based on submission forms, which have already been discussed in detail in other sections.

Sweepstakes winner must execute and return an affidavit, a liability release, and where lawful, a publicity release within seven days of notification. Failure to return documents timely, or if prize notification or prize is returned as non-deliverable, may result in disqualification with and alternate winner selected.

As submitters click from page to page in the preferred embodiment, and participate in the interactive features or open content formats, the real-time points counter will automatically update to reflect the new points that have been accumulated towards either the sweepstakes drawings or the awards program.

Figure 13:
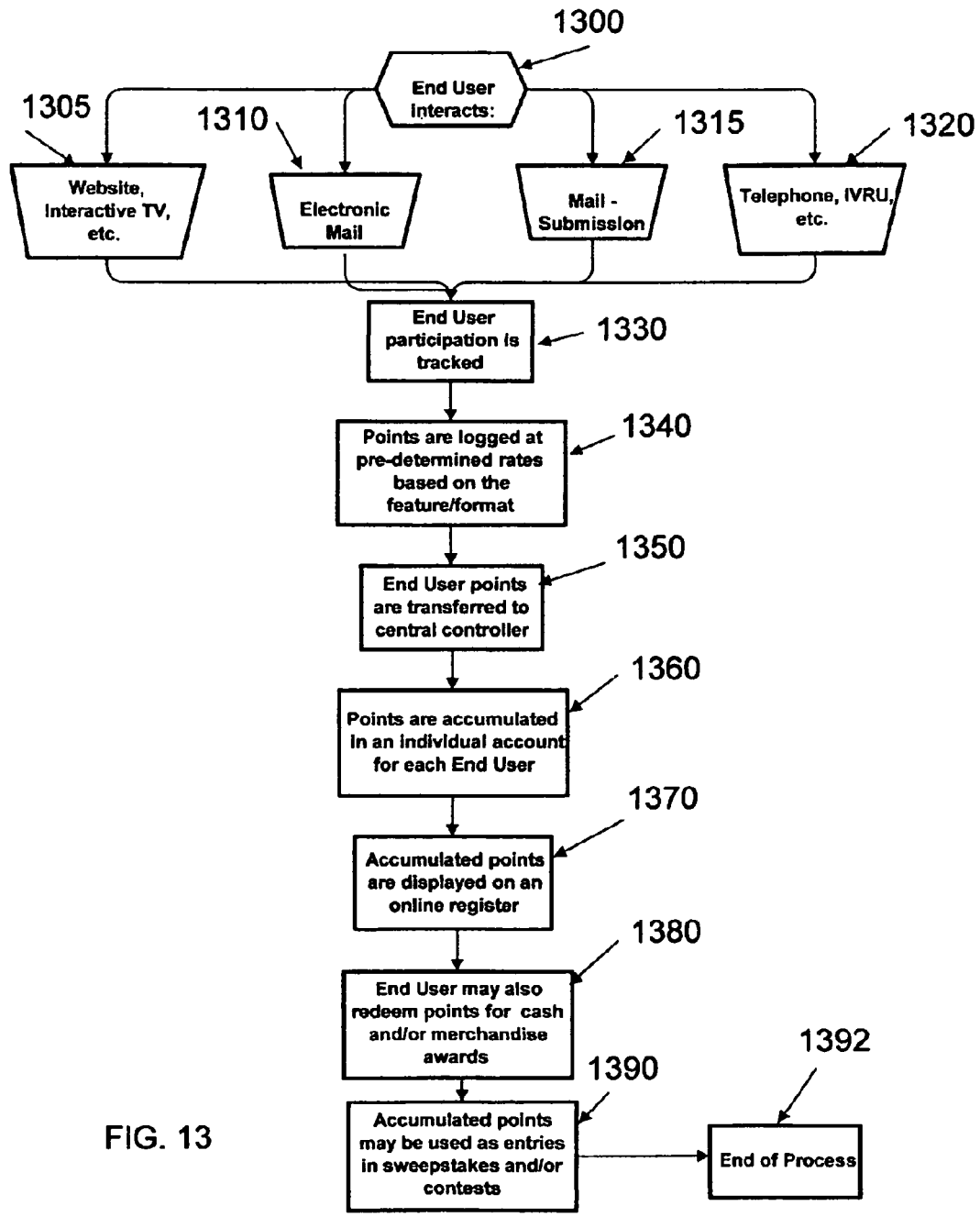
FIG. 13 is a flowchart illustrating the steps taken for a point system in accordance with the present invention.

Referring now to FIG. 13, an illustrative example of the points awards program is illustrated. At step 1300, the end user and soon to be submitter interacts with the network through either interactive features or submissions via the open content format. The submitter may interact with the network through such mediums as those listed in steps 1305, 1310, 1315, and 1320 web site, electronic mail, mail-submission, and phone, IVRU, etc., respectively. These examples are just illustrative in nature, there may be other communication methods as well and they may also apply. The preferred embodiment, however, for the present invention is the Internet as has been previously described. At step 1330, the end user or submitter's participation is tracked through all of the mediums described. At step 1340, points are logged at pre-determined rates based on the level of participation with either interactive features or submissions via the open content format. Accordingly, at step 1350 the end user or submitter's points are transmitted to central controller 200. At step 1360, the submitter's points are tallied and stored in the individual account of the submitter in member/submitter database 255. At step 1370, the accumulated points of the submitter are displayed on a real-time online register. At step 1380, the points may be used as entries in daily, weekly, monthly, or annual sweepstakes. Additionally, the points may also be redeemed for cash and/or merchandise awards as described in step 1390 before the process ends at step 1392.

Submission Status Check

Figure 14:
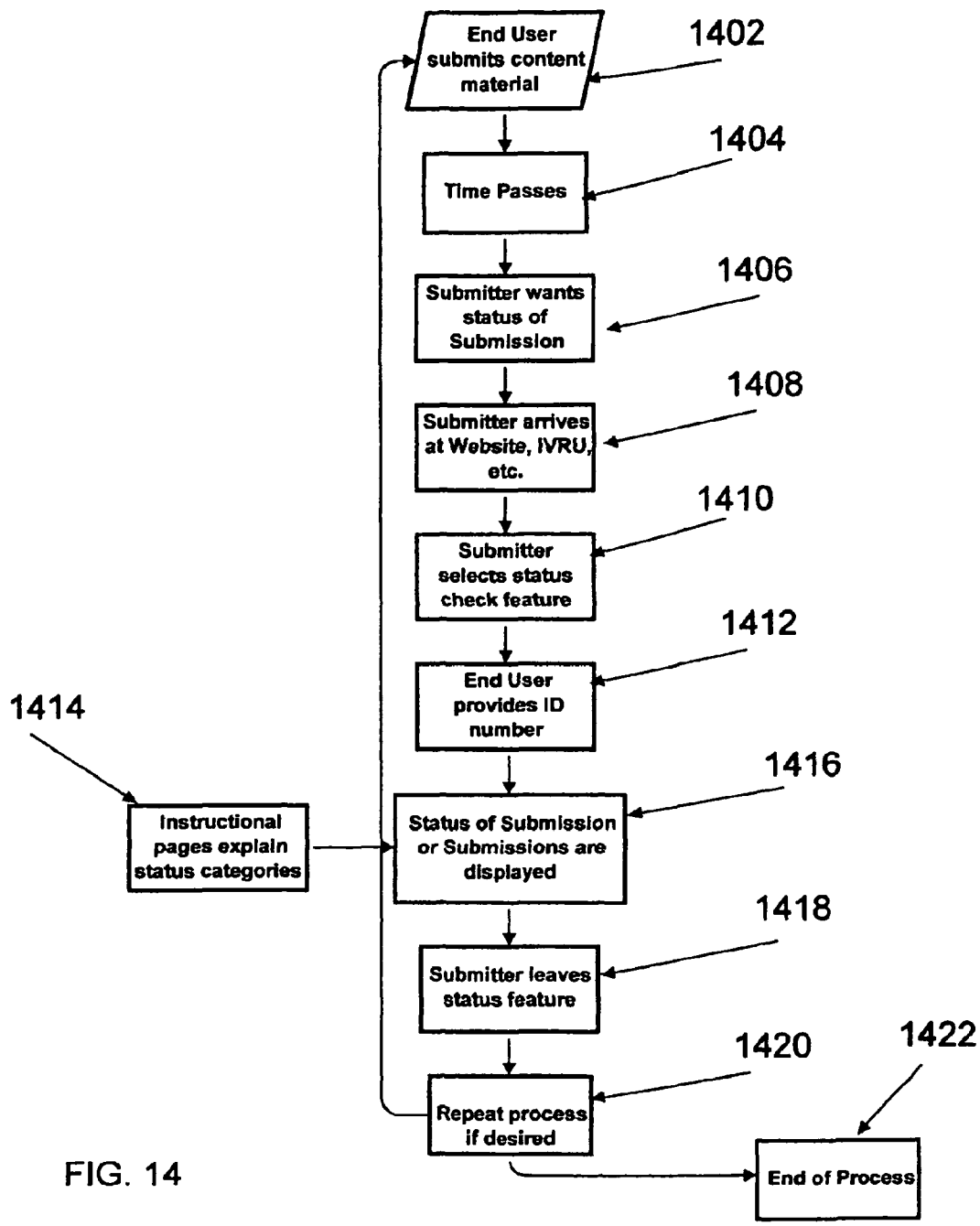
FIG. 14 is a flowchart illustrating the steps taken in conducting a status check in accordance with the present invention.

With reference to FIG. 14, the end user can check the status of his or her submission at any time after transmitting it to the creator central controller 200, steps 1402 and 1404. Once the submitter wants to inquire into the status of the submission, step 1406, he or she preferably interfaces with the creator website, or alternatively calls an interactive voice response unit system or the like, step 1408. At step 1410, the submitter selects the status check feature after interfacing with the system and then provides his or her ID number, step 1412.

Instructional pages explaining the status categories are given at step 1414 and the status of the submission is listed at step 1416. Preferably, the status categories are developed and written by a legal department to prevent any potential liability to the creator and its service. The submitter then leaves the status feature at step 1418 or repeats the process if he or she has transmitted more than one submission at step 1420 before ending the process at step 1422.

Search, Selection and Cross-Check

One of the most pervasive objects of the present invention is to expand the creative reference for multi-media content development to a world wide application via the Internet, as described in the preferred embodiment. The method and apparatus described herein purports the utilization of an electronic network to produce network-driven or people-driven content and the cornerstone of that network is the search, selection and cross-check process used by the creator or third party end user receiving the submissions. The process of searching and finding desirable content material has been greatly enhanced by the sophisticated topic spotting and other searching capabilities made available today, such as those presented in the following patents: U.S. Pat. No. 5,826,260 to Byrd, Jr. et al.; U.S. Pat. No. 5,983,221 to Christy; and U.S. Pat. No. 6,012,053 to Pant et al. (all of which are hereby incorporated by reference).

The search, selection and cross-check process is available via the network to both creators and/or third party end users with possible alternative embodiments to meet the requirements of specific search requests. Those connected to the network will have advantages never before experienced in the world of multi-media due to the link with an infinite number of resources and end users made available through the Internet. For the first time, creators and/or third party end users will be able to elicit an unlimited network of ideas, real life experiences, literary works, music, video and other forms of multi-media content material. The object of the interactive content development process is to expand the creative frame of reference to develop more creative and dynamic forms of multi-media content.

The interactive environment will also enable creators and/or third party end users the ability to survey end users opinions and insights to the direction of content development as well as the outcome to particular content releases. Either way, the ability to utilize selected content material is made available through the both solutions and efficiencies of the search, selection and cross-check process and the methods and technologies described herein.

The search, selection, and cross-check process begins after content material is stored in content database 275, either the submitter might have forfeited the rights to the content if it was submitted as a part of a contest or the rights might be sold through the open exchange embodiment. The content material may be filtered, either upon arrival or at a designated time interval, based on key words in the title and/or text as well as categorical information supplied by the submitter. The search and cross-check systems may include, but are not limited to the following types of searches: pre-selected and open searches.

Pre-selected searches have a filtering mechanism which attempts to determine the best possible creator or third party end user for the submitted content material based on topical information gleaned from the title, text, or categorical information supplied by the submitter. The criteria for the filter would be provided beforehand by the creator and/or third party end user. The content material is then automatically directed to the appropriate creator and/or third party end user. Electronic mail filters would be the preferred embodiment for the pre-selected search process, which are well know in the art. In addition to e-mail, there are many alternative pre-selected search techniques, which may serve the purpose of the invention.

Figure 15:
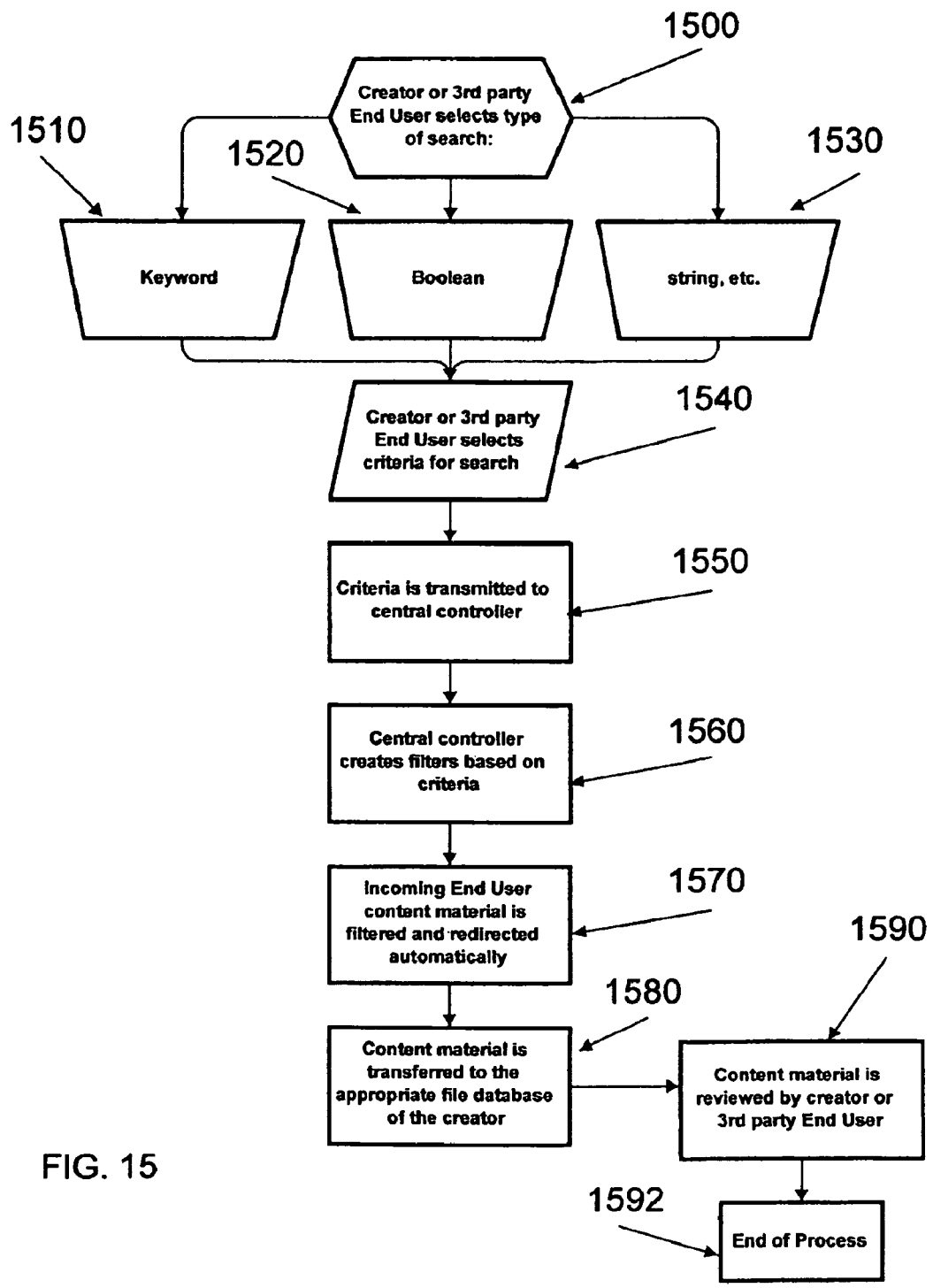
FIG. 15 is a flowchart illustrating the steps taken in a pre-selected search process in accordance with the present invention.

Referring to FIG. 15, this illustrative example demonstrates a preferred form of the pre-selected search process.

At step 1500, the creator or third party end user selects the pre-qualifying search criteria method, which may include but are not limited to the following samples, keyword, boolean, string, etc. listed in steps 1510, 1520 and 1530, respectively. After selecting a method, the creator or third party end user selects the criteria for the filtering process and enters it based on the rules of the search type at step 1540. The selected search criteria is transmitted to central controller 200 at step 1550. If filtering is done solely on topical information supplied by the submitter, the central controller 200 can direct the categorically identified content material utilizing content database 275 and subject database 280 to the appropriate creator or third party end user. At step 1560, central controller 200 creates an electronic filter base on the criteria submitted by the creator and/or third party end user. After the filter is set, any incoming content material is filtered and redirected automatically to the appropriate creator or third party end user at step 1570. At step 1580, the content material is stored in the appropriate file of the creator and/or third party end user in creator or third party end user database 260, 270. The stored content material is then reviewed, with additional electronic search measures if necessary, by the creator and/or third party end user at step 1590, and desired content material is selected before ending the process at step 1592. The creator and/or third party may utilize a bookmarking scheme for designating submissions into categories of interest or topics. Thus, when re-searching the submissions, these materials can be more easily accessed. The searches can also be tagged with a "live or die" function so that after a pre-determined period of time has elapsed, the search does not accept any additional submission materials. This would be helpful, for example, when a contest for submission material has a defined time limit for entries. This can also be helpful when meeting a deadline for content release.

The second search type discussed is open searches, which are performed in the same manner someone online visits one of the major search engines such as American Online, Yahoo, Alta Vista, Lycos, Ask Jeeves, etc. to search for specific topical information. The process is essentially the same but the creator and/or third party end user is conducting the search for the purpose of finding appealing content material to develop multi-media. The searches might be purely random, where the creator or third party end user is just screening submissions vicariously, or the searches might be more advanced with more specific topical categories being targeted. In the preferred embodiment, open searches and pre-selected searches will be performed by a sophisticated text parsing technology, which are well known in the art, that scans the text and conducts an electronic comparison to determine if the content material meets the conditions of the criteria provided. In essence, the open search process utilized in the present invention is analogous to one of the major search engines, which are commonly known in the art.

Figure 16:
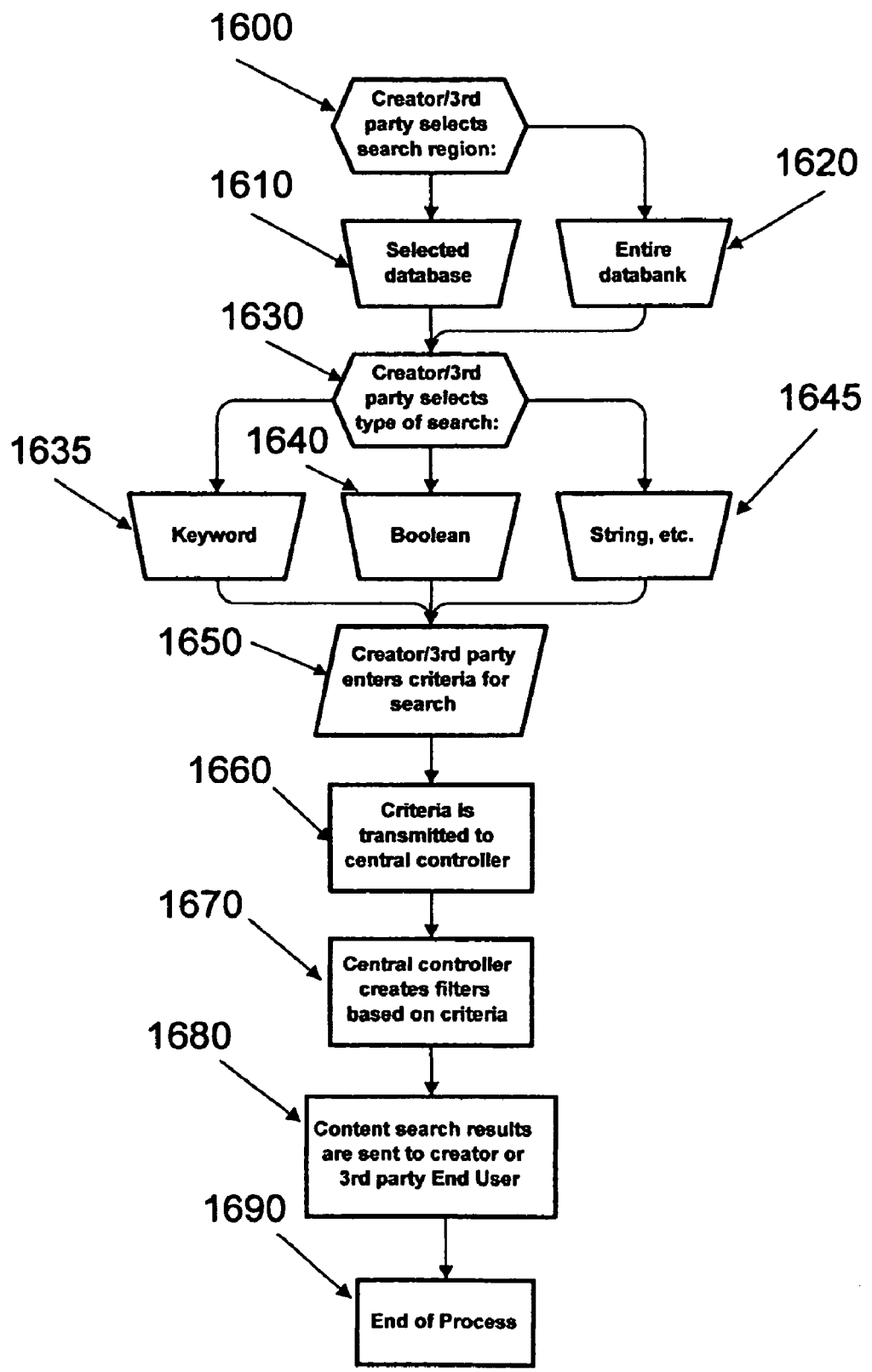
FIG. 16 is a flowchart illustrating the steps taken in an open search process in accordance with the present invention.

Referring to FIG. 16, this illustrative example demonstrates a form of the open search process. At step 1600, the creator and/or third party end user selects whether they would like to conduct a search of a particular content database 275 or all or the content databases in data storage device 250. At step 1610, the creator and/or third party end user pre-selects a content database 275 or topical category to conduct a search, or alternatively at step 1620, all of the content databases are selected in storage device 250 to conduct a search. Once the area of the search is selected, the creator and/or third party end user must select the search type method at step 1630, which may include but are not limited to the following samples, keyword, boolean, string, etc. listed in steps 1635, 1640 and 1645, respectively. After selecting a method, the creator and/or third party end user selects the criteria for the search and enters it based on the rules of the search type at step 1650. Accordingly, at step 1660 the search criteria is transmitted to central controller 200. At step 1670, central controller 200 creates an electronic filter base on the criteria submitted by the creator and/or third party end user. The resulting submissions meeting the requirements of the electronic filter are subsequently transmitted back to the creator and/or third party end user, where desired content material can be selected. After finding the desired material based upon the search, the creator and/or third party selects that material, by downloading or otherwise, for use before ending the process at step 1690.

While the search types which have been discussed are used to demonstrate the searching functionality of the search and selection process, there are many other search applications known in the art or that are being developed and they may also apply to the present invention. More importantly, the search types ultimately used might be used independently, in tandem, reverse order or in any combination that satisfies the searching needs and objectives of the creator and/or third party end user. For example, referring to the previously discussed sample search types, the creator and/or third party end user might elect the pre-selected search function to receive content material in a particular topical category, and then after receiving the filtered content material, he/she might perform an open search to narrow the viewed submissions even further. In an alternative embodiment, the creator or third party end user might not elect to receive pre-filtered content material as performed in a pre-selected search, electing instead to just use the open search type to find desired content material. The search order and use is entirely up to the creator and/or third party end user. Of course, the order or method of searching is not as important as the ability to retrieve desired submission material which is a paramount function of the present invention.

After content material has been selected as a part of the contest, as described above, it is then preferably cross-checked for originality and timeliness. The cross-checking process provides a methodology for creators and/or third party end users to isolate the differences, no matter how fractional, between similar content material submissions. The cross-checking process may be performed with a search system like those previously discussed, in which an electronic text parser scans the text and performs a comparative analysis, or the like, to identify the distinctiveness of the content material in relationship to others in its category. Electronic text parsers, also used in the search embodiment, are a well know art form most often found in major search engines like some of those previously mentioned. In alternative embodiments, this process could also be performed manually although such a process is not preferred for obvious reasons.

The cross-check process is vital to contest formats, because in cases of identical or very similar content material submissions, the creator and/or third party end user may need to identify and award the earliest submission date. This is facilitated by an electronic time stamp that records the date and time of each submission, which is stored along with the content material in content database 275. Audit database 305 may also be used to store data for this function as well. It is important to note, the issue of submission dates most often applies to content material submitted in a contest format, where conditions apply. The significance of dates might also depend on whether the submission was made in either the interactive feature format or the open content format. Third party end users might select content material at their own discretion without regard to dates or content material similarities, unless, of course, their content material requests include some form of contest giving preference to submission dates.

Figure 17:
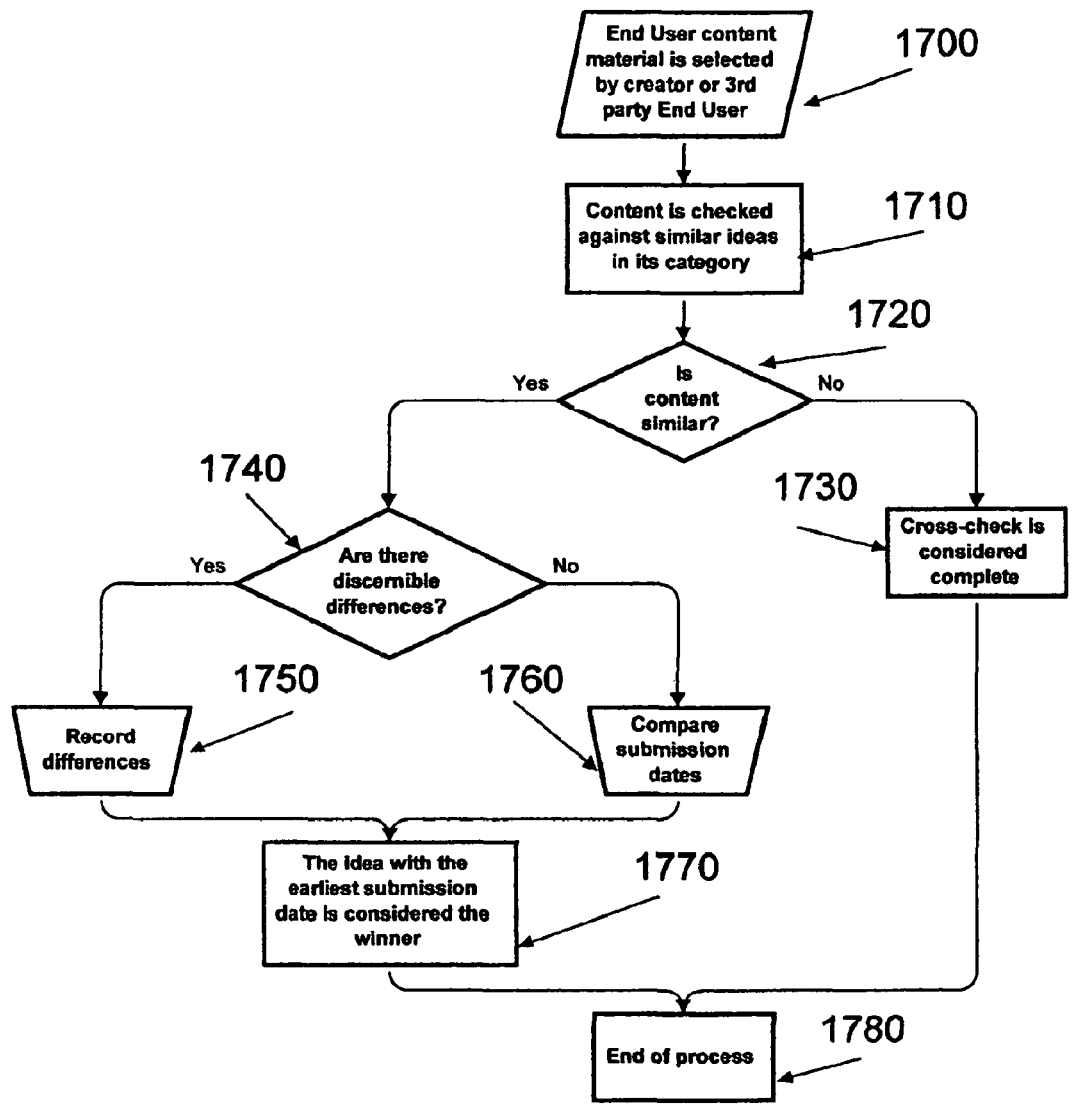
FIG. 17 is a flowchart illustrating the steps taken in cross-checking submissions in accordance with the present invention.

Referring to FIG. 17, at step 1700 the cross-check process begins after the creator and/or third party end user makes a content material selection, and conditions of the selection process require a cross-check procedure. At step 1710, the content material is checked against similar content material in its topical category either manually and/or electronically. At step 1720, it is determined either manually and/or electronically whether the content material is similar enough to other submissions to deem further review. At step 1730, if the answer is no, the cross-check procedure is complete and the submitter's submission is selected and awarded accordingly. If the content material is deemed similar, then step 1740 tries to determine, once again either manually and/or preferably electronically, if there are any discernible differences. If there are, then the differences are documented and stored in audit database 305 at step 1750. If there are no discernible differences then submissions are considered identical, at step 1760, central controller 200 extracts data from content database 275 and compares the dates of the similar submissions. At step 1770, the submission with the earliest submission date is selected and awarded accordingly based on the rules and conditions of the contest, before the process ends at step 1780.

In the prior art, there have been many drawbacks to the submissions of protectable or non-protectable content material to a network or exchange. The issue of idea pilferage has been the greatest concern, but the solutions presented in the search, selection and cross-check embodiment make the submission of one's ideas or content material, a simple, convenient, and secure transaction.

Figure 18:
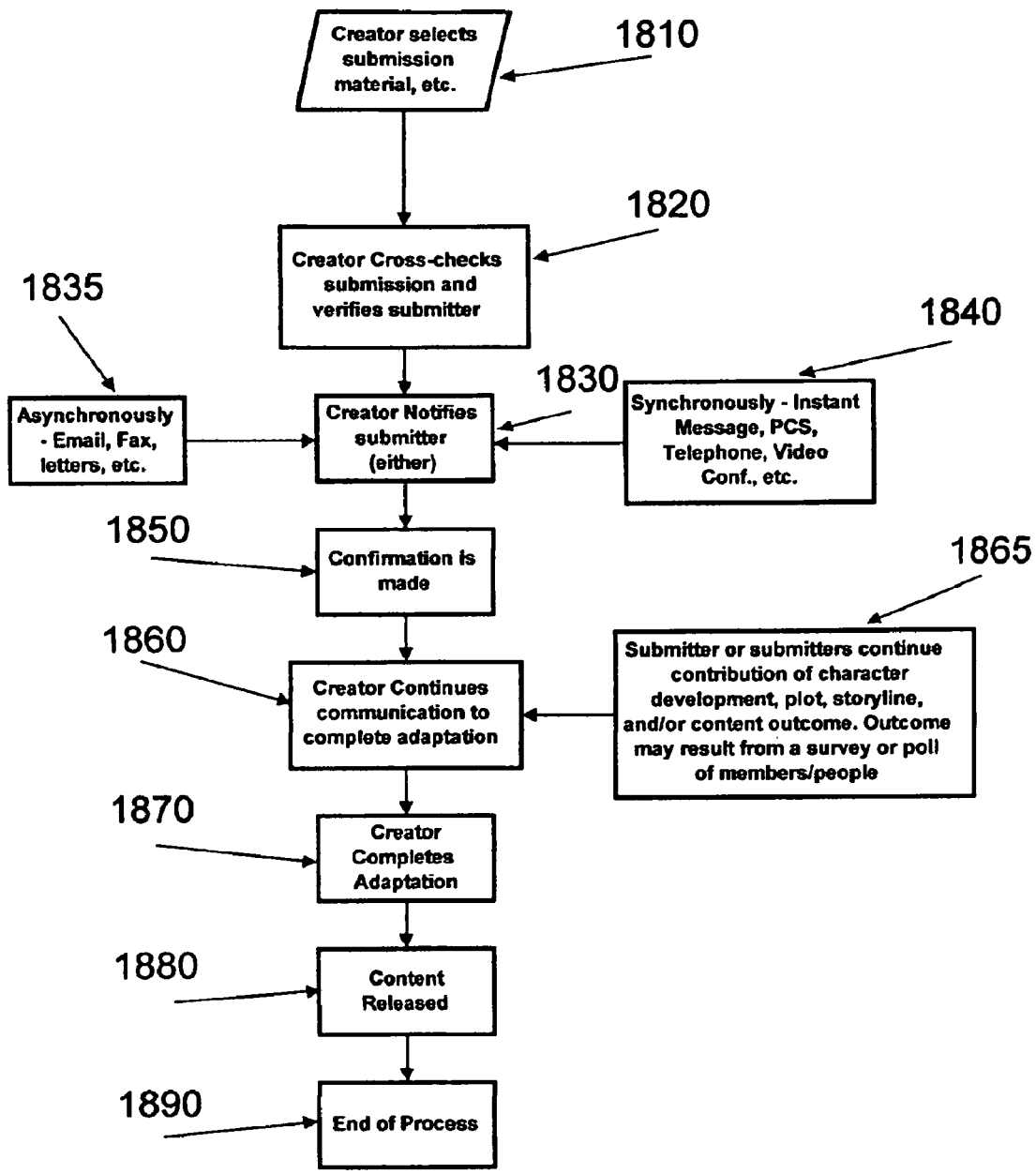
FIG. 18 is a flowchart illustrating the steps taken in communicating with selected submitters.

Referring now to FIG. 18, after the creator has selected submission material and cross-checked the submission at steps 1810 and 1820, the creator notifies the submitter at step 1830. This can occur asynchronously by e-mail, fax, letters, etc. or synchronously by instant message, PCS, telephone or video conference, etc. as shown in steps 1835 and 1840, respectively. Confirmation of the selection and notification is made at step 1850. The creator typically continues periodic communication with the submitter, step 1860, in order to complete the adaptation of the content. Accordingly, at step 1865, the submitter may continue contribution of ideas and material in order to develop the content, such as the storyline or outcome. Once the creator has completed the adaptation of the media content, step 1870, the content is released, step 1880, and the process ends, step 1890.

The Contest System

A voting and/or rating system may also be instituted for content releases based on content material submissions made to the network and/or open exchange, as described in the voting and rating embodiment. Creators and/or third party end users may incorporate the systems as an added feature to their content releases. For example, at the end of a specific time period, i.e. a season, or immediately after a content release, the public and/or the network members, collectively the audience, will have the opportunity to vote and/or rate their favorite content releases. This may apply to all content or multi-media formats. Voting and/or rating ballots may include but are not limited to the following submission forms: web site, electronic mail, mail-submission, fax, phone, IVRU, and responses to print media like newspapers, magazines, etc. The voting system may be priority based, where the public and/or network members prioritize their favorite releases from most favorite to least favorite, or as simple as vote for your favorite content release. The rating system most likely would be scale based, where parameters to rate content releases would be given. For example, immediately following a content release, the public and/or network members would be given a scale from 1 to 10 to rate the content release, with 10 being the highest point value and 1 being the lowest point value. Content releases are given a title and/or theme name so that the public and/or network members can identify them.

The intent behind the voting and/or rating systems is to reward the content material submitters of the highest rated content releases, providing an additional incentive for end users to participate in the network. Rewards may come in the form of cash and/or merchandise awards.

Figure 19:
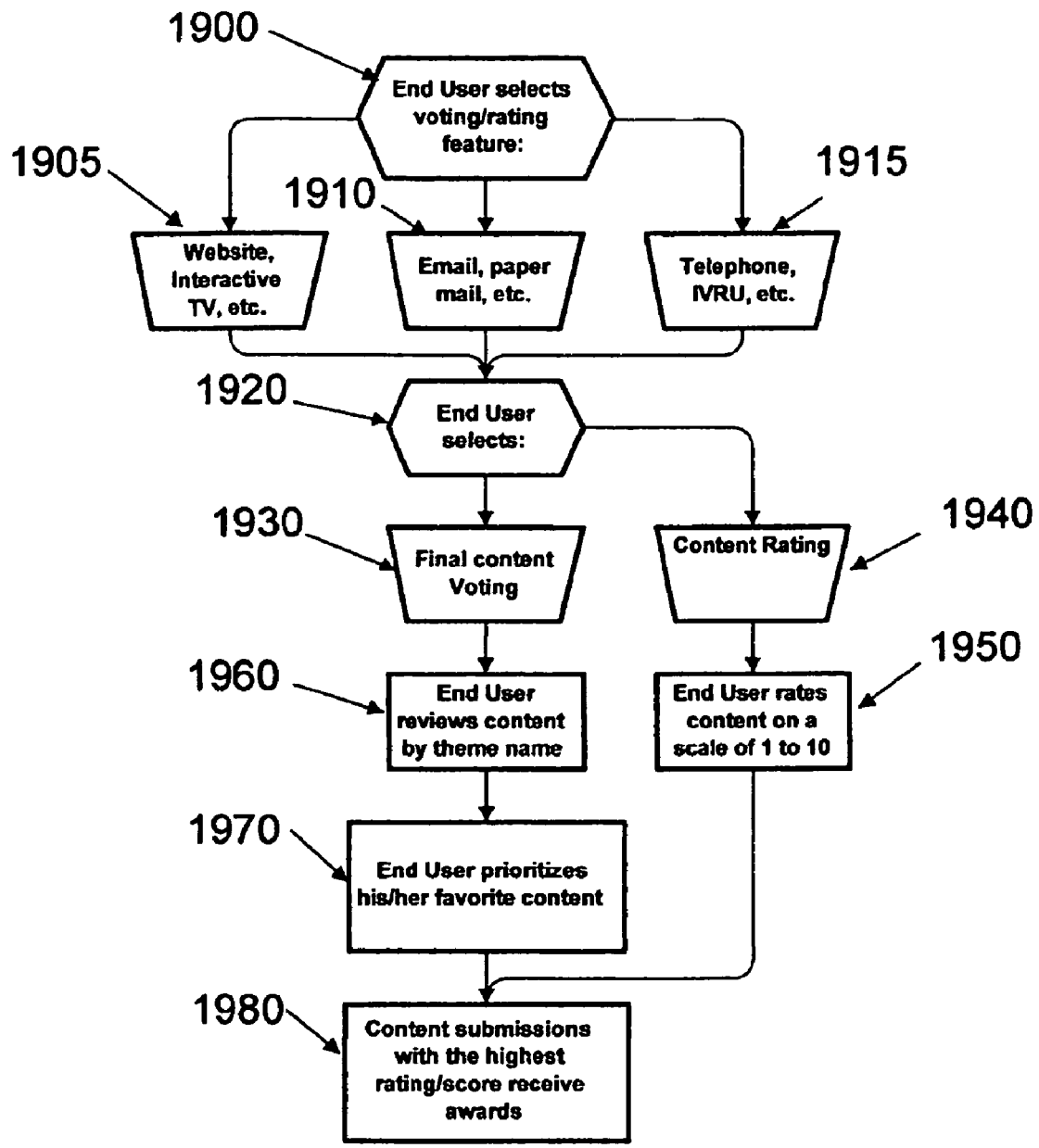
FIG. 19 is a flowchart illustrating the steps taken in a voting process in accordance with the present invention.

FIG. 19 shows an illustrative example of the voting and/or rating systems used in accordance with the present invention. At step 1900, the public and/or network members select the medium in which to vote and/or rate content releases. The public and/or network members may submit their ballots through those methods listed in steps 1905, 1910, and 1915 web site, electronic mail, and phone, IVRU, etc., respectively. These examples are just illustrative in nature, there may be other communication methods, such as mail in ballots or the like, as well and they also apply. At step 1920, the public and/or network user members select whether they would like to vote on content releases in step 1930 or rate content releases in step 1940. If the public and/or network members elect to rate content releases, they move to step 1950, where they have typically just seen or heard the content release (for example an episode of a television program using the present invention has just ended) and are given the option to rate the release (on a scale of 1 to 10, for example).

If, on the other hand, the public and/or network user members elect to vote on their favorite content releases, then they move to step 1960, where they are given the opportunity to review content releases by title and/or theme name. At step 1970, the public and/or network members are given the option to vote on their favorite content releases, where, for example, they may be able to prioritize by number their most favorite to least favorite releases. Finally, at step 1980 the content material submitters of the highest rated content releases are rewarded with cash and/or merchandise awards, as described above. The scores of the voting and/or rating systems may result in separate winners or be combined using a formula into a single contest with a single winner. The format of the contest is entirely up to the creators or third party end users.

Agency and Sales Services

Ultimately, the network and/or exchange is designed around providing services to members to both promote and protect content material submissions like the Copyright, Trademark, and Patent service previously mentioned. In conjunction with the protection advisory service, the network and/or exchange can also provide agency and sales services, where a team of in-house agents work on behalf of members to promote, pitch, and sell content material submissions to all sectors of the multi-media world. The agents can continually target content material submissions that would be considered appealing to certain sectors of the media world, and then will pursue appropriate vendors to pitch, and sell those selected concepts. This undoubtedly will create more demand for the network and/or exchange, once again addressing one of the major weakness in the prior art of exchanges. In addition, members will also be given the option of paying a fee based agency service in which their specific content material submissions will be given preference to a wide range of distribution and sales services. Obviously, there is an economies of scale to receiving agency and sales services on an exchange, where services can be provided more economically because of the pooling of member resources. Moreover, existing agency services are typically only available to an elite few who have previous credits, which is a significant shortcoming in the art. Talent and production should be the overriding issue, which is one of the most pervasive objects of the present invention.

Media Submission Open Exchange

By making available content material submissions to third party end users, the present invention provides a novel and efficient exchange network for the development of all forms of multi-media. Network-driven or people-driven forms of multi-media is a new art form for content development that is facilitated through the limitless connections of the world wide web and the electronic file transfer capabilities or the new era, which are emphasized in the preferred embodiment described above. Furthermore, new advanced search methods, as described above, improve search and selection capabilities to the level that creators or third party end users can search and receive content material in a simple, cost and time effective manner.

It is the intention of the invention that in-house creators will stimulate the first layer of demand for content material and that the resulting onslaught of supply will henceforth create the demand from third party end users. Based upon the history of previous and existing exchanges, one of the most prevailing issues and weaknesses of the prior art is the creation of demand, which the present invention has both effectively and successfully addressed through the desire of end users to participate in the systems as well as through the points and awards systems.

Figure 20A:
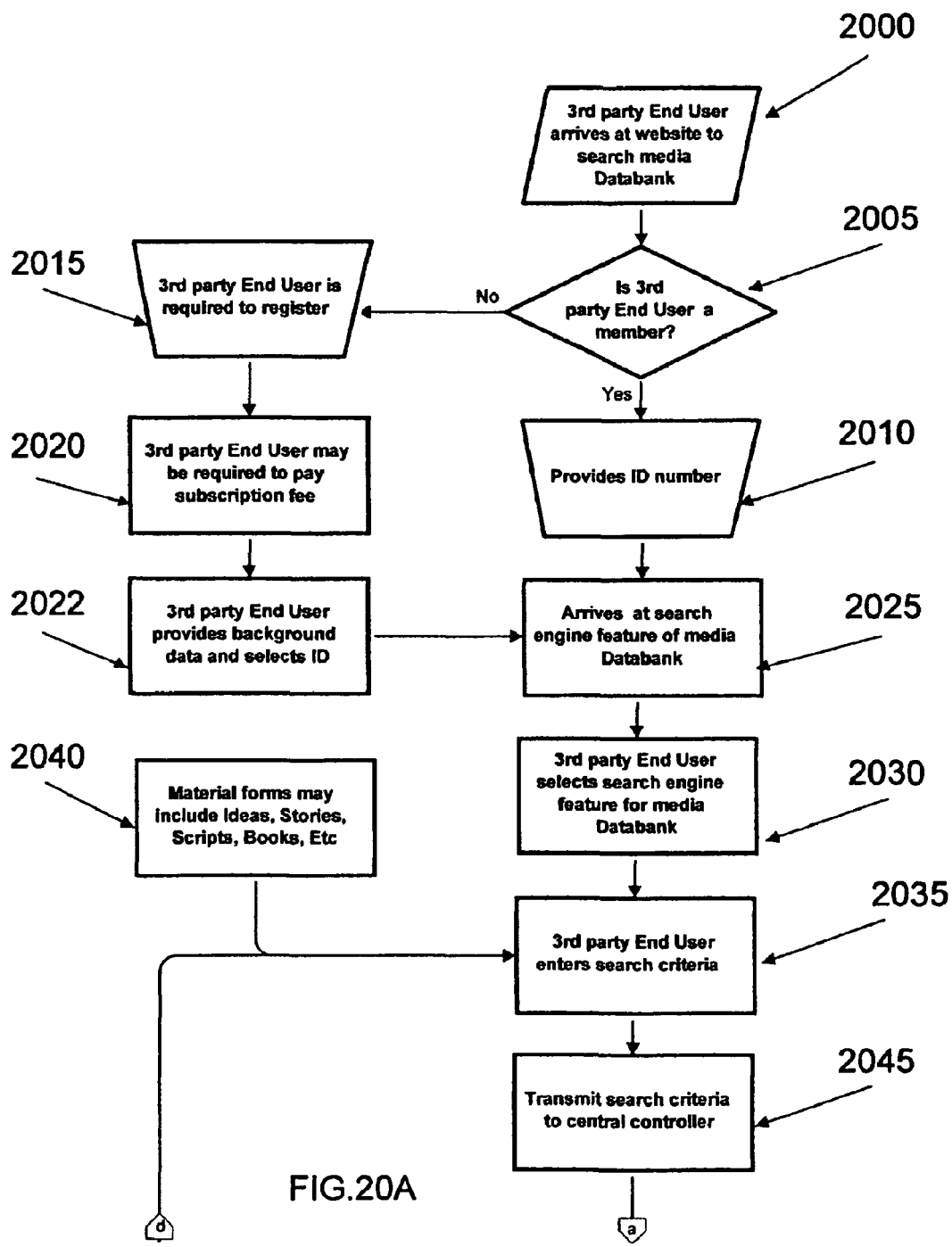
FIGS. 20A-20C are flowcharts illustrating the steps taken in an open exchange in accordance with the present invention.
Figure 20B:
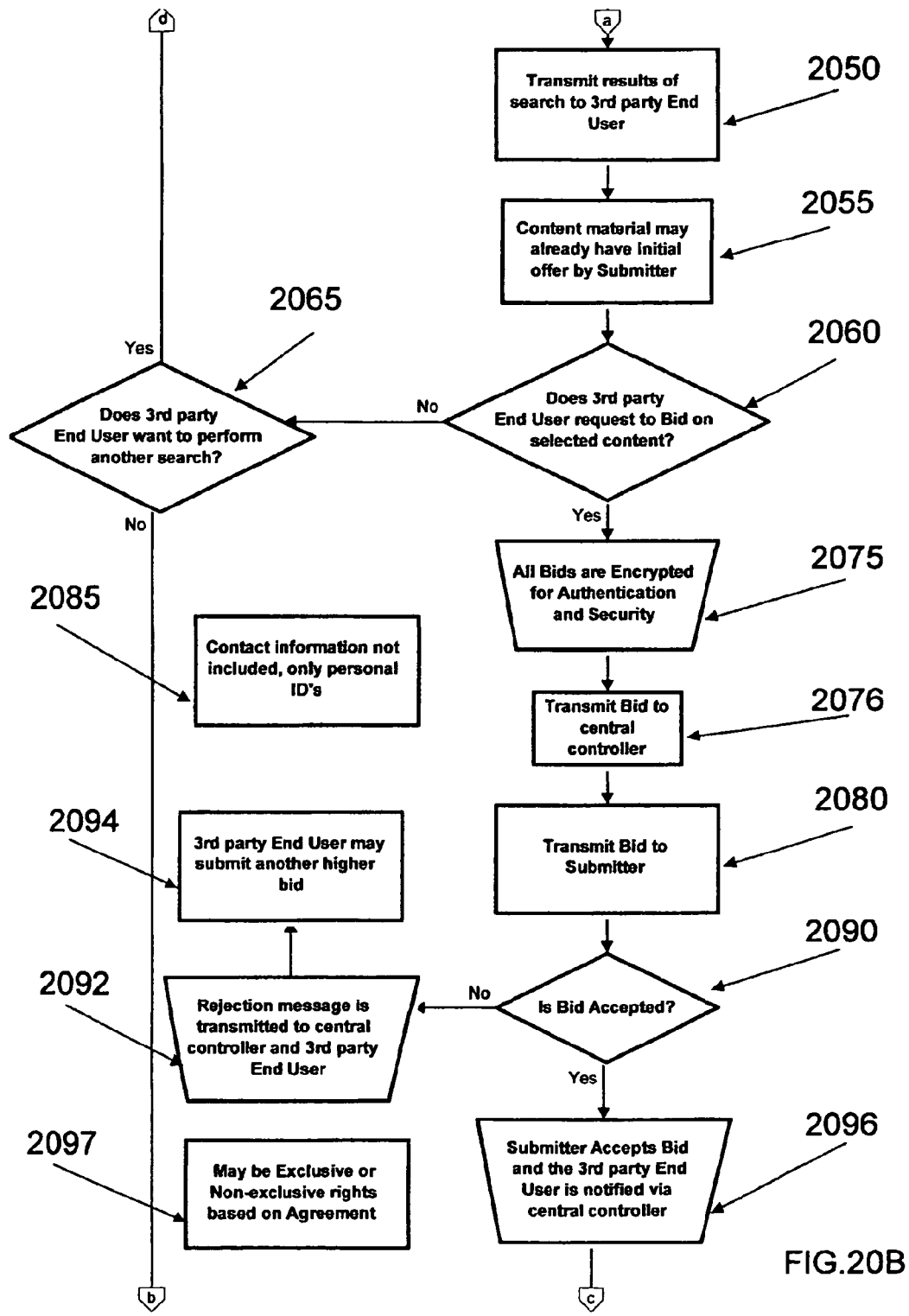
Figure 20C:
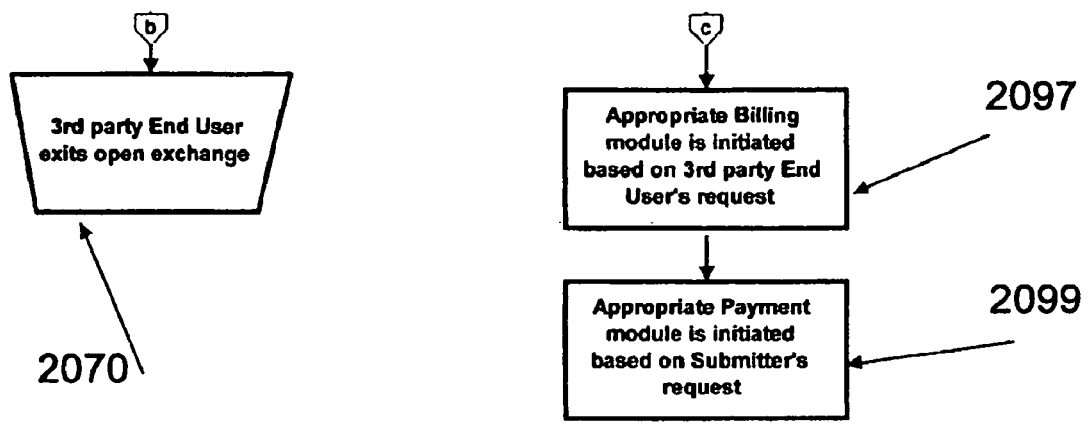

FIGS. 20A-20C illustrate the open exchange which can be incorporated into the present invention and the effective application of third party end user purchases of exclusive rights or non-exclusive rights content material. In addition, to content databases being made available through the open exchange, third party end users may also make asynchronous or synchronous content requests to end users. This is performed in the same fashion a creator makes a request as described above in FIGS. 7 and 8A and 8B. Third party access enables an entirely new art form to develop multi-media content.

Referring to FIGS. 20A-20C, the third party end user arrives at the Internet location (web site) to search the media submission databases created from previously received submissions in accordance with the invention at step 2000. Step 2005 determines whether the third party end user is a member of the exchange, if so then he/she provides ID and/or password at step 2010. If not, the third party end user is required to register at step 2015, agreeing to the rules and conditions of the exchange via an electronic initial, signature or the like. Preferably, the third party is provided an on-line agreement wherein the third party agrees not to disclose or copy material from the open exchange nor to attempt to contact submitters directly without permission of the creator-host.

The third party may also be required to pay a subscription fee at step 2020. As a part of the registration process the third party end user is required to provide background data and select his/her ID and/or password at step 2022. Either way, the third party end user arrives at the search engine feature of the media/content database at step 2025.

It is important to note, those participating in the exchange are notified of that if a serious violation occurs, such as the utilization of content material without proper consent, then serious prosecution may result initiated by both the exchange and/or the submitter, if the submitter decides to take individual action. The exchange will provide a self-policing service to its members for those found in violation, and if submitters elect they can purchase a legal services insurance through the exchange, where for a small fee the exchange will provide necessary legal protection and recourse. The exchange facilitates an economical form of legal protection because members pool their funds together in an insurance fund, where quality legal services can be retained internally or externally to protect their best interests. This is an advantage the exchange provides that individuals can not receive if they decides to solicit their works on their own.

The exchanges' self-policing function is facilitated by the sophisticated capabilities of the modern day electronic network. The network will track and maintain an electronic paper trail of anyone who interfaces with the network whether it's an end user, member, submitter, creator, third party end user, employee, hacker, etc. The electronic paper trail will include such data as who or whom made submissions, requests, opened and closed files, applied for registration, and the like as well as dates, times and if applicable reasons for such actions. For example, creators and third party end users will have to electronically document both their reason for opening a file, and if they intend any further action with the content material. The data compiled for the electronic paper trail will be processed through central controller 200 and the majority of it stored in audit database 305. Therefore, if a submitter claims someone inappropriately used his/her content material, the exchange can electronically track whether the accused person had opened the file and his/her reasons for doing so. Various other methods of tracking end users actions are also well known in the art and can be implemented by the invention.

Moreover, content material stored in content database 275 cannot be printed on interface architecture 400 by anyone adjoining the network, unless otherwise authorized. If content material is purchased by a third party end user, they will receive a formal copy of the material after payment arrangement have been satisfied as described in the billing and payment embodiment. Submitters will be able to legally protect content material through the Copyright, Trademark, and Patent service link via interface architecture 400, eliminating much of the concern of presenting content material on a network.

At step 2030, the third party end user must select a search type which may include but are not limited to keyword, boolean, string, or any form appropriate to the application of the invention. At step 2035, after the search type is selected the search criteria must be entered corresponding to the rules of the search type. Step 2040 lists some of the content material forms including but not limited to ideas, stories, scripts, book manuscripts, videos, music, lyrics, digital photographs, etc. At step 2045, the search criteria is transmitted to central controller 200. Central controller 200 responds by transmitting the results of the search back to the third party end user at step 2050.

It is important to note that exclusive rights or non-exclusive rights in the submitted content material may be indicated or an initial offer or minimum bid provided by submitter, step 2055. This is an option made available to submitters at the time they decided to make their content material submissions available to the open exchange. Submission content material not made available to the open exchange is only made available to the creators.

Step 2060, determines whether the third party end user is going to make a bid on any of the presented content material. If not, the third party must elect to either perform another search to find desired content material at step 2065, or exit the open exchange at step 2070. If the decision is to perform another search, than the third party end user returns to step 2035, or step 2030 if he/she elects a different search type, and repeats the entire process over again.

If the third party end user elects to bid on selected content material at step 2060, the bid is preferably encrypted for authentication and security at step 2075, and then the bid is transmitted to central controller 200 at step 2076. Central controller 200 then transmits the bid to the appropriate submitter at step 2080, where the bid is either accepted or rejected at step 2090. In step 2085, contact information is not included with either the submitted material nor the bid to avoid submitters or end users from circumventing the network. If the bid is rejected at step 2090, then a rejection message is transmitted to central controller 200, which may include a counter-offer or request for a higher bid from the submitter, and directed to the third party end user at step 2092. The rejection or acceptance messages may also be encrypted for authentication and security. After receiving a rejection message at step 2092, the third party end user may submit a higher bid at step 2094, and the process repeats itself.

If a submitter accepts a bid, the third party end user is notified via central controller 200 at step 2096. In step 2097, purchase rights may be exclusive or non-exclusive based on the agreement between the submitter and the third party end user. After the agreement, the appropriate billing module is initiated based on the third party end user's request at step 2098. Correspondingly, the appropriate payment module is initiated based on the submitter's request at step 2099. The exchange may be compensated for content transactions by either internally taking a percentage of the accepted transaction price or attaching an additional fee or override to the offer price, all of which will be discussed in more detail below. These compensation methods are meant to be merely illustrative, however, as there are many equivalent compensation methods either internal or external commonly known in the art which may also be used.

By combining these various elements into an open exchange, the present invention makes finding, selling, purchasing, and utilizing content material fast, simple, and market efficient.

As mentioned previously, the present invention provides for the anonymity of both member/submitters and creators or third party end users. Such anonymity is accomplished by eliminating all references to the names of the individuals for all transactions. A creator or third party end user, for example, would include his/her ID in a request rather than his/her name, preventing the member/submitter receiving request from discovering the creator and/or third party end user's identity. In a similar manner, member/submitters may also want to keep their identity a secret.

This is especially vital in preventing third party end users from contacting submitters outside the system prior to a deal being reached. The third party end user may be prevented from seeing contact information such as phone number or location. If the third party ultimately does not bid on a submission, but is then discovered to have negotiated an agreement with a submitter outside the system, he/she may be charged a usage fee as a percentage of the total value of the negotiated agreement, as agreed to by the third party end user when entering into the initial agreement when registering with the network.

Although the use of ID numbers can provide anonymity, both for members/submitters and creators or third party end users, there are a number of potential weaknesses. First, if the database of ID numbers, stored in member/submitter database 255 or creator/third party end user database 260, and their respective submitters/third party end users is compromised, anonymity is destroyed since the message sender can be looked up in member/submitter database 255 or creator/third party end user database 260. To prevent this, the ID numbers are encrypted with the public key of central controller 200, so that even if it is stolen it is useless without the private key.

There is described a method to prevent this attack using an anonymous mix in U.S. Pat. No. 5,862,223 to Walker et al, (which is hereby incorporated by reference) which can be implemented in the present invention. Anonymous mix uses a protocol to make it very difficult for anyone to trace the path of a message, which passes through the mix. Anonymous mix takes electronic messages from central controller 200 and randomly varies both the length of the messages as well as the timing of its delivery. An incoming message of two hundred kilobytes, for example, might be expanded to three hundred kilobytes by adding random characters at the end. An attacker would thus be unable to correlate (by length of message) the outgoing messages with incoming messages, and vice versa. Furthermore, by adding a random time delay in the processing of electronic messages, central controller 200 also prevents an attacker from correlating (based on time) incoming messages with outgoing messages.

By using a trusted third party and an anonymous mix, the identity of members/submitters and creators or third party end users is preserved. Although we have described only one possible method for maintaining anonymity, there are other equivalents. For example, if the embodiment included telephone messaging, the identity of the submitter and third party end user could be maintained using conventional voice modification techniques. If the request or the submission were in a paper form, the form could be scanned using optical character recognition and translated into digital form, discarding any information that could be found in the original document. Anonymity may also serve to prevent a submitter and third party end user from contacting each other outside the network in order to ensure that payment is received for bringing the two parties together in the exchange. In this embodiment, central controller 200 forces anonymity by blinding one or both parties. The third party end user, for example, may not see the name of the submitter until after the payment has been made.

The authentication and security measures described above take on particular importance with the open exchange and not only may include passwords, encryption, and the anonymous mix, but if deemed necessary even the institution of biometric devices for use between the creator-host and third party.

Fingerprint verification, for example, may be executed before the third party is allowed access to the network, in response to prompts from central controller 200, at some predetermined or random times, or continuously by incorporating the scanning lens into the third party's device.

An example of such an identification device is the FC 100 FINGERPRINT VERIFIER available from Startek, a Taiwanese company. The FC100 is readily adaptable to any PC via an interface card. The fingerprint verifier utilizes an optical scanning lens. The submitter places his or her finger on the lens, and the resulting image is scanned, digitized, and the data compressed and stored in memory. Typically, a 256 byte file is all that is required. Each live-scan fingerprint is compared against the previously enrolled/stored template, stored in interface architecture 400. If the prints do not match, the cryptographic algorithms in interface architecture 400 may prevent the third party from searching for content material.

In a voice verification embodiment, the third party's voice is used to verify his identity. This embodiment has the advantage of not requiring the use of any specialized hardware since it can be implemented over a standard phone connection. The third party's identity is verified at central computer 200. The process of obtaining a voice-print and subsequently using it to verify a person's identity is well-known in the art, and therefore need not be described in detail herein. One of ordinary skill in the art may refer to SpeakEZ, Inc. for voice identification/verification technology. Conventional speaker identification software samples the third party's voice. This sample is stored at central controller 200. Each time the third party wants to send content material to central controller 200, he/she is required to call central controller 200 and speak into the phone at the prompt for a voice sample. If this sample matches that stored in central controller 200, the third party is allowed access to the open exchange.

Billing and Payment Processes

FIGS. 21-25 show exemplary payment and billing systems which can be used with the present invention. Third party end users are billed for content material submissions received, and submitters are compensated for content material produced and selected as described above. The system can even be set up so as to be capable of ensuring that submitters receive payment for their work, whether or not the third party end user pays. This feature provides additional incentive for submitters to register with the system, as the possibility of bad debt has been eliminated since central controller 200 takes on the risk of not collecting from third party end users. Third party end user invoicing and submitter payment is described using conventional credit card electronic charges, checks, Electronic Funds Transfer ("EFT"), or digital cash. These payment methods are meant to be merely illustrative, however, as there are many equivalent payment methods commonly known in the art which may also be used.

Figure 21:
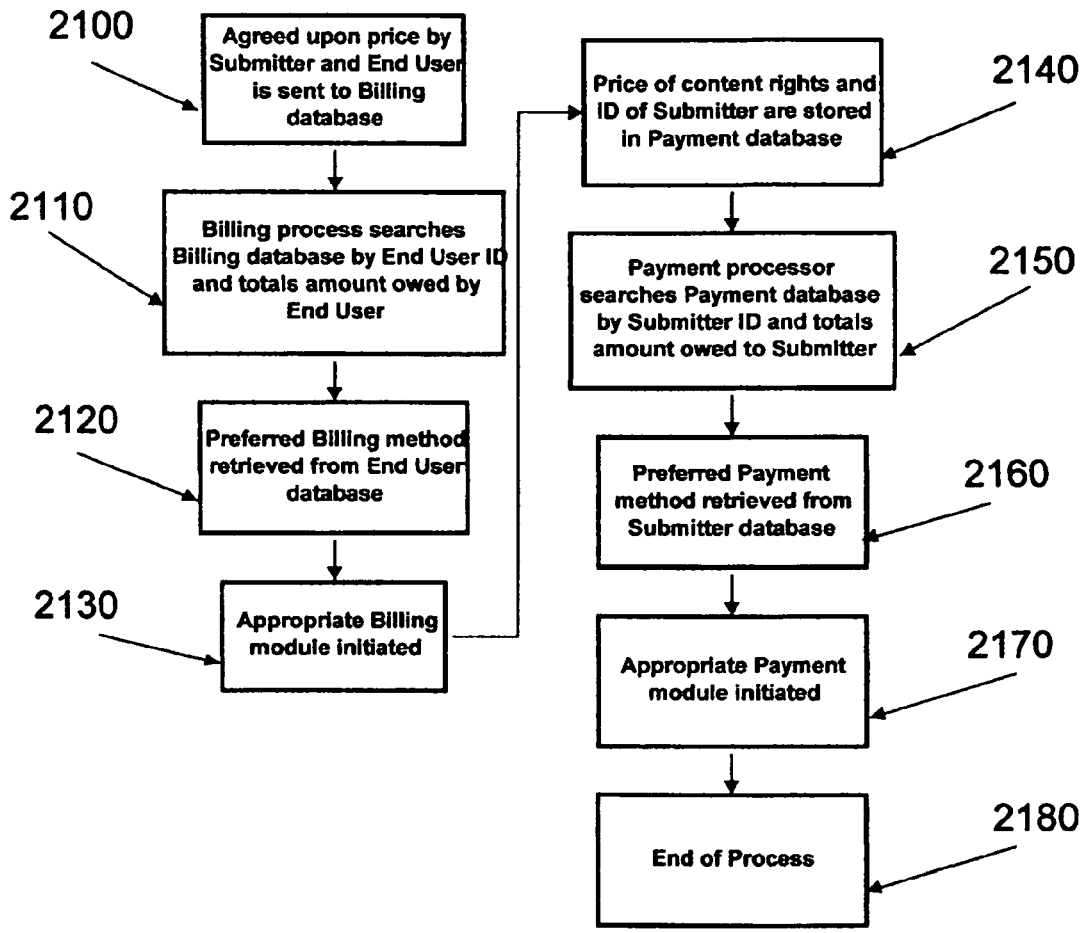
FIG. 21 is a flowchart illustrating a method of billing and payment used in accordance with the present invention.

In FIG. 21, the billing process is initiated when central controller 200 transmits the agreed upon price and tracking number of the submitter and third party end user transaction to billing database 285, 290 at step 2100. At step 2110, there are two billing protocols that can be used. The first, cash on delivery, requires that the third party end user pay before receiving formal copy or the content material. The formal copy may be electronically mailed, postal mailed, shipped, etc. Once the submitter accepts the third party end user bid, the third party will no longer have access to the selected content material in the content database 275. The second protocol is credit system in which the third party end user pays at the end of the billing period. In the cash on delivery protocol, billing processor 225 generates a bill prior to sending a copy of the formal content material to the third party end user, proceeding immediately to step 2120.

One exemplary embodiment of a payment guarantee means of the present invention is described as follows. Central controller 200 requires the end user to prepay for at least part of the content being purchased, forcing the third party end user to keep a minimum balance of money in order to be eligible to use the network. Central controller 200 then automatically deducts the price the content material from this escrow account before a formal copy of the content material is sent to the third party end user. Transaction records and balance information is stored in billing database 285, 290. Rather than actually depositing the money with central controller 200, the third party end user might instead be required to merely have sufficient credit available. A credit card on file with central controller 200, for example, is checked before the third party end user is able to make a bid for content material. If sufficient credit remains in the account, the submitter is notified. If credit available is not sufficient to cover the price of content material, the third party end user is required to provide another credit card number. For EFT transfers, the third party end user's account information is stored in billing database 285, 290 enabling central controller 200 to check the account balance before the biding process can be initiated.

In a credit protocol, processor 225 searches billing database 285, 290 by third party end user ID at the end of each billing period and totals the amount owed by each third party end user. It should be noted that in this credit protocol, while the third party does not pay until the end of the billing period, the submitter may still receive payment immediately. Central controller 200 pays the submitter after an agreement has been reached between the submitter and the third party end user. At step 2120, the preferred billing method is retrieved from third party end user database 270, and the appropriate billing module (credit card, EFT, check, electronic cash), is initiated at step 2130.

The process of paying the submitter begins at step 2140 when the price and tracking number of the content material are sent to payment database 285, 290 with the ID of the submitter extracted from content material and stored in payment database 285, 290. At step 2150, payment processor 230 searches payment database 285, 290 by submitter ID and totals the amount owed to the submitter. As with billing the third party end user, the submitter could be paid using either a cash on delivery or credit protocol. Cash on delivery works the same for the submitter as it does for the third party end user. Payment is made immediately. In the credit protocol, the submitter has an account with central controller 200 that maintains a balance for the submitter. At step 2160, the preferred payment method is retrieved from third party database 270, and the appropriate payment module is initiated at step 2170 before ending the process, step 2180. This step may be held up until payment has been received from the third party end user. During the period between payments, while the submitter still has a balance of funds due, it would be possible for the submitter to use these funds to purchase content material for himself, with the amount deducted from the balance represented in payment database 285, 290. Although the above protocols describe a number of ways in which payments may flow from third party end user to submitter, it is important to note the methods by which central controller 200 may generate revenues for services provided.

In one embodiment, a flat fee is charged for every third party end user request submitted, with the third party end user paying the fee in addition to reimbursing the submitter. There could also be flat fees that would cover any number of transactions over a given period of time, allowing third party end users to subscribe to the service much as they would subscribe to a newspaper. In another embodiment, central controller 200 creates a bid/ask spread in which third party end users are charged a premium over the cost of the submitter or content material. If a submitter requires $1,000 for content material, central controller 200 may mark this up by 20%, charging the third party end user $1,200. Submitters may be retained by central controller 200 on a salaried basis, with revenues collected from third party end users paying those salaries. In yet another embodiment, advertisers pay to have messages included in third party end user request, content material, or web pages of central controller 200. Advertising revenues then partially or fully offset the cost of content material. Payments to submitters for content material produced may also be reduced in exchange for the advertising message displayed at central controller 200 in requests or content material. Alternatively, the method and apparatus of the present invention may be employed without a payment feature.

Once the amount owed by the third party end user and the amount to be paid to the submitter has been calculated, appropriate billing and payment methods are initiated.

Figure 22:
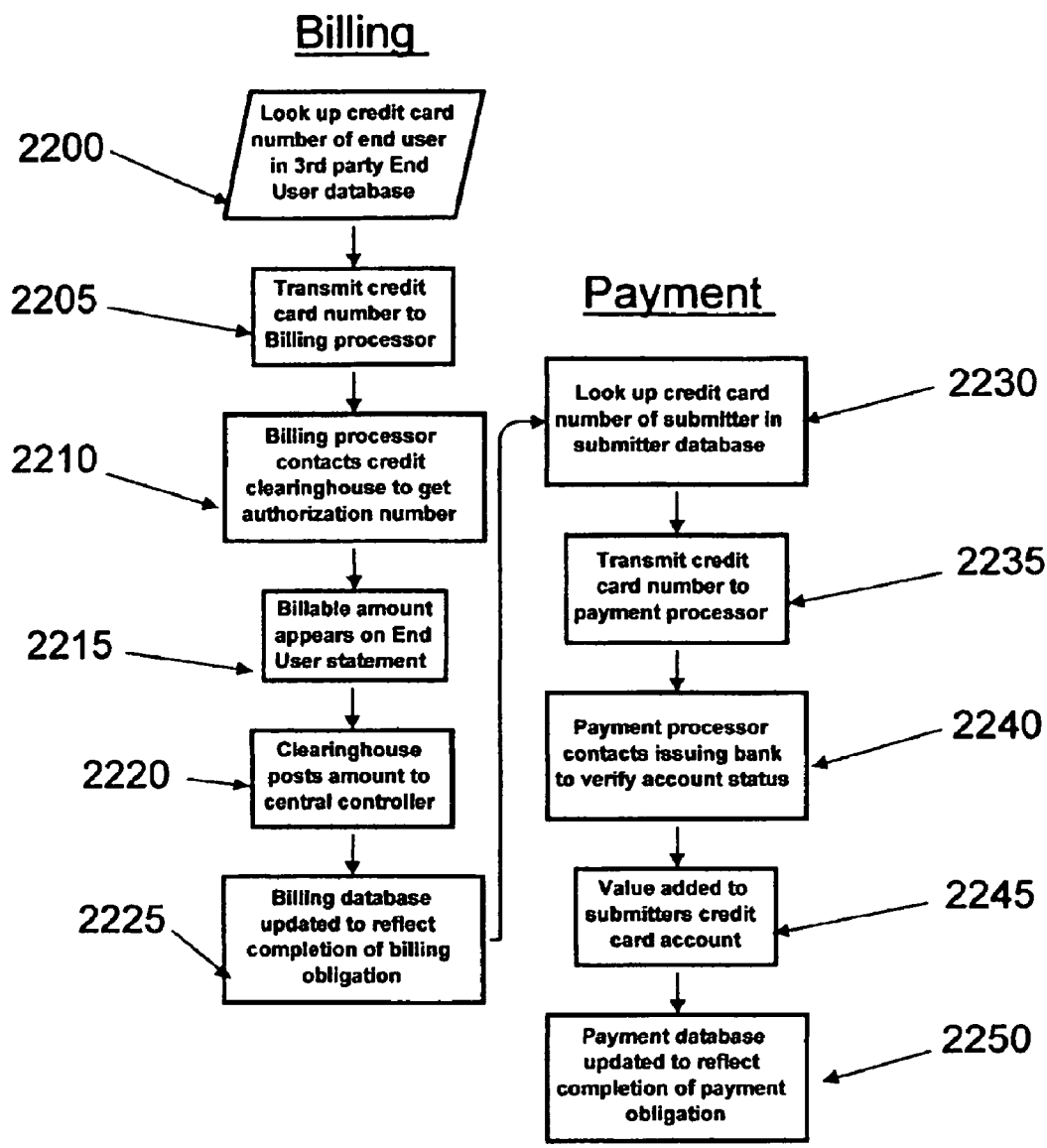
FIG. 22 is a flowchart illustrating the steps taken in conducting paper billing and payment.

FIG. 22 illustrates an exemplary payment and billing procedure using credit cards as the primary transaction vehicle. The advantage of this system is its simplicity. No bank account is necessary, and no paper transactions are required. At step 2200, central controller 200 looks up the credit card number of the third party end user in creator/third party end user databases 260, 270. At step 2205, this credit card number is transmitted to billing processor 225. Billing processor 225 contacts the credit card clearinghouse to get an authorization number at step 2210. The billable amount appears on the credit card statement of the third party end user at step 2215. At step 2220, the clearinghouse posts this amount to central controller 200 account. At step 2225, central controller 200 updates billing database 285, 290 to indicate that payment has been made. A similar process occurs on the payment side. At step 2230, central controller 200 looks up the credit card number of the submitter in member/submitter 255. At step 2235, this credit card number is transmitted to payment processor 230. Payment processor 230 contacts the issuing bank to verify that the account is still active at step 2240. Value is added to the submitter's credit card account at step 2245, where it shows up as a credit on his/her monthly bill. At step 2250, central controller 200 updates payment database 285, 290 to indicate that payment has been made.

Figure 23:
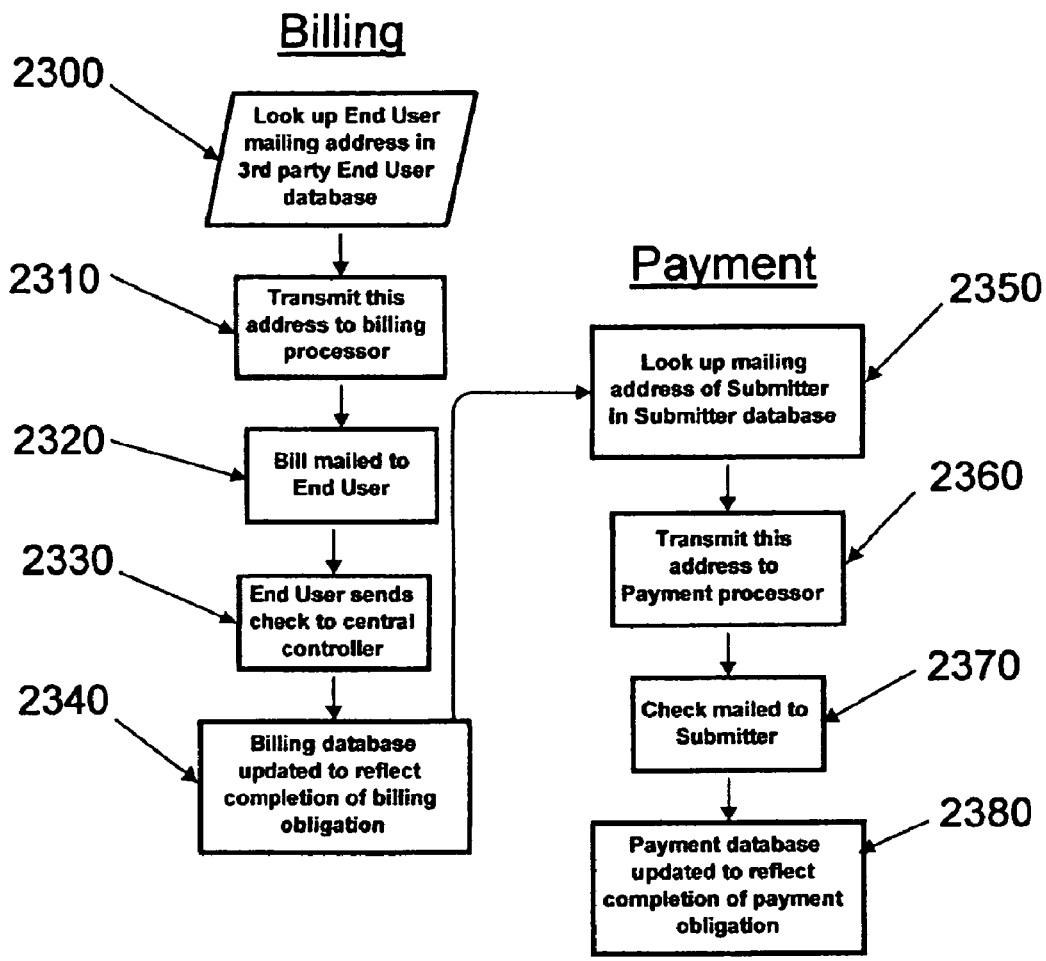
FIG. 23 is a flowchart illustrating the steps taken in conducting credit card billing and payment.

FIG. 23 illustrates a payment procedure involving standard bank checks. In billing the third party end user, central controller 200 looks up his mailing address at step 2300 in creator/third party end user databases 260 and 270. This address is transmitted to billing processor 225 at step 2310. A bill is mailed to the third party end user at step 2320, and the check is received from the third party end user at step 2330. At step 2340, central controller 200 updates billing database 285, 290 to indicate that payment has been made. At step 2350, central controller 200 looks up the mailing address of the submitter in member/submitter database 255. This information is transmitted to payment processor 230 at step 2360. Payment processor 230 then automatically cuts a hard copy check, payable to the submitter, which is then mailed to the submitter at step 2370. At step 2380, central controller 200 updates payment database 285, 290 to indicate that payment has been made.

Figure 24:
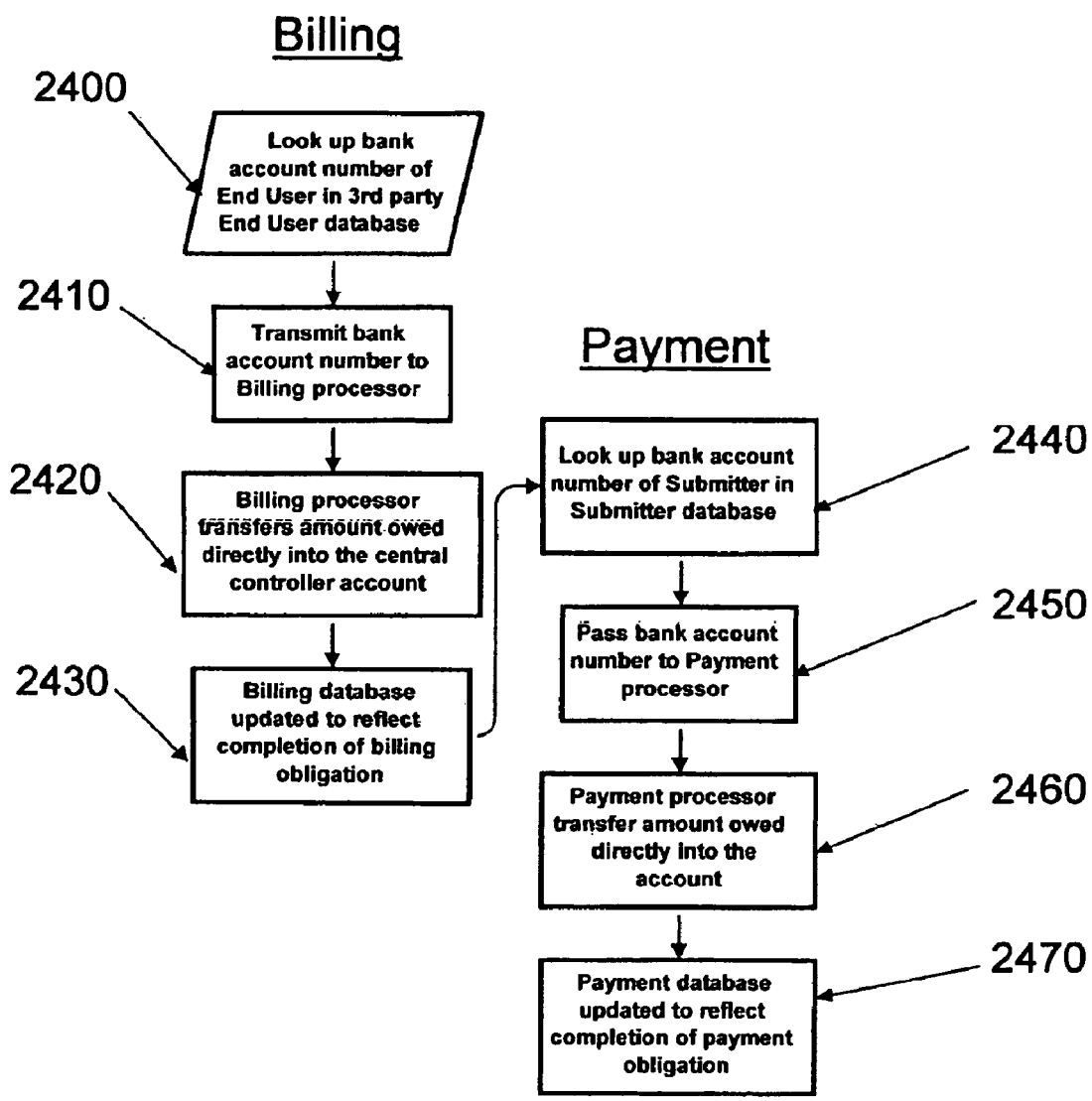
FIG. 24 is a flowchart illustrating the steps taken in conducting electronic fund transfer billing and payment.

Referring now to FIG. 24, there is illustrated a procedure in which funds are transferred via electronic funds transfer (EFT). At step 2400, the bank account number of the third party end user is looked up in creator/third party end user databases 260, 270. This account number is transmitted to billing processor 225 at step 2410, followed by the transfer of funds directly into the account of central controller 200 at step 2420. At step 2430, central controller 200 updates billing database 285, 290 to indicate that payment has been made. Paying the submitter is essentially the reverse process. At step 2440, central controller 200 searches member/submitter database 255 for the bank account number of the submitter. This bank account number is transmitted to payment processor 230 at step 2450, which transfers the money directly into the account of the submitter at step 2460. At step 2470, payment database 285, 290 is updated to indicate that payment has been made.

Figure 25:
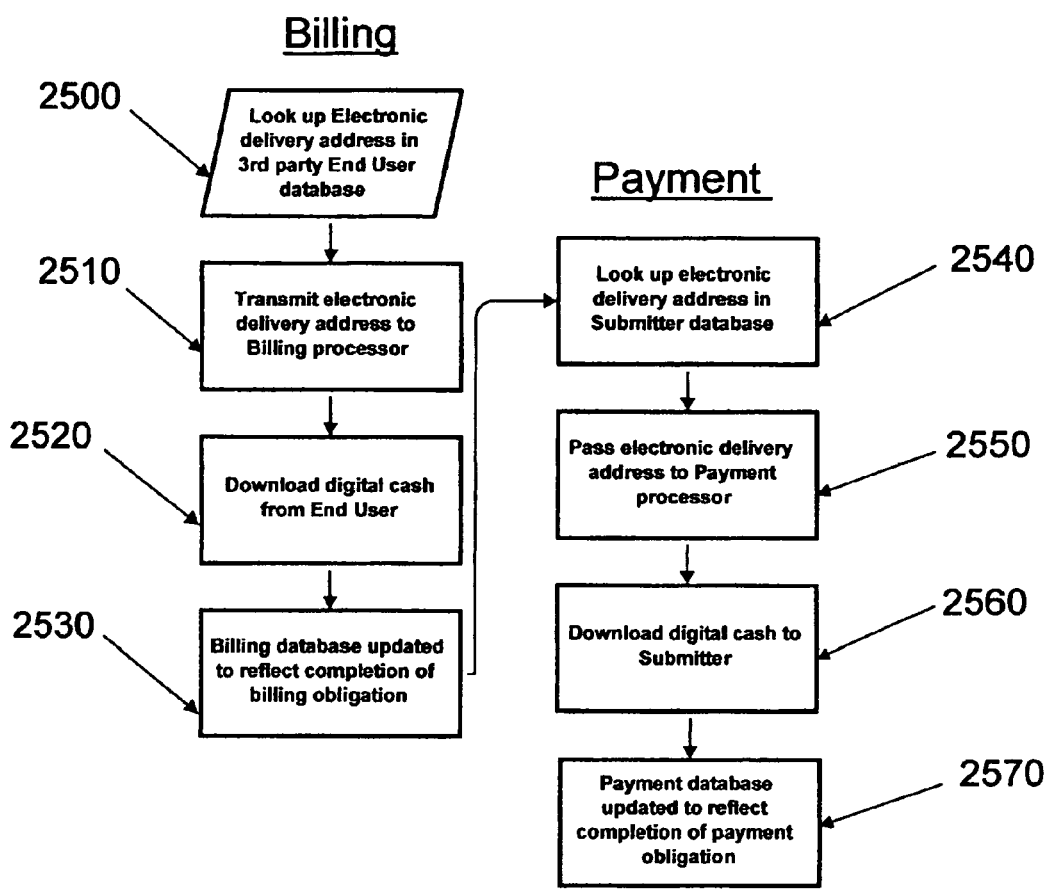
FIG. 25 is a flowchart illustrating the steps taken in conducting digital cash billing and payment.

Referring now to FIG. 25, there are shown commercial transaction procedures using digital cash. For billing the third party end user, central controller 200 looks up the third party end user's electronic delivery address in creator/third party end user databases 260, 270 at step 2500. This address is transmitted to billing processor 225 at step 2510, with the digital cash being downloaded from the third party end user at step 2520. At step 2530, central controller 200 updates billing database 285, 290 to indicate that payment has been made. Payment to the submitter proceeds similarly. At step 2540, the electronic delivery address is sent to payment processor 230. This address might be an electronic mail address if the digital cash is to be transferred by electronic mail, or it could be an Internet Protocol address or URL capable of accepting an online transfer of digital cash. At step 2550, this electronic delivery address is sent to payment processor 230. At step 2560, the digital cash is downloaded to the submitter. At step 2570, central controller 200 updates payment database 285, 295 to indicate that payment has been made. Using these digital cash protocols, it is possible for the third party end user to include payment along with third party end user request in e-mail form. A third party end user who had already negotiated a final price with a submitter for content material, for example, could include digital cash along with his/her confirmation of the acceptability of the price. The practice of using digital cash protocols to effect payment is well known in the art and need not be described here in detail. For reference, one of ordinary skill in the art may refer to Daniel C. Lynch and Leslie Lundquist, Digital Money, John Wiley & Sons, 1996; or Seth Godin, Presenting Digital Cash, Sams Net Publishing, 1995.

Applications of the Invention

In order to clarify the object of the present invention, the following examples demonstrate some of the invention's applications from either the creators or third party end user's perspective. These applications may are exemplary only and are not intended to be inclusive of all potential uses of the invention. It should also be noted that the examples described below may include The Contest and Points Awards Program features, and other features of the invention, as described above.

A creator wants to develop a game show where information is gathered about the public's perception on various issues. In this interactive feature, creative content developed by the show's producers is then posed to the public. By simply answering polls, surveys, and other entertaining questions, the producers will be able to gather specific content material targeted to the show's format. The game show is willing to pay $250 for content material used in the show, and a pre-determined number of points will also be awarded for entering sweepstakes and/or the purchase of cash or merchandise awards. The responses will be brief and easy for the creator to disseminate.

A Production company, acting as a third party end user, is looking to produce a feature film about the story of an individual who survived against extraordinary odds in military combat. This content can either be factual or fictional.

A request through the network has been submitted to receive a his/her personal story or script relating to this subject. The production company is willing to pay the submitter $50,000 for the exclusive rights to such an account. Submitters are given a two-month deadline to submit their content material, after which the search and selection process will begin. The production company has also elected to participate in the points awards program, offering submitters a pre-determined number of points for their participation.

A music company executive, acting as a third party end user, is looking for a talented lyricist, arrives at the exchange to perform an open search. After performing an extensive search the music executive selects specific content material in the form of lyrics to be applied to the music of an already signed artist. The music executive now makes a bid of $5,000 for the lyrics of the submitter. The bid is accepted and the music company retains non-exclusive rights to the material.

A creator wants to put together a country western CD of 10 songs from an assortment of talented but relatively unknown artists. The compilation will serve to promote the up and coming new artists as well as country western music. In his/her effort to finding the music, the creator submits a request for country western music with the specific requirements he/she is looking for and a three-month deadline for the music submissions. Submitters record their music and transfer the audio files over the Internet to the exchange. After the deadline, the creator searches the music content database under the requested classification and selects ten songs from the submissions, electing to pay the groups $20,000 for each recording. One group had two recordings selected for the CD. Everyone participating in the country western music request receives a pre-determined number of points for entering sweepstakes and/or the purchase of cash or merchandise awards.

A novelty distributor, acting as a third party end user, would like to develop a calendar with the concept of funny things children like do or say. The distributor/creator of these novelty items has put a request through the network to receive this type of entertaining information from parents throughout the world. The distributor is willing to pay $100 for each submission selected for printing in the 2001-year calendar. A total of 365 submissions will be selected for the final product. Submitters are given a 5-month deadline to submit their content. The distributor requests that all content be factual. Aside from the $100 incentive the submitter will also see their child's story printed on thousands of calendars sold across the nation.

The creator is seeking humorous and original material for a new line of greeting cards. All content must be no more than 10 words on the front and no more than 20 words inside the card. A request through the network has been submitted to receive a greeting card concept that meets these parameters. While the creator is looking for mainly humorous copy concepts, they will accept accompanying illustrations (although they are not mandatory). The creator is willing to pay $250 for each selected greeting card idea. Prior greeting card writing experience is not necessary; just cleaver, fresh, humorous ideas that the creator feels there is a niche for. Creator has also chosen to participate in a points awards program offering a predetermined number of points for each idea submission.

A television production company, acting as a third part end user, is looking to produce a series of one-hour documentaries. There is no specific requirement for submitted content, other than it is to be entertaining and factual. A request through the network has been submitted to receive an idea for a one-hour documentary program to be aired on syndicated television. The submitter should have a good knowledge and understanding of the idea he/she is submitting. The production company is willing to pay the submitter $5,000 for the rights to the idea. Submitters are given a three-month deadline to submit their idea, after which the search and selection process will begin. The production company has contracted time with a major syndicate to produce 5 one-hour segments.

A record label, acting as a third party end user, wants to create and produce the music of an all boys hip-hop group. A request through the network has been submitted to locate attractive male performers between the ages of 16 and 21 who are talented at both singing and dancing (playing a musical instrument is not required). Group must consist of at least 4 and no more than 6 members. Producer's search will commence on January $1^{st}$ and end on December $31^{st}$ of that same year. Submitters can record their music and transfer all audio and video files over the Internet to the exchange. After the deadline, the producers will search the content database under the requested classification and select one group from among all entrants. The selected group will receive a guaranteed recording label contract along with an unspecified amount of cash.

A leading production company, acting as a third part end user, is looking to produce a full length "buddy-buddy" feature comedy film. Executives from the production company plan to perform an open search of the content database looking for content submissions, either story ideas or scripts, related to this concept. A high degree of comedy along with a cleaver story line using 2 male actors as the main characters is what the production company is looking for. The production company is willing to pay the submitter $25,000 for the exclusive rights to the such content that is deemed to be a potential large box-office draw. Submitters are given a one year deadline to submit their content, after which the search and selection process will begin.

A distributor would like to develop a 365 day calendar comprised solely of dog pictures. Each page would feature a selected picture of a dog. All breeds, including mixes will be accepted for the selection process. The distributor of these calendars has submitted a request through the network to receive photographs from dog owners around the world who believe they're dog has what it takes to make the calendar. It is preferred the photographs are stored to a file and digitally transferred through the Internet to the exchange for review. A total of 365 photograph entries will be accepted from among all those received. The distributor will pay $100 for each photograph submission accepted for printing in the 2001-year calendar. The distributor will be looking for pictures of dogs only. No other animals or people should appear in the photographs. Multiple dogs may, however, appear in one photograph. All entries meeting these requirements and mailed before Sep. 19, 2000 will be accepted for entry by the distributor.

A television network, acting as a third party end user, is looking for some new humorous material it could adapt into one of its weekly sitcoms, which has recently plummeted in the ratings. Executives at the network plan to both openly search the content databases for applicable material as well as submit a request through the network. The material may include but is not limited to ideas, real life stories, scripts or anything that might stimulate humor in what has otherwise become stale weekly episodes. The network has put no timeframe on the submissions of content material hoping this new method of receiving story ideas can be ongoing and will help improve ratings. The network plans on paying submitters $10,000 if their content material is selected, and as an added incentive selected submitters may also get a cameo in an up and coming episode. The contest format will be included as well so the public can vote and/or rate their favorite episodes, and those submitters will receive larger grand prizes.

Those skilled in the art will recognize that the method and apparatus of the present invention has many applications, and that the present invention is not limited to the representative examples disclosed herein or the preferred embodiment of television and the Internet. Moreover, the scope to the present invention covers conventionally known variations and modifications to the system components described herein, as would be known by those skilled in the art. Various other embodiments and modifications to these preferred embodiments may be made by those skilled in the art without departing form the scope or spirit of the invention. Accordingly, the invention is not to be limited, except as by the appended claims.

What is claimed:

1. A computer system comprising one or more data processing apparatus, and a computer-readable medium coupled to the one or more data processing apparatus having instructions stored thereon which, when executed by the one or more data processing apparatus, cause the one or more data processing apparatus to perform an electronic method comprising:
    electronically retrieving a plurality of electronic media submissions from an electronic media submissions database using an electronic content filter located on the one or more data processing apparatus, said filter being based at least in part on at least one of the one or more user attributes, the electronic media submissions stored in an electronic media submissions database on a non-transitory medium, the plurality of electronic media submissions transferred to the electronic media submissions database over a public network, the electronic media submissions database further stores data identifying the submitter and data indicating content for each electronic media submission, the one or more user attributes stored in a user database;
    electronically generating a multimedia file from the retrieved electronic media submissions in accordance with a selected digital format, wherein the identification of the submitter is maintained with each retrieved submission within the multimedia file;
    electronically transmitting the multimedia file to a plurality of publicly accessible webservers to be electronically available for viewing on one or more user devices over a public network via a web-browser; and
    providing a web-based graphical user interface that enables a user to electronically transmit data indicating a vote or rating for an electronically available multimedia content or an electronic media submission within a respective electronically available multimedia content.

2. The computer system of claim 1, wherein the electronic method further comprises enabling a plurality of users to upload one or more electronic media submissions to be stored in the electronic media submissions database over the public network.

3. The computer system of claim 1, wherein an electronic media submission includes one or more images and text.

4. The computer system of claim 1, wherein the electronic media submissions database includes solicited and unsolicited electronic media submissions.

5. The computer system of claim 1, wherein an electronic media submission includes text data.

6. The computer system of claim 1, wherein the electronic method further comprises enabling the multimedia content to be edited.

7. The computer system of claim 1, wherein the multimedia file includes video.

8. The computer system of claim 1, wherein the electronic filter includes criteria identifying a media submission's subject matter.

9. The computer system of claim 1, wherein the electronic filter includes criteria identifying a media submission's topic.

10. The computer system of claim 1, wherein the electronic filter includes criteria identifying a media submission's categorical information.

11. The computer system of claim 1, wherein the electronic filter includes criteria identifying a media submission's title.

12. The computer system of claim 1, wherein the electronic filter includes criteria identifying a media submission's text.

13. The computer system of claim 1, wherein the electronic filter includes criteria identifying a media submission's time of submission.

14. The computer system of claim 1, wherein the electronic filter includes criteria identifying a media submission's end user rating.

15. The computer system of claim 1, wherein the electronic filter includes criteria identifying a media submission's end user votes.

16. The computer system of claim 1, wherein the electronic filter includes criteria defined by keywords.

17. The computer system of claim 1, wherein the electronic method enables a user to electronic vote for an electronically available multimedia content.

18. The computer system of claim 1, wherein the electronic method enables a user to electronic vote for an electronic media submission within a respective electronically available multimedia content.

19. The computer system of claim 1, wherein the electronic method enables a user to electronic rate an electronically available multimedia content.

20. The computer system of claim 1, wherein the electronic method enables a user to electronically rate an electronic media submission within a respective electronically available multimedia content.

21. The computer system of claim 1, wherein the one or more user attributes comprise one or more of:
    one or more user preferences;
    one or more user memberships;
    one or more subjects;
    one or more categories; and
    one or more stored searches.

22. The computer system of claim 1, wherein, the electronic media submissions database further stores date and time of the submission.

* * * * *